(12) United States Patent
Park

(10) Patent No.: US 11,204,627 B2
(45) Date of Patent: Dec. 21, 2021

(54) FOLDABLE DEVICE

(71) Applicant: Samsung Display Co., Ltd., Yongin-Si (KR)

(72) Inventor: Myoung Seo Park, Seoul (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 16/563,391

(22) Filed: Sep. 6, 2019

(65) Prior Publication Data

US 2020/0218311 A1 Jul. 9, 2020

(30) Foreign Application Priority Data

Jan. 8, 2019 (KR) .................. 10-2019-0002491
Feb. 15, 2019 (KR) .................. 10-2019-0017838

(51) Int. Cl.
*G06F 1/16* (2006.01)

(52) U.S. Cl.
CPC .......... *G06F 1/1641* (2013.01); *G06F 1/1681* (2013.01); *G06F 1/1616* (2013.01); *G06F 1/1652* (2013.01)

(58) Field of Classification Search
CPC ........ G09F 9/30; G06F 1/1616; G06F 1/1641; G06F 1/1652
See application file for complete search history.

(56) References Cited

U.S. PATENT DOCUMENTS

| | | | |
|---|---|---|---|
| 6,577,496 B1 | 6/2003 | Gioscia et al. | |
| 9,710,021 B2* | 7/2017 | Kauhaniemi | G06F 1/1652 |
| 10,015,897 B1 | 7/2018 | Hong et al. | |
| 10,143,098 B1 | 11/2018 | Lee | |
| 10,368,452 B2* | 7/2019 | Yun | G09F 9/301 |
| 2006/0146488 A1 | 7/2006 | Kimmel | |
| 2012/0243207 A1 | 9/2012 | Wang et al. | |
| 2013/0216740 A1* | 8/2013 | Russell-Clarke | B29C 53/063 428/33 |
| 2014/0226275 A1 | 8/2014 | Ko et al. | |
| 2016/0357052 A1 | 12/2016 | Kim et al. | |
| 2017/0188474 A1 | 6/2017 | Luan et al. | |
| 2017/0315588 A1 | 11/2017 | Aurongzeb et al. | |
| 2018/0097197 A1* | 4/2018 | Han | G06F 1/3265 |

(Continued)

FOREIGN PATENT DOCUMENTS

| | | |
|---|---|---|
| EP | 3396929 | 10/2018 |
| KR | 20150099676 A | 9/2015 |

(Continued)

OTHER PUBLICATIONS

Partial European Search Report—European Application No. 19217409.2 dated May 13, 2020.

(Continued)

*Primary Examiner* — Anthony Q Edwards
(74) *Attorney, Agent, or Firm* — Cantor Colburn LLP

(57) ABSTRACT

A foldable device is disclosed, and more particularly, a foldable display device is disclosed. The foldable device comprises a hinge structure which comprises a first body, a second body, and a first hinge connecting the first body to the second body, and a plate structure which is disposed on the hinge structure and comprises a first plate region corresponding to the first body and a second plate region corresponding to the second body.

11 Claims, 27 Drawing Sheets

(56) References Cited

U.S. PATENT DOCUMENTS

| | | | |
|---|---|---|---|
| 2018/0145269 A1 | 5/2018 | Myeong et al. | |
| 2018/0192527 A1 | 7/2018 | Yun et al. | |
| 2018/0210983 A1* | 7/2018 | Zhang | G06F 30/23 |
| 2018/0231216 A1 | 8/2018 | Hirakata et al. | |
| 2019/0131553 A1* | 5/2019 | Park | H04M 1/0268 |
| 2019/0196548 A1* | 6/2019 | Kim | G09F 9/301 |
| 2019/0200466 A1* | 6/2019 | Kim | G06F 1/1652 |

FOREIGN PATENT DOCUMENTS

| | | |
|---|---|---|
| KR | 20170086999 A | 7/2017 |
| KR | 20170087008 A | 7/2017 |
| KR | 1020170115815 | 10/2017 |
| KR | 101834793 | 3/2018 |
| KR | 20180076271 A | 7/2018 |
| KR | 1020180098504 | 9/2018 |

OTHER PUBLICATIONS

The Extended European Search Report—European Application No. 19217409.2 dated Sep. 18, 2020, citing references listed within.

* cited by examiner

FOLDABLE DEVICE

This application claims priority to Korean Patent Application No. 10-2019-0002491, filed on Jan. 8, 2019, and Korean Patent Application No. 10-2019-0017838, filed on Feb. 15, 2019, and all the benefits accruing therefrom under 35 U.S.C. § 119, the contents of which in their entireties are herein incorporated by reference.

BACKGROUND

1. Field

The disclosure relates to a foldable device, and more particularly, to a foldable display device.

2. Description of the Related Art

A display device is a device that displays an image and includes a display panel such as an organic light emitting display panel or a liquid crystal display panel.

A mobile electronic device typically includes a display device to provide an image to a user. The proportion of such a mobile electronic device having a larger display screen while having the same or smaller volume or thickness than conventional electronic devices is increasing, and foldable display devices that can be folded and unfolded to provide a larger screen at the time of use are also being developed.

SUMMARY

Embodiments of the disclosure provide a foldable device in which a tensile stress or compressive stress applied to a flexible display panel is reduced when the flexible display panel is folded or unfolded.

According to an embodiment of the disclosure, a foldable device includes: a hinge structure including a first body, a second body, and a first hinge connecting the first body to the second body; and a plate structure disposed on the hinge structure, where the plate structure includes a first plate region corresponding to the first body and a second plate region corresponding to the second body.

According to an embodiment of the disclosure, a foldable device includes: a flexible display panel comprising a first region, a second region, and a third region located between the first and second regions; and a plate structure disposed under the flexible display panel, wherein the plate structure comprises a first plate region attached to the first region of the flexible display panel, a second plate region attached to the second region of the flexible display panel, and a third plate region attached to the third region of the flexible display panel, wherein the third plate region of the plate structure has a flexibility such that the third plate region of the plate structure has lower rigidity than the first and second plate regions of the plate structure.

According to an embodiment of the disclosure, a foldable device includes: a hinge structure comprising a first body, a second body, and a first hinge connecting the first body to the second body; and a flexible display panel disposed on the hinge structure, wherein the flexible display panel comprises a first region corresponding to the first body, a second region corresponding to the second body, and a third region corresponding to the first hinge, wherein the first hinge comprises a middle portion, a first peripheral portion disposed between the middle portion of the first hinge and the first body and a second peripheral portion disposed between the middle portion of the first hinge and the second body, wherein the first region of the flexible display panel has a position horizontally fixed to the first body, the second region of the flexible display panel has a position horizontally fixed to the second body, and the third region of the flexible display panel has a position horizontally fixed to the middle portion of the first hinge, wherein the hinge structure further comprises a third body and a second hinge disposed between the second and third bodies, wherein foldable device further includes a plate structure comprising a first plate region corresponding to the second body, a second plate region corresponding to the third body of the hinge structure and a third plate region corresponding to the second hinge and having flexibility, wherein the first plate region of the plate structure has a position horizontally fixed to the second body, the second plate region of the plate structure has a position not horizontally fixed to the third body, and the third plate region of the plate structure has a position not horizontally fixed to the second hinge.

According to an embodiment of the disclosure, a foldable device includes: a plate structure including a first rigid plate region having a first lateral side and a second lateral side located substantially opposite the first lateral side, a second rigid plate region neighboring the first lateral side of the first rigid plate region, and a third rigid plate region neighboring the second lateral side of the first rigid plate region; a first hinge structure including a first hinge disposed to correspond to a position between the first rigid plate region and the second rigid plate region, where the first hinge has one selected from the group of a single shaft structure, a double shaft structure and a multi joint structure; and a second hinge structure including a second hinge disposed to correspond to a position between the first rigid plate region and the third rigid plate region, where the second hinge has one selected from the group of the single shaft structure, the double shaft structure and the multi joint structure. In such an embodiment, the plate structure further includes a first flexible plate region connected between the first rigid plate region and the second rigid plate region, where the first flexible plate region includes an upper surface connected between an upper surface of the first rigid plate region and an upper surface of the second rigid plate region.

BRIEF DESCRIPTION OF THE DRAWINGS

These and/or other features of the invention will become apparent and more readily appreciated from the following description of the embodiments, taken in conjunction with the accompanying drawings, in which.

DETAILED DESCRIPTION

Figure 1:
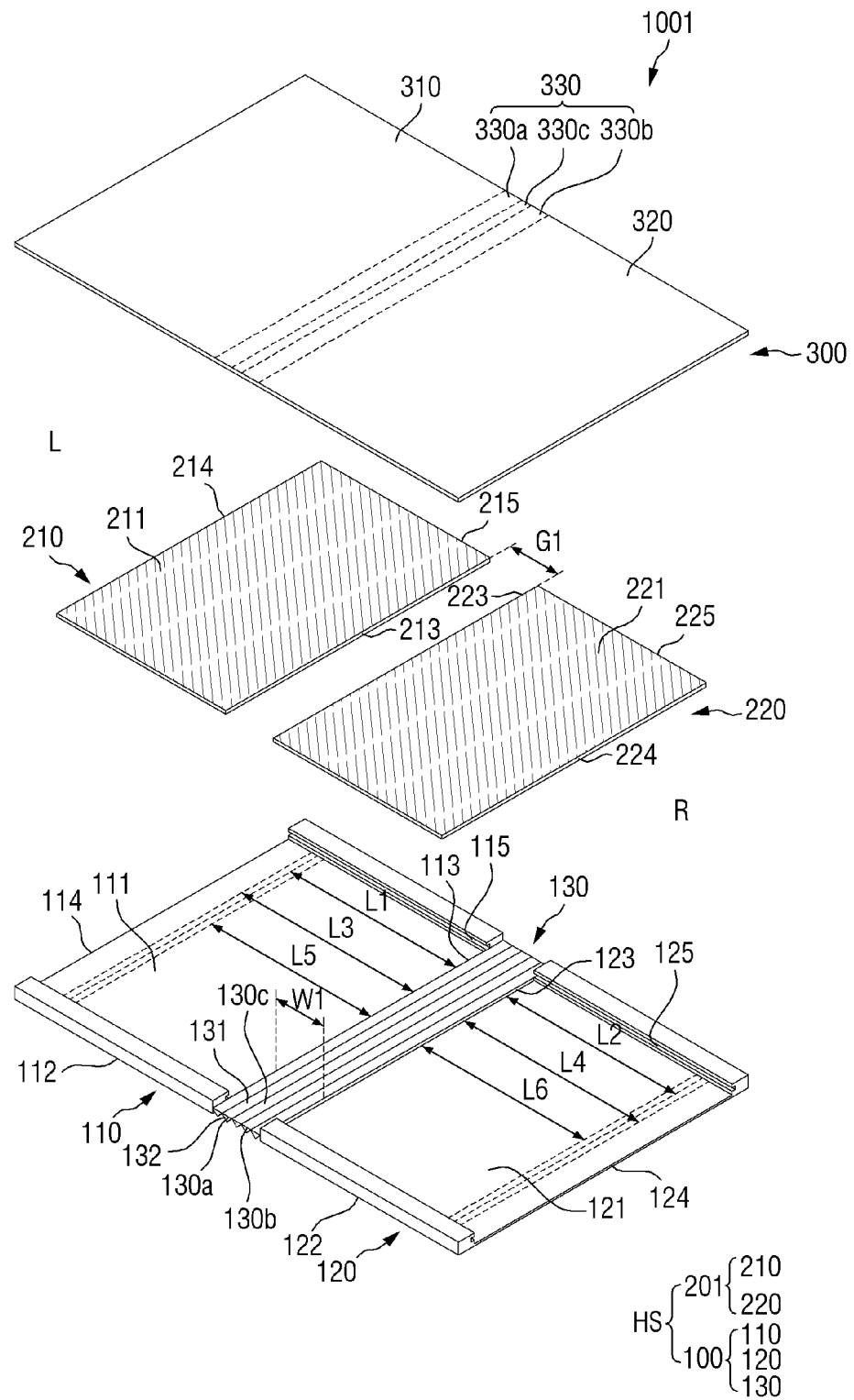
FIG. 1 is an exploded perspective view of a foldable device according to an embodiment.

The invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the accompanying drawings, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described with reference to the accompanying drawings.

FIG. 1 is an exploded perspective view of a foldable device 1001 according to an embodiment.

Referring to FIG. 1, an embodiment of the foldable device 1001 includes a housing HS and a flexible display panel 300. The housing HS includes a hinge structure 100 and a plate structure 201. The foldable device 1001 has a right side R and a left side L.

The hinge structure 100 includes a first body 110, a second body 120, and a hinge 130. The first body 110 includes an upper surface 111 and a lower surface 112 located (or disposed) substantially opposite the upper surface 111. The first body 110 includes a guide portion 115. The first body 110 includes an inner side 113 neighboring the hinge 130 and an outer side 114 located substantially opposite the inner side 113.

The second body 120 includes an upper surface 121 and a lower surface 122 located substantially opposite the upper surface 121. The second body 120 includes a guide portion 125. The second body 120 includes an inner side 123 neighboring the hinge 130 and an outer side 124 located substantially opposite the inner side 123.

The hinge 130 may connect the first body 110 to the second body 120. The hinge 130 includes an upper surface 131 and a lower surface 132 located substantially opposite the upper surface 131. The hinge 130 includes a middle portion 130c located in the middle. The middle portion 130c may be a joint. The hinge 130 includes a first peripheral portion 130a located between the middle portion 130c and the first body 110. The first peripheral portion 130a may be a joint. The hinge 130 includes a second peripheral portion 130b located between the middle portion 130c and the second body 120. The second peripheral portion 130b may be a joint. In an embodiment, as shown in FIG. 1, the hinge 130 has a multi joint structure. Alternatively, the hinge 130 may include a single rotatable shaft. Alternatively, the hinge 130 may include two rotatable shafts. In an embodiment, where the hinge 130 includes two rotatable shafts, the hinge 130 may further include a connecting body (or a third body) which is located between the two rotatable shafts and rotatably fixes the two rotatable shafts to each other. The middle portion 130c of the hinge 130 corresponds to the connecting body or a middle portion of the connecting body.

The plate structure 201 is located or disposed on the hinge structure 100. The plate structure 201 includes a first plate region (or a first plate portion) 210 and a second plate region (or a second plate portion) 220. The plate structure 201 may have a substantially uniform thickness. Alternatively, the plate structure 201 may have various shapes in a thickness direction. The first and second plate regions 210 and 220 may be rigid.

The first plate region 210 is located on the first body 110. The first plate region 210 includes an upper surface 211. The first plate region 210 includes an inner side 213 neighboring the hinge 130 and an outer side 214 located substantially opposite the inner side 213. The first plate region 210 includes a guide portion 215. The guide portion 215 of the first plate region 210 may be coupled to the guide portion 115 of the first body 110 such that the first plate region 210 and the first body 110 slide in substantially opposite directions while guiding each other. In an embodiment, as shown in FIG. 1, the first plate region 210 may be housed or packaged by the first body 110. Alternatively, the first body 110 may be housed or packaged by the first plate region 210.

The second plate region 220 is located on the second body 120. The second plate region 220 includes an upper surface 221. The second plate region 220 includes an inner side 223 neighboring the hinge 130 and an outer side 224 located substantially opposite the inner side 223. The second plate region 220 includes a guide portion 225. The guide portion 225 of the second plate region 220 may be coupled to the guide portion 125 of the second body 120 such that the second plate region 220 and the second body 120 slide in substantially opposite directions while guiding each other. In an embodiment, as shown in FIG. 1, the second plate region 220 may be housed or packaged by the second body 120. Alternatively, the second body 120 may be housed or packaged by the second plate region 220.

In an embodiment, as shown in FIG. 1, the guide portion 215 and the guide portion 225 of the plate structure 201 are inserted into the guide portion 115 and the guide portion 125 of the hinge structure 100, respectively. Alternatively, the foldable device 1001 may have a structure in which the guide portion 115 and the guide portion 125 of the hinge structure 100 are inserted into the guide portion 215 and the guide portion 225 of the plate structure 201, respectively.

The flexible display panel 300 is located on the housing HS. The flexible display panel 300 includes a first region (or a first portion) 310, a second region (or a second portion) 320, and a third region (or a third portion) 330. In an embodiment, a buffer flexible sheet (not shown) may be disposed on or attached to a lower surface of the flexible display panel 300 to planarize an upper surface of the housing HS or to offset irregularities of the upper surface of the housing HS. When an expression that "A" is 'attached' to "B" is used, it means that "A" and "B" are horizontally and vertically fixed to each other with or without at least one layer between "A" and "B."

The first region 310 has a position horizontally fixed to the first plate region 210. The second region 320 has a position horizontally fixed to the second plate region 220. Herein, when "A" is described as having a position horizontally fixed to "B", it includes a case where "A" is directly horizontally fixed to "B" using a possible joining method selected in consideration of the material of "A" and the material of "B" from among various joining methods such as screw joint, adhesive bonding, double-sided adhesive layer bonding and welding, a case where "A" is not directly fixed to "B" but is indirectly horizontally fixed to "B" such that the relative movement between "A" and "B" is difficult due to the equilibrium of force that can be applied by a spring or the like, and a case where "A" and "B" are integrally formed as a single unitary and indivisible unit with each other because the material of "A" and the material of "B" are substantially the same as each other.

The third region 330 is located between the first region 310 and the second region 320. The third region 330 corresponds to the hinge 130. The third region 330 includes a first peripheral portion 330a, a middle portion 330c, and a second peripheral portion 330b. The middle portion 330c is located in the middle of the third region 330. The middle portion 330c of the third region 330 corresponds to the middle portion 130c of the hinge 130. The middle portion 330c of the third region 330 has a position horizontally fixed to the middle portion 130c of the hinge 130. The first peripheral portion 330a is located between the first region 310 and the middle portion 330c. The first peripheral portion 330a of the third region 330 corresponds to the first peripheral portion 130a of the hinge 130. The first peripheral portion 330a of the third region 330 does not have a position horizontally fixed to the first peripheral portion 130a of the hinge 130 or has a position not horizontally fixed to the first peripheral portion 130a of the hinge 130. Herein, when "A" has a position not horizontally fixed to "B," a relative position of "A" with respect to "B" in a direction perpendicular to a thickness direction of "B" is not fixed, or "A" is allowed to move in the direction perpendicular to the thickness direction of "B" while being coupled thereto. The second peripheral portion 330b is located between the second region 320 and the middle portion 330c. The second peripheral portion 330b of the third region 330 corresponds to the second peripheral portion 130b of the hinge 130. The second peripheral portion 330b of the third region 330 does not have a position horizontally fixed to the second peripheral portion 130b of the hinge 130.

In such an embodiment, where the first region 310 of the flexible display panel 300 has a position horizontally fixed to the first plate region 210, the first plate region 210 does not have a position horizontally fixed to the first body 110. Therefore, the first region 310 of the flexible display panel 300 does not have a position horizontally fixed to the first body 110.

In such an embodiment, where the second region 320 of the flexible display panel 300 has a position horizontally fixed to the second plate region 220, the second plate region 220 does not have a position horizontally fixed to the second body 120. Therefore, the second region 320 of the flexible display panel 300 does not have a position horizontally fixed to the second body 120.

The foldable device 1001 may be unfolded by the hinge 130. In an unfolded state, the upper surface 111 of the first body 110, the upper surface 131 of the hinge 130, and the upper surface 121 of the second body 120 are located in a substantially same plane, and the lower surface 112 of the first body 110, the lower surface 132 of the hinge 130 and the lower surface 122 of the second body 120 are located in a substantially same plane. In such an embodiment, an upper surface or a lower surface of the substantially same plane may not be exactly flat. In the unfolded state, the hinge 130 and the outer side 214 of the first plate region 210 are spaced apart by a first distance L1. In the unfolded state, the hinge 130 and the outer side 224 of the second plate region 220 are spaced apart by a second distance L2. The first distance L1 and the second distance L2 may be substantially equal to each other.

The foldable device 1001 may be in-folded by the hinge 130. The hinge 130 may be an in-foldable hinge or an in-out-foldable hinge. In an in-folded state, the upper surface 111 of the first body 110 and the upper surface 121 of the second body 120 face each other, and the lower surface 112 of the first body 110 and the lower surface 122 of the second body 120 are located substantially opposite each other. In the in-folded state, the hinge 130 and the outer side 214 of the first plate region 210 are spaced apart by a third distance L3. The third distance L3 is substantially greater than the first distance L1. In the in-folded state, the hinge 130 and the outer side 224 of the second plate region 220 are spaced apart by a fourth distance L4. The fourth distance L4 is substantially greater than the second distance L2.

In the in-folded state, compressive stress is applied to a portion of an emission surface of the flexible display panel 300 which is located in the third region 330. The hinge 130 and the outer side 214 of the first plate region 210 are spaced apart by the first distance L1 in the unfolded state and spaced apart by the third distance L3 substantially greater than the first distance L1 in the in-folded state. The hinge 130 and the outer side 224 of the second plate region 220 are spaced apart by the second distance L2 in the unfolded state and spaced apart by the fourth distance L4 substantially greater than the second distance L2 in the in-folded state. Therefore, in such an embodiment, the damage to the portion of the emission surface of the flexible display panel 300, which is located in the third region 330, due to the compressive stress, is substantially reduced.

The foldable device 1001 may be out-folded by the hinge 130. The hinge 130 may be an out-foldable hinge or an in-out-foldable hinge. In an out-folded state, the upper surface 111 of the first body 110 and the upper surface 121 of the second body 120 are located substantially opposite each other, and the lower surface 112 of the first body 110 and the lower surface 122 of the second body 120 face each other. In the out-folded state, the hinge 130 and the outer side 214 of the first plate region 210 are spaced apart by a fifth distance L5. The fifth distance L5 is substantially smaller than the first distance L1. In the out-folded state, the hinge 130 and the outer side 224 of the second plate region 220 are spaced apart by a sixth distance L6. The sixth distance L6 is substantially smaller than the second distance L2.

In the out-folded state, tensile stress is applied to the portion of the emission surface of the flexible display panel 300 which is located in the third region 330. The hinge 130 and the outer side 214 of the first plate region 210 are spaced apart by the first distance L1 in the unfolded state and spaced apart by the fifth distance L5 substantially smaller than the first distance L1 in the out-folded state. The hinge 130 and the outer side 224 of the second plate region 220 are spaced apart by the second distance L2 in the unfolded state and spaced apart by the sixth distance L6 substantially smaller than the second distance L2 in the out-folded state. Therefore, in such an embodiment, the damage to the portion of the emission surface of the flexible display panel 300, which is located in the third region 330, due to the tensile stress is substantially reduced.

In the unfolded state, a gap G1 between the first plate region 210 and the second plate region 220 is substantially greater than a width W1 of the hinge 130. Therefore, when the hinge 130 is out-folded, the interference of the first plate region 210 and the second plate region 220 with the out-folding of the third region 330 of the flexible display panel 300 may be reduced.

In the unfolded state, the upper surface 211 of the first plate region 210, the upper surface 131 of the hinge 130, and the upper surface 221 of the second plate region 220 are located in a substantially same plane. Therefore, in the unfolded state, the lower surface of the flexible display panel 300 may be effectively maintained substantially flat, thereby allowing an upper surface of the flexible display panel 300 to be substantially flat.

In an embodiment, where the upper surface 211 of the first plate region 210, the upper surface 131 of the hinge 130 and the upper surface 221 of the second plate region 220 are not located in a substantially same plane in the unfolded state, a height compensation layer may be located on at least one selected from the group of the upper surface 211 of the first plate region 210, the upper surface 131 of the hinge 130 and the upper surface 221 of the second plate region 220 to allow the lower surface of the flexible display panel 300 to be substantially flat in the unfolded state. The height compensation layer may be a single-sided adhesive layer including at least one film. Alternatively, the height compensation layer may be a double-sided adhesive layer including at least one film. Since the lower surface of the flexible display panel 300 is maintained substantially flat in the unfolded state, the upper surface of the flexible display panel 300 may also be maintained substantially flat.

In the unfolded state, the outer side 114 of the first body 110 is located outside the outer side 214 of the first plate region 210, and the outer side 124 of the second body 120 is located outside the outer side 224 of the second plate region 220. Therefore, the flexible display panel 300 may be effectively protected from impact that may be applied from the left side L and the right side R of the foldable device 1001. In such an embodiment, a length of a region in which the guide portion 215 of the first plate region 210 and the guide portion 115 of the first body 110 are coupled to each other and a length of a region in which the guide portion 225 of the second plate region 220 and the guide portion 125 of the second body 120 are coupled to each other may be substantially large to stably couple the first plate region 210 and the first body 110 to each other and to stably couple the second plate region 220 and the second body 120 to each other.

In an embodiment, a first rib structure may be defined or formed between a lower surface of the first plate region 210 of the plate structure 201 and the upper surface 111 of the first body 110 to effectively prevent the first plate region 210 of the plate structure 201 from sagging. In such an embodiment, a second rib structure may be defined or formed between a lower surface of the second plate region 220 of the plate structure 201 and the upper surface 121 of the second body 120 to effectively prevent the second plate region 220 of the plate structure 201 from sagging.

Figure 2:
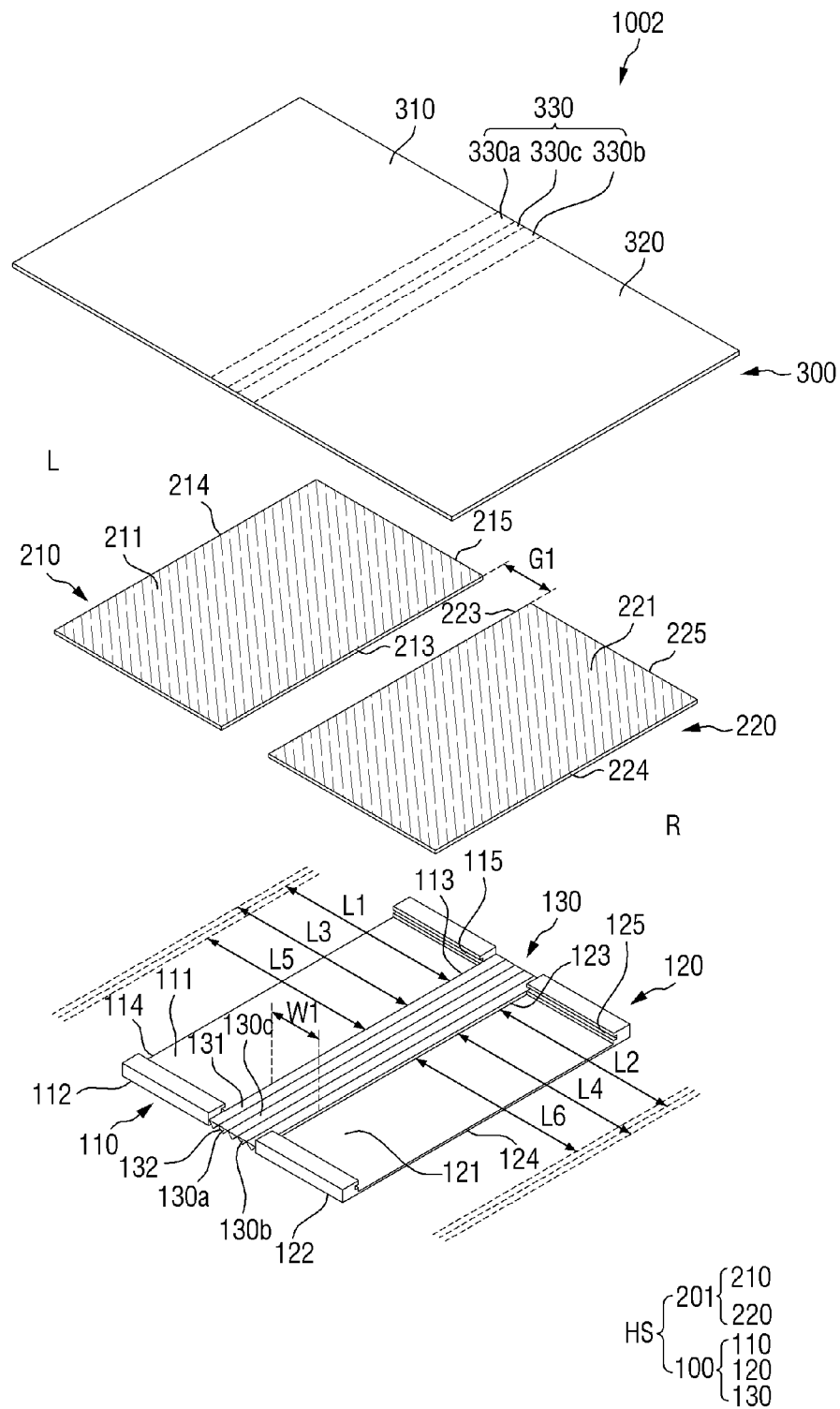
FIG. 2 is an exploded perspective view of a foldable device according to an alternative embodiment.

FIG. 2 is an exploded perspective view of a foldable device 1002 according to an alternative embodiment. Hereinafter, for convenience of description, any repetitive detailed description of elements and features substantially identical to those of the foldable device 1001 of FIG. 1 will be omitted.

Referring to FIG. 2, in the unfolded state, an outer side 114 of a first body 110 may be located inside an outer side 214 of a first plate region 210, and an outer side 124 of a second body 120 may be located inside an outer side 224 of a second plate region 220.

Therefore, in such an embodiment, the width of the foldable device 1002 may be reduced, thereby improving portability. In such an embodiment, a length of a region in which a guide portion 215 of the first plate region 210 and a guide portion 115 of the first body 110 are coupled to each other and a length of a region in which a guide portion 225 of the second plate region 220 and a guide portion 125 of the second body 120 are coupled to each other may be substantially small such that the force used to fold or unfold a hinge 130 may be reduced.

Alternatively, the first body 110 may be housed or packaged by the first plate region 210. In such an embodiment, a plate structure 201 may further include a first cover (not shown) which prevents the exposure of the first body 110 and is coupled to the first plate region 210. The first cover may be integrally formed as a single unitary and indivisible unit with the first plate region 210.

Alternatively, the second body 120 may be housed or packaged by the second plate region 220. In such an embodiment, the plate structure 201 may further include a second cover (not shown) which prevents the exposure of the second body 120 and is coupled to the second plate region 220. The second cover may be integrally formed as a single unitary and indivisible unit with the second plate region 220.

Figure 3:
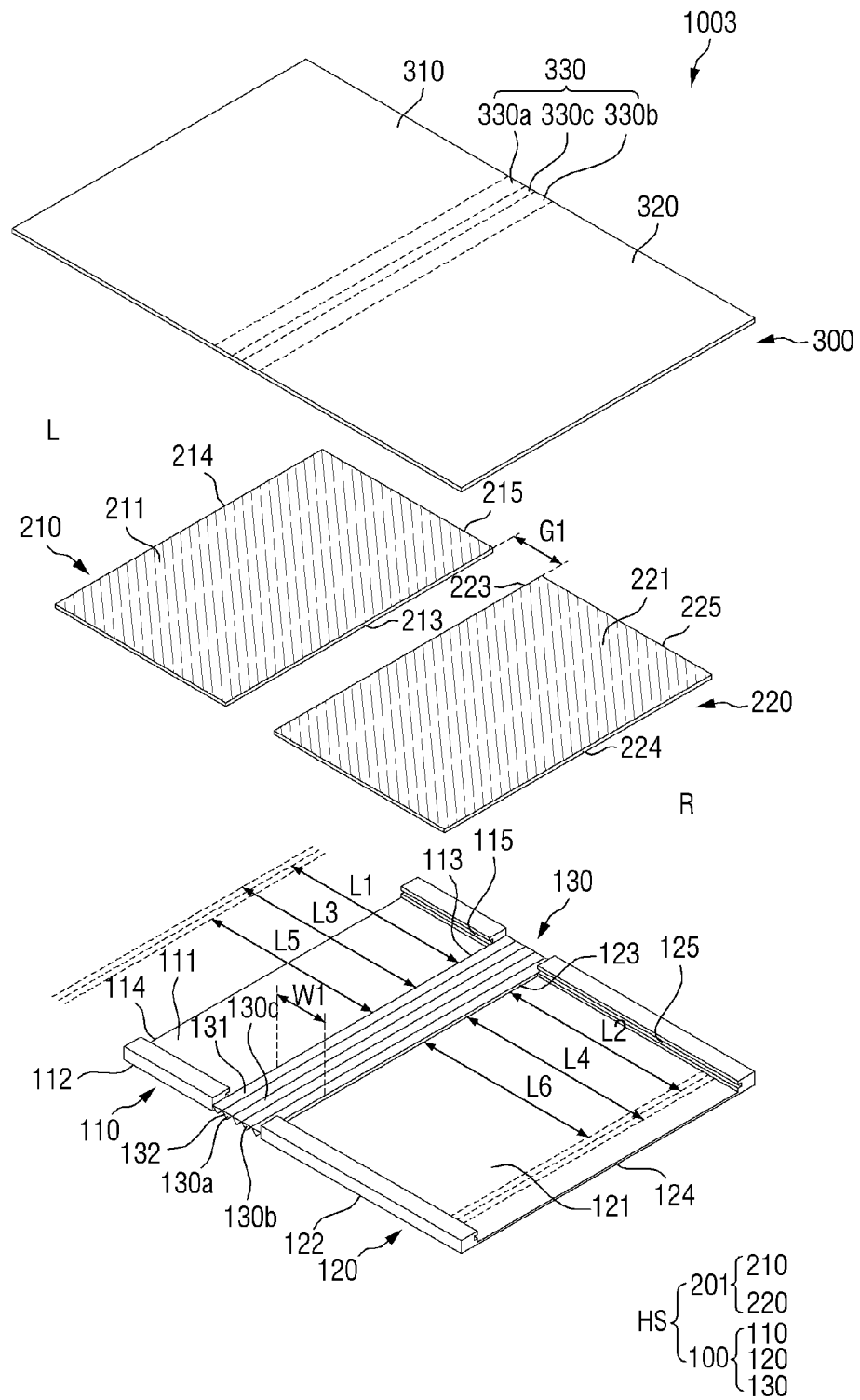
FIG. 3 is an exploded perspective view of a foldable device according to another alternative embodiment.

FIG. 3 is an exploded perspective view of a foldable device 1003 according to another alternative embodiment. Hereinafter, for convenience of description, any repetitive detailed description of elements and features substantially identical to those of the foldable device 1001 of FIG. 1 will be omitted.

Referring to FIG. 3, in the unfolded state, an outer side 114 of a first body 110 is located inside an outer side 214 of a first plate region 210, and an outer side 124 of a second body 120 is located outside an outer side 224 of a second plate region 220.

In such an embodiment, since the outer side 114 of the first body 110 is located inside the outer side 214 of the first plate region 210 in the unfolded state, the width of the foldable device 1003 may be reduced, thereby improving portability.

In such an embodiment, since the outer side 114 of the first body 110 is located inside the outer side 214 of the first plate region 210 in the unfolded state, a length by which a guide portion 215 of the first plate region 210 and a guide portion 115 of the first body 110 are coupled to each other may be substantially small such that the force used to fold or unfold a hinge 130 may be reduced.

In such an embodiment, since only the outer side 124 of the second body 120 is located outside the outer side 224 of the second plate region 220, the outer side 224 of the second plate region 220 may protect a flexible display panel 300 from impact that may be applied from a right side R of the foldable device 1003.

In such an embodiment, since the outer side 124 of the second body 120 is located outside the outer side 224 of the second plate region 220, a length by which a guide portion 225 of the second plate region 220 and a guide portion 125 of the second body 120 are coupled to each other may be made large to stably couple the second plate region 220 and the second body 120.

Alternatively, the first body 110 may be housed or packaged by the first plate region 210. In such an embodiment, a plate structure 201 may further include a first cover which prevents the exposure of the first body 110 and is coupled to the first plate region 210. The first cover may be integrally formed as a single unitary and indivisible unit with the first plate region 210.

Figure 4:
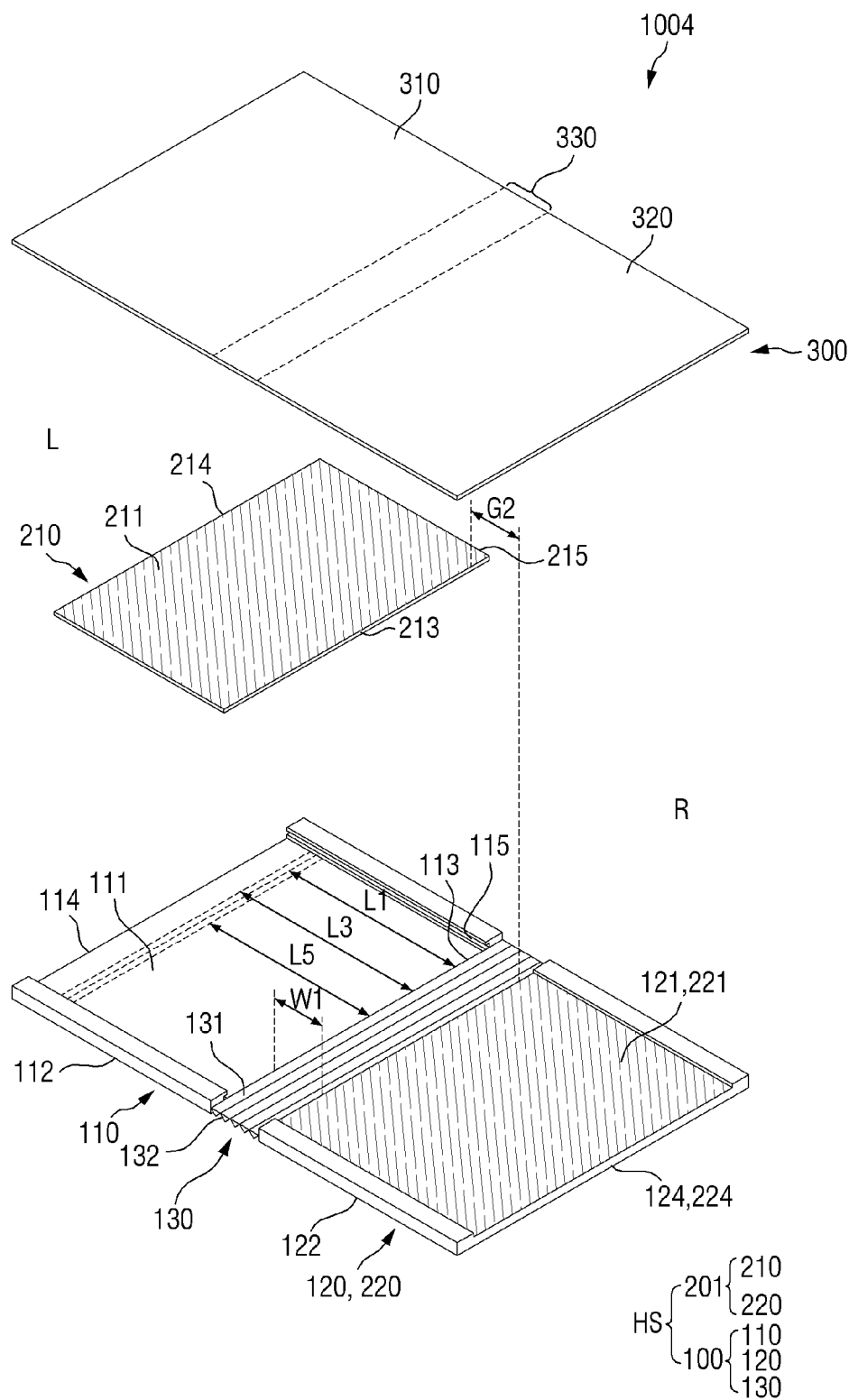
FIG. 4 is an exploded perspective view of a foldable device according to another alternative embodiment.

FIG. 4 is an exploded perspective view of a foldable device 1004 according to another alternative embodiment. Hereinafter, for convenience of description, any repetitive detailed description of elements and features substantially identical to those of the foldable device 1001 of FIG. 1 will be omitted.

Referring to FIG. 4, when the second plate region 220 shown in FIG. 1 has a position horizontally fixed to the second body 120 shown in FIG. 1, the foldable device 1004 may be implemented. In such an embodiment, the second plate region 220 shown in FIG. 1 may be directly horizontally fixed to the second body 120 shown in FIG. 1 by adhesive bonding or double-sided adhesive layer bonding. Alternatively, the second plate region 220 shown in FIG. 1 may be integrally formed as a single unitary and indivisible unit with the second body 120 shown in FIG. 1. In such an embodiment, the upper surface 221 of the second plate region 220 shown in FIG. 1 corresponds to an upper surface 121 of the second body 120 shown in FIG. 1.

A third region 330 of a flexible display panel 300 does not have a position horizontally fixed to a hinge 130.

In the unfolded state, a gap G2 between a first plate region 210 and the second body 120 is substantially greater than a width W1 of the hinge 130. Therefore, when the hinge 130 is out-folded, the interference of the first plate region 210 with the out-folding of the third region 330 of the flexible display panel 300 may be reduced.

Figure 5:
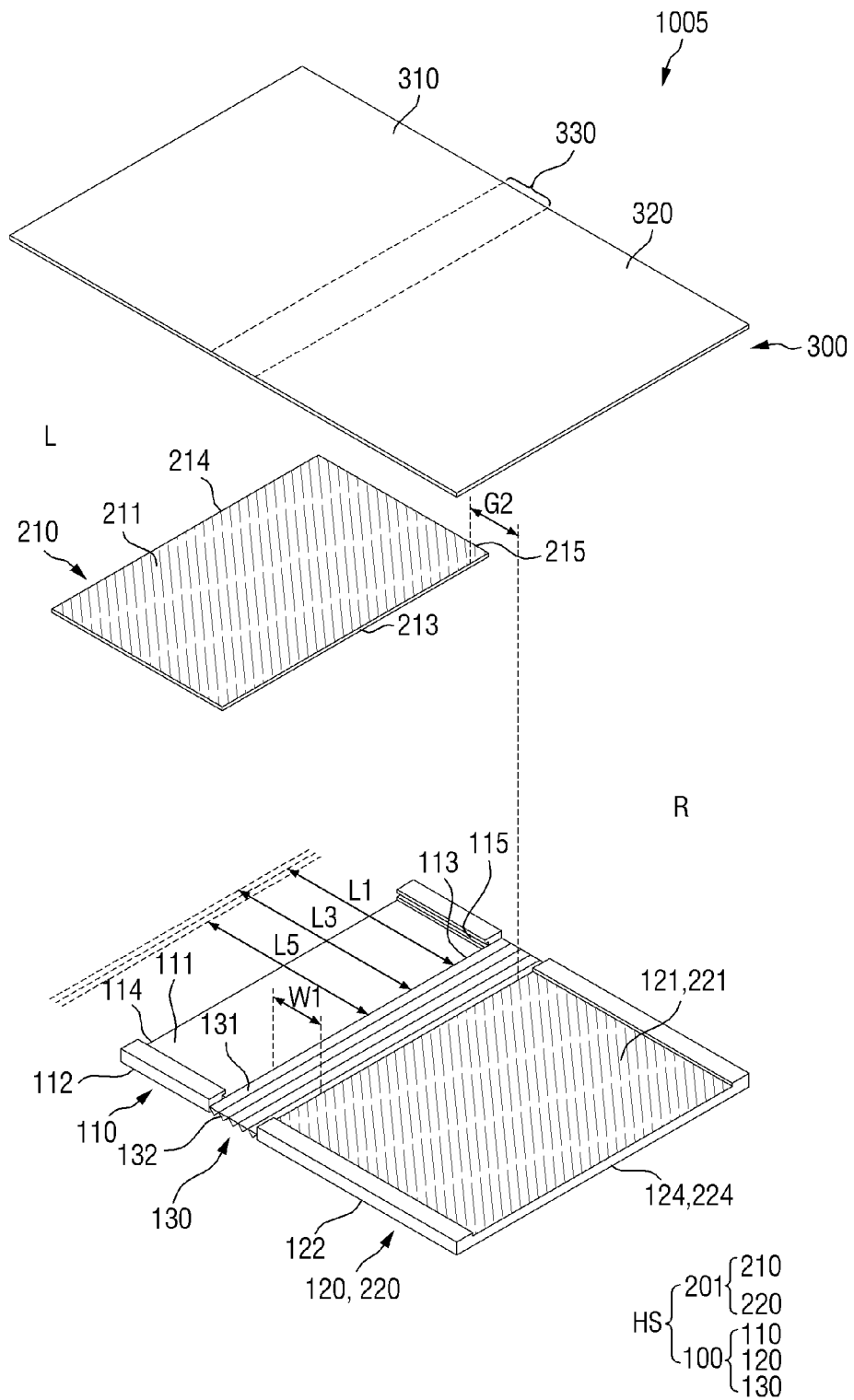
FIG. 5 is an exploded perspective view of a foldable device according to another alternative embodiment.

FIG. 5 is an exploded perspective view of a foldable device 1005 according to another alternative embodiment. Hereinafter, for convenience of description, any repetitive detailed description of elements and features substantially identical to those of the foldable device 1004 of FIG. 4 will be omitted.

Referring to FIG. 5, in the unfolded state, an outer side 114 of a first body 110 is located inside an outer side 214 of a first plate region 210. Therefore, the width of the foldable device 1005 may be reduced, thereby improving portability. In such an embodiment, a length by which a guide portion 215 of the first plate region 210 and a guide portion 115 of the first body 110 are coupled to each other may be substantially small such that the force used to fold or unfold a hinge 130 may be reduced.

Alternatively, the first body 110 may be housed or packaged by the first plate region 210. In such an embodiment, a plate structure 201 may further include a first cover which prevents the exposure of the first body 110 and is coupled to the first plate region 210. The first cover may be integrally formed as a single unitary and indivisible unit with the first plate region 210.

Figure 6:
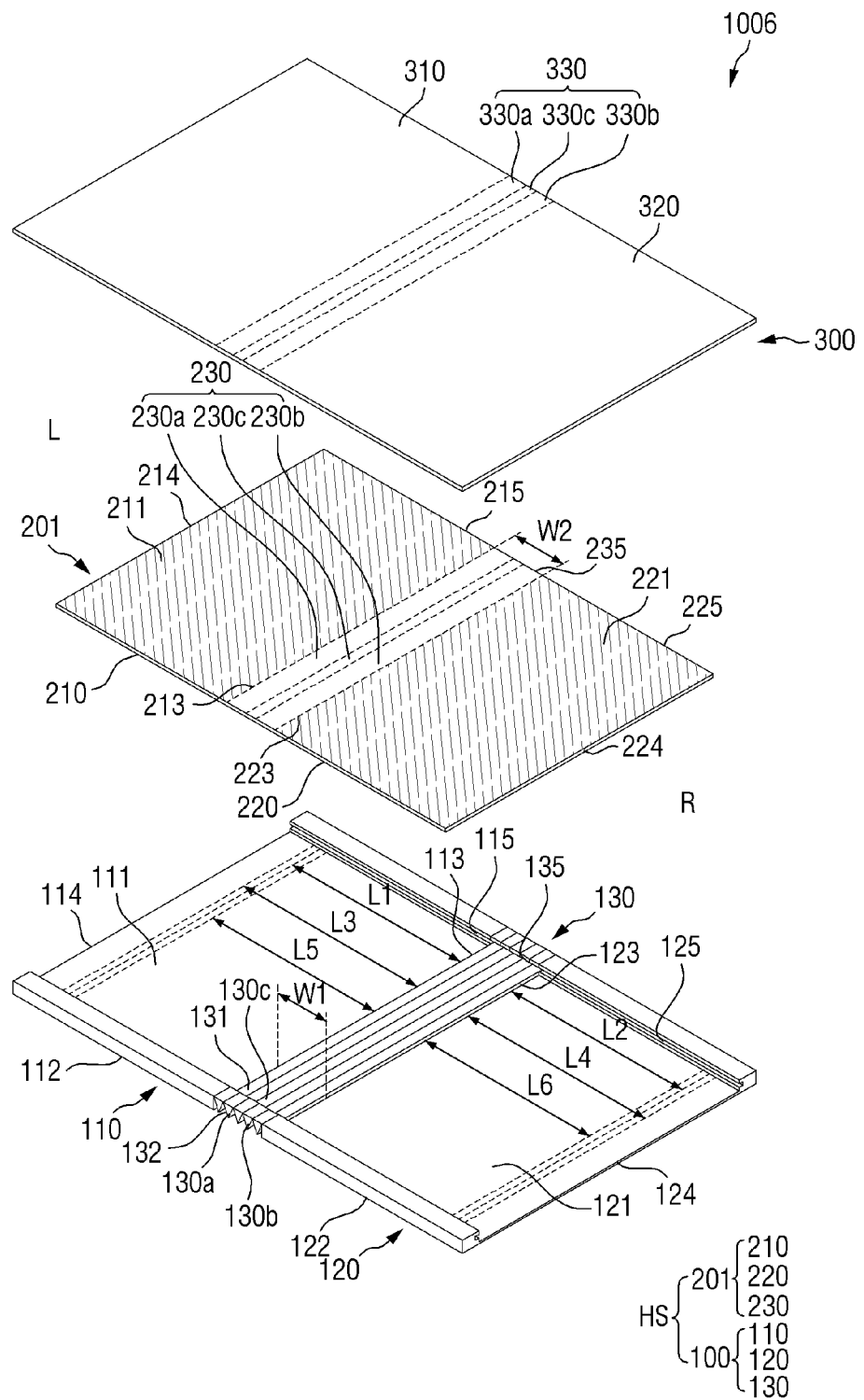
FIG. 6 is an exploded perspective view of a foldable device according to another alternative embodiment.

FIG. 6 is an exploded perspective view of a foldable device 1006 according to another alternative embodiment. Hereinafter, for convenience of description, any repetitive detailed description of elements and features substantially identical to those of the foldable device 1001 of FIG. 1 will be omitted.

Referring to FIG. 6, a hinge 130 includes a guide portion 135. The guide portion 135 of the hinge 130 is located between a guide portion 115 of a first body 110 and a guide portion 125 of a second body 120. The guide portion 135 of the hinge 130 may be connected to the guide portion 115 of the first body 110 and the guide portion 125 of the second body 120.

A plate structure 201 is located on a hinge structure 100. The plate structure 201 includes a first plate region 210, a second plate region 220, and a third plate region 230.

The first plate region 210 corresponds to the first body 110. The first plate region 210 includes an inner side 213 connected to the third plate region 230 and an outer side 214 located substantially opposite the inner side 213. The first plate region 210 includes a guide portion 215. The guide portion 215 of the first plate region 210 may be coupled to the guide portion 115 of the first body 110 such that the first plate region 210 and the first body 110 slide in substantially opposite directions while guiding each other.

The second plate region 220 corresponds to the second body 120. The second plate region 220 includes an inner side 223 connected to the third plate region 230 and an outer side 224 located substantially opposite the inner side 223. The second plate region 220 includes a guide portion 225. The guide portion 225 of the second plate region 220 may be coupled to the guide portion 125 of the second body 120 such that the second plate region 220 and the second body 120 slide in substantially opposite directions while guiding each other.

The third plate region 230 is located between the first plate region 210 and the second plate region 220. The third plate region 230 corresponds to the hinge 130. The third plate region 230 has lower rigidity than the first and second plate regions 210 and 220. In one embodiment, for example, the third plate region 230 may be flexible. In one embodiment, for example, the first and second plate regions 210 and 220 may be rigid, and the third plate region 230 may be flexible.

The third plate region 230 includes a first peripheral portion 230a, a middle portion 230c, and a second peripheral portion 230b. The middle portion 230c is located in the middle of the third plate region 230. The middle portion 230c of the third plate region 230 has a position horizontally fixed to a middle portion 130c of the hinge 130. The first peripheral portion 230a is located between the first plate region 210 and the middle portion 230c. The first peripheral portion 230a of the third plate region 230 does not have a position horizontally fixed to a first peripheral portion 130a of the hinge 130. The second peripheral portion 230b is located between the second plate region 220 and the middle portion 230c. The second peripheral portion 230b of the third plate region 230 does not have a position horizontally fixed to a second peripheral portion 130b of the hinge 130.

The third plate region 230 includes a guide portion 235. The guide portion 235 of the third plate region 230 is coupled to the guide portion 135 of the hinge 130 such that the first peripheral portion 230a of the third plate region 230 of the plate structure 201 and the first peripheral portion 130a of the hinge 130 slide in substantially opposite direction while guiding each other and that the second peripheral portion 230b of the third plate region 230 of the plate structure 201 and the second peripheral portion 130b of the hinge 130 slide in substantially opposite direction while guiding each other.

A flexible display panel 300 is located on a housing HS. The flexible display panel 300 includes a first region 310, a second region 320, and a third region 330. In an embodiment, a buffer flexible sheet (not shown) may be attached to a lower surface of the flexible display panel 300 to offset irregularities that an upper surface of the housing HS may have.

In an embodiment, the first region 310, the second region 320 and the third region 330 of the flexible display panel 300 have positions horizontally fixed to the first plate region 210, the second plate region 220 and the third plate region 230 of the plate structure 201, respectively. A first peripheral portion 330a, a middle portion 330c and a second peripheral portion 330b of the third region 330 of the flexible display panel 300 have positions horizontally fixed to the first peripheral portion 230a, the middle portion 230c and the second peripheral portion 230b of the third plate region 230 of the plate structure 201, respectively.

In such an embodiment, where the first region 310 of the flexible display panel 300 has a position horizontally fixed to the first plate region 210 of the plate structure 201, the first plate region 210 of the plate structure 201 does not have a position horizontally fixed to the first body 110. Therefore, the first region 310 of the flexible display panel 300 does not have a position horizontally fixed to the first body 110.

In such an embodiment, where the second region 320 of the flexible display panel 300 has a position horizontally fixed to the second plate region 220 of the plate structure 201, the second plate region 220 of the plate structure 201 does not have a position horizontally fixed to the second body 120. Therefore, the second region 320 of the flexible display panel 300 does not have a position horizontally fixed to the second body 120.

In such an embodiment, where the first peripheral portion 330a of the third region 330 of the flexible display panel 300 has a position horizontally fixed to the first peripheral portion 230a of the third plate region 230 of the plate structure 201, the first peripheral portion 230a of the third plate region 230 of the plate structure 201 does not have a position horizontally fixed to the first peripheral portion 130a of the hinge 130. Therefore, the first peripheral portion 330a of the third region 330 of the flexible display panel 300 does not have a position horizontally fixed to the first peripheral portion 130a of the hinge 130.

In such an embodiment, where the second peripheral portion 330b of the third region 330 of the flexible display panel 300 has a position horizontally fixed to the second peripheral portion 230b of the third plate region 230 of the plate structure 201, the second peripheral portion 230b of the third plate region 230 of the plate structure 201 does not have a position horizontally fixed to the second peripheral portion 130b of the hinge 130. Therefore, the second peripheral portion 330b of the third region 330 of the flexible display panel 300 does not have a position horizontally fixed to the second peripheral portion 130b of the hinge 130.

The middle portion 330c of the third region 330 of the flexible display panel 300 has a position horizontally fixed to the middle portion 230c of the third plate region 230 of the plate structure 201, and the middle portion 230c of the third plate region 230 of the plate structure 201 also has a position horizontally fixed to the middle portion 130c of the hinge 130. Therefore, the middle portion 330c of the third region 330 of the flexible display panel 300 has a position horizontally fixed to the hinge 130.

In an embodiment, where the hinge 130 is out-foldable, a width W2 of the third plate region 230 of the plate structure 201 in the unfolded state is substantially greater than a width W1 of the hinge 130 in the unfolded state. Therefore, when the hinge 130 is out-folded, the interference of the first plate region 210 and the second plate region 220 with the out-folding of the third region 330 of the flexible display panel 300 may be reduced.

Figure 7:
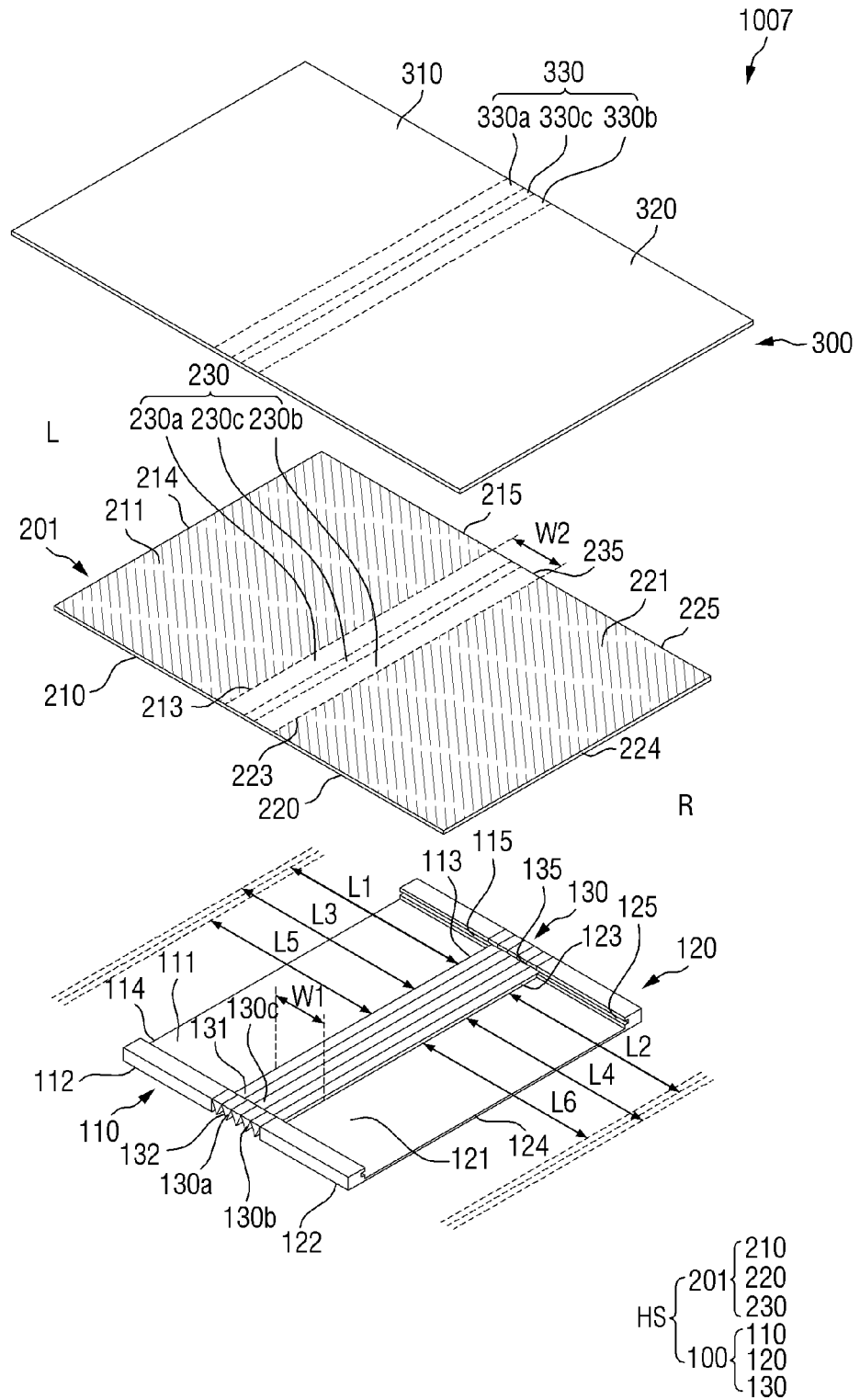
FIG. 7 is an exploded perspective view of a foldable device according to another alternative embodiment.

FIG. 7 is an exploded perspective view of a foldable device 1007 according to another alternative embodiment. Hereinafter, for convenience of description, any repetitive detailed description of elements and features substantially identical to those of the foldable device 1006 of FIG. 6 will be omitted.

Referring to FIG. 7, in the unfolded state, an outer side 114 of a first body 110 is located inside an outer side 214 of a first plate region 210 of a plate structure 201, and an outer side 124 of a second body 120 is located inside an outer side 224 of a second plate region 220 of the plate structure 201.

Therefore, the width of the foldable device 1007 may be reduced, thereby improving portability. In such an embodiment, a length by which a guide portion 215 of the first plate region 210 of the plate structure 201 and a guide portion 115 of the first body 110 are coupled to each other and a length by which a guide portion 225 of the second plate region 220 and a guide portion 125 of the second body 120 are coupled to each other may be substantially small such that the force used to fold or unfold a hinge 130 may be reduced.

Alternatively, the first body 110 may be housed or packaged by the first plate region 210. In such an embodiment, the plate structure 201 may further include a first cover which prevents the exposure of the first body 110 and is coupled to the first plate region 210. The first cover may be integrally formed as a single unitary and indivisible unit with the first plate region 210.

Alternatively, the second body 120 may be housed or packaged by the second plate region 220. In such an embodiment, the plate structure 201 may further include a second cover which prevents the exposure of the second body 120 and is coupled to the second plate region 220. The second cover may be integrally formed as a single unitary and indivisible unit with the second plate region 220.

Figure 8:
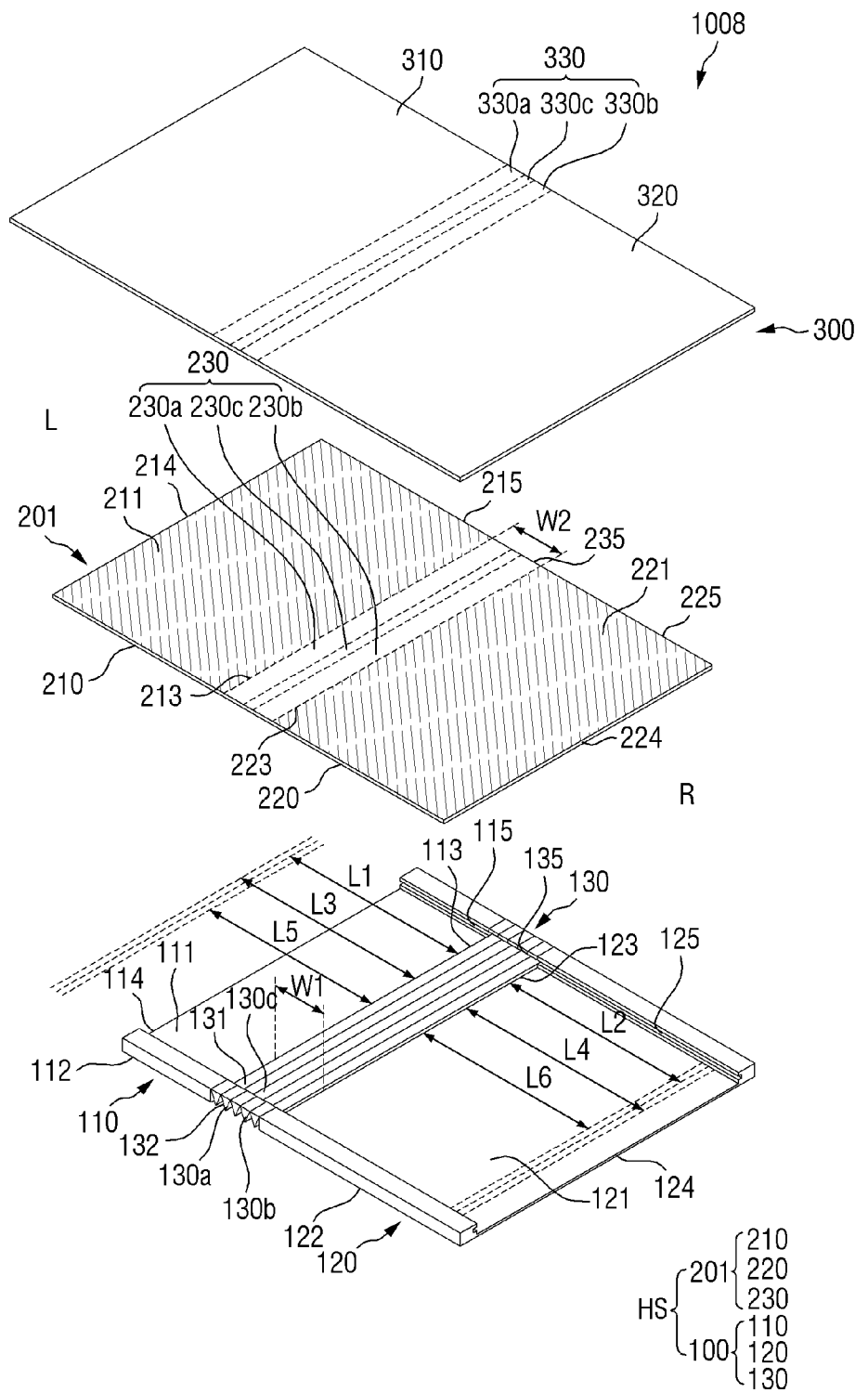
FIG. 8 is an exploded perspective view of a foldable device according to another alternative embodiment.

FIG. 8 is an exploded perspective view of a foldable device 1008 according to another alternative embodiment. Hereinafter, for convenience of description, any repetitive detailed description of elements and features substantially identical to those of the foldable device 1006 of FIG. 6 will be omitted.

Referring to FIG. 8, in the unfolded state, an outer side 114 of a first body 110 is located inside an outer side 214 of a first plate region 210 of a plate structure 201, and an outer side 124 of a second body 120 is located outside an outer side 224 of a second plate region 220 of the plate structure 201.

In such an embodiment, since the outer side 114 of the first body 110 is located inside the outer side 214 of the first plate region 210 of the plate structure 201 in the unfolded state, the width of the foldable device 1008 may be reduced, thereby improving portability.

In such an embodiment, since the outer side 114 of the first body 110 is located inside the outer side 214 of the first plate region 210 of the plate structure 201 in the unfolded state, a length by which a guide portion 215 of the first plate region 210 of the plate structure 201 and a guide portion 115 of the first body 110 are coupled to each other may be substantially small such that the force used to fold or unfold a hinge 130 may be reduced.

In such an embodiment, since the outer side 124 of the second body 120 is located outside the outer side 224 of the second plate region 220 of the plate structure 201, the outer side 224 of the second plate region 220 of the plate structure 201 may protect a flexible display panel 300 from impact that may be applied from a right side R of the foldable device 1008.

In such an embodiment, since the outer side 124 of the second body 120 is located outside the outer side 224 of the second plate region 220 of the plate structure 201, a length by which a guide portion 225 of the second plate region 220 of the plate structure 201 and a guide portion 125 of the second body 120 are coupled to each other may be substantially large to stably couple the second plate region 220 of the plate structure 201 and the second body 120.

Alternatively, the first body 110 may be housed or packaged by the first plate region 210. In such an embodiment, the plate structure 201 may further include a first cover which prevents the exposure of the first body 110 and is coupled to the first plate region 210. The first cover may be integrally formed as a single unitary and indivisible unit with the first plate region 210.

Figure 9:
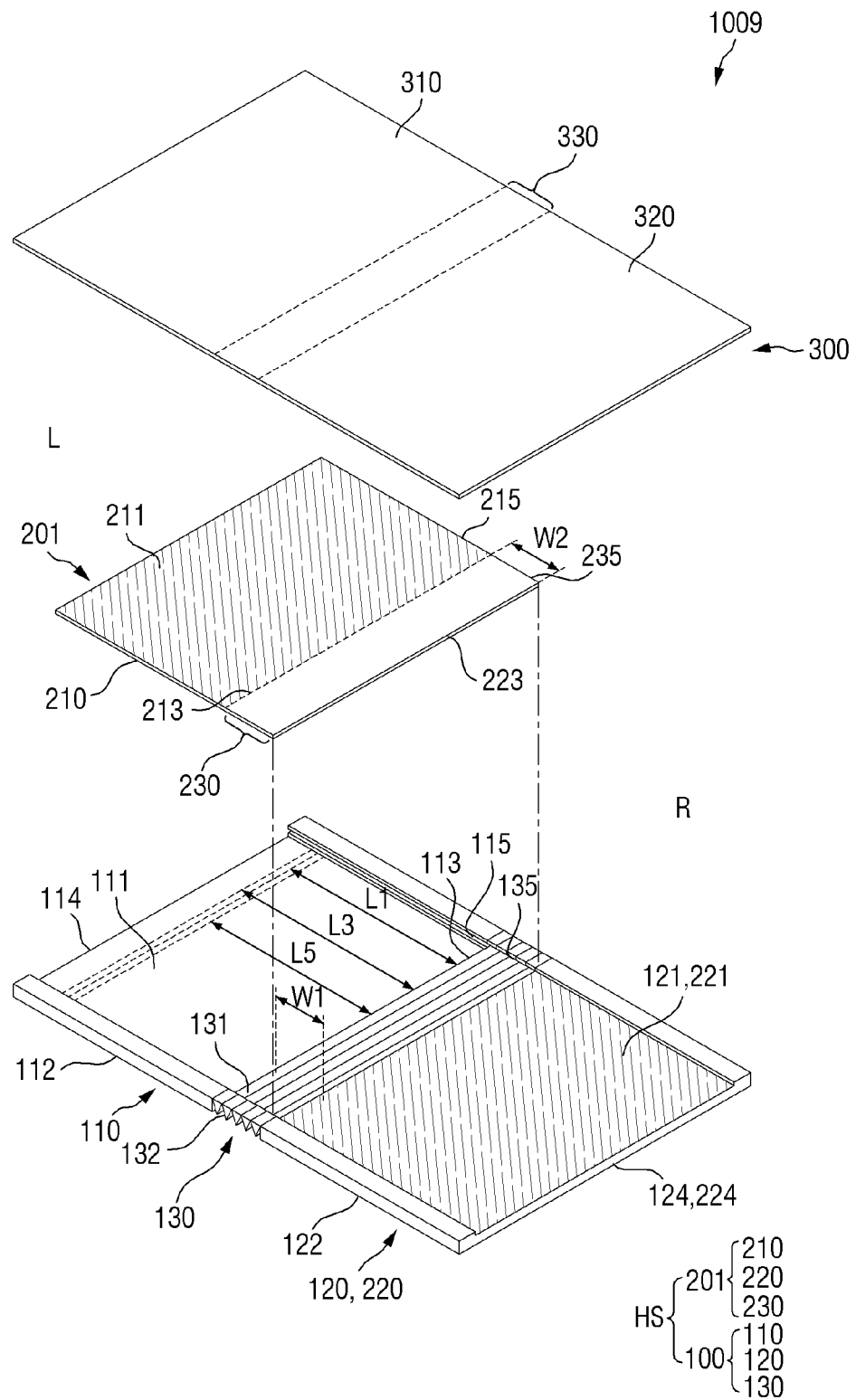
FIG. 9 is an exploded perspective view of a foldable device according to another alternative embodiment.

FIG. 9 is an exploded perspective view of a foldable device 1009 according to another alternative embodiment. Hereinafter, for convenience of description, any repetitive detailed description of elements and features substantially identical to those of the foldable device 1006 of FIG. 6 will be omitted.

Referring to FIG. 9, when the second plate region 220 of the plate structure 201 shown in FIG. 6 has a position horizontally fixed to a second body 120 shown in FIG. 6, the foldable device 1006 may be implemented. In such an embodiment, the second plate region 220 of the plate structure 201 shown in FIG. 6 may be directly horizontally fixed to the second body 120 shown in FIG. 6 by adhesive bonding or double-sided adhesive layer bonding. Alternatively, the second plate region 220 of the plate structure 201 shown in FIG. 6 may be integrally formed as a single unitary and indivisible unit with the second body 120 shown in FIG. 6. In such an embodiment, the upper surface 221 of the second plate region 220 of the plate structure 201 shown in FIG. 6 corresponds to an upper surface 121 of the second body 120 shown in FIG. 6.

A third region 330 of a flexible display panel 300 does not have a position horizontally fixed to a hinge 130.

In an embodiment where the hinge 130 is out-foldable, a width W2 of a third plate region 230 of the plate structure 201 in the unfolded state is substantially greater than a width W1 of the hinge 130 in the unfolded state. Therefore, when the hinge 130 is out-folded, the interference of a first plate region 210 of the plate structure 201 with the out-folding of the third region 330 of the flexible display panel 300 may be reduced.

Figure 10:
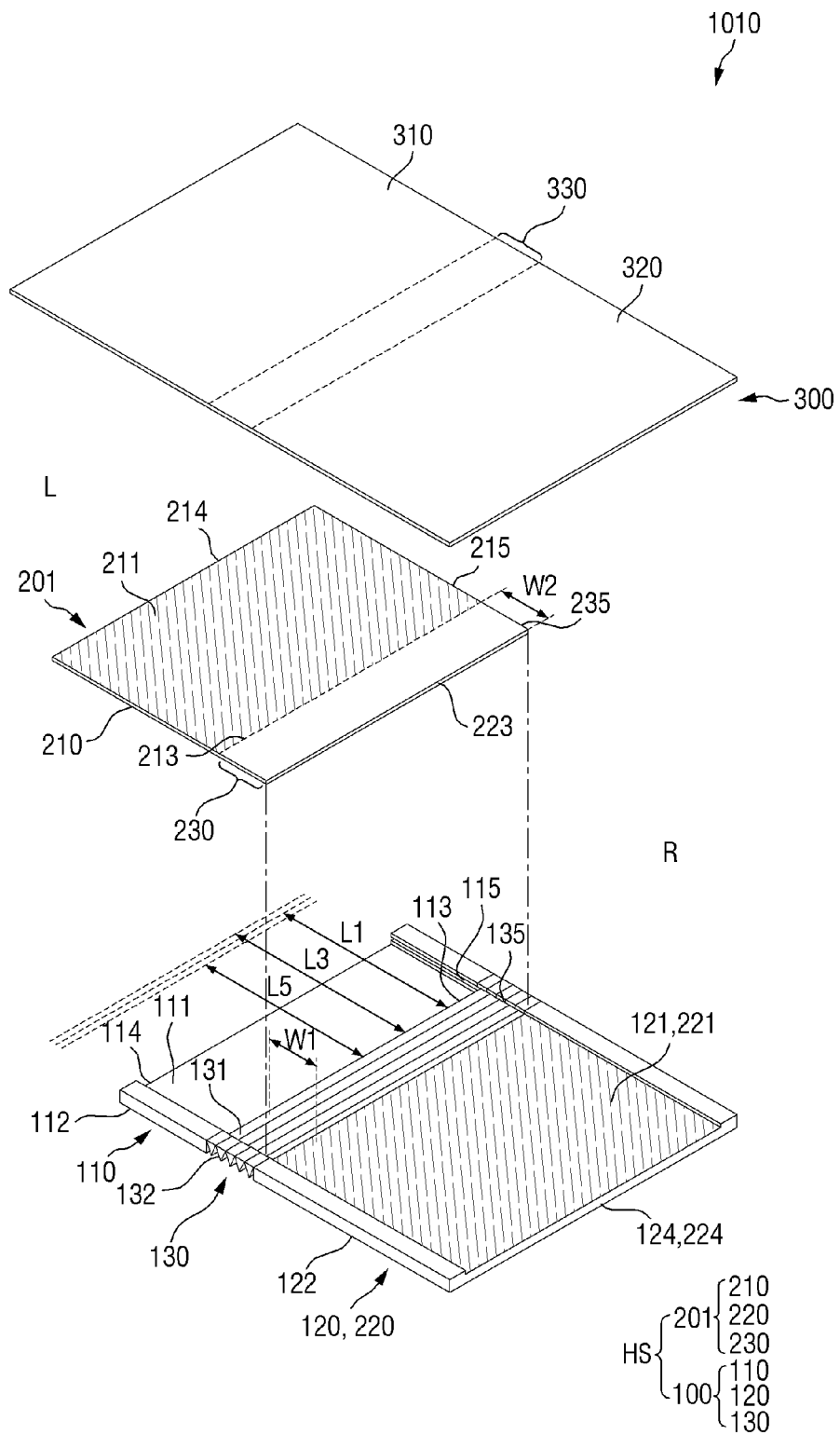
FIG. 10 is an exploded perspective view of a foldable device according to another alternative embodiment.

FIG. 10 is an exploded perspective view of a foldable device 1010 according to another alternative embodiment. Hereinafter, for convenience of description, any repetitive detailed description of elements and features substantially identical to those of the foldable device 1009 of FIG. 9 will be omitted.

Referring to FIG. 10, in the unfolded state, an outer side 114 of a first body 110 is located inside an outer side 214 of a first plate region 210 of a plate structure 201.

Therefore, the width of the foldable device 1010 may be reduced, thereby improving portability. In addition, a length by which a guide portion 215 of the first plate region 210 of the plate structure 201 and a guide portion 115 of the first body 110 are coupled to each other may be substantially small such that the force used to fold or unfold a hinge 130 may be reduced.

Alternatively, the first body 110 may be housed or packaged by the first plate region 210. In such an embodiment, the plate structure 201 may further include a first cover which prevents the exposure of the first body 110 and is coupled to the first plate region 210. The first cover may be integrally formed as a single unitary and indivisible unit with the first plate region 210.

Figure 11:
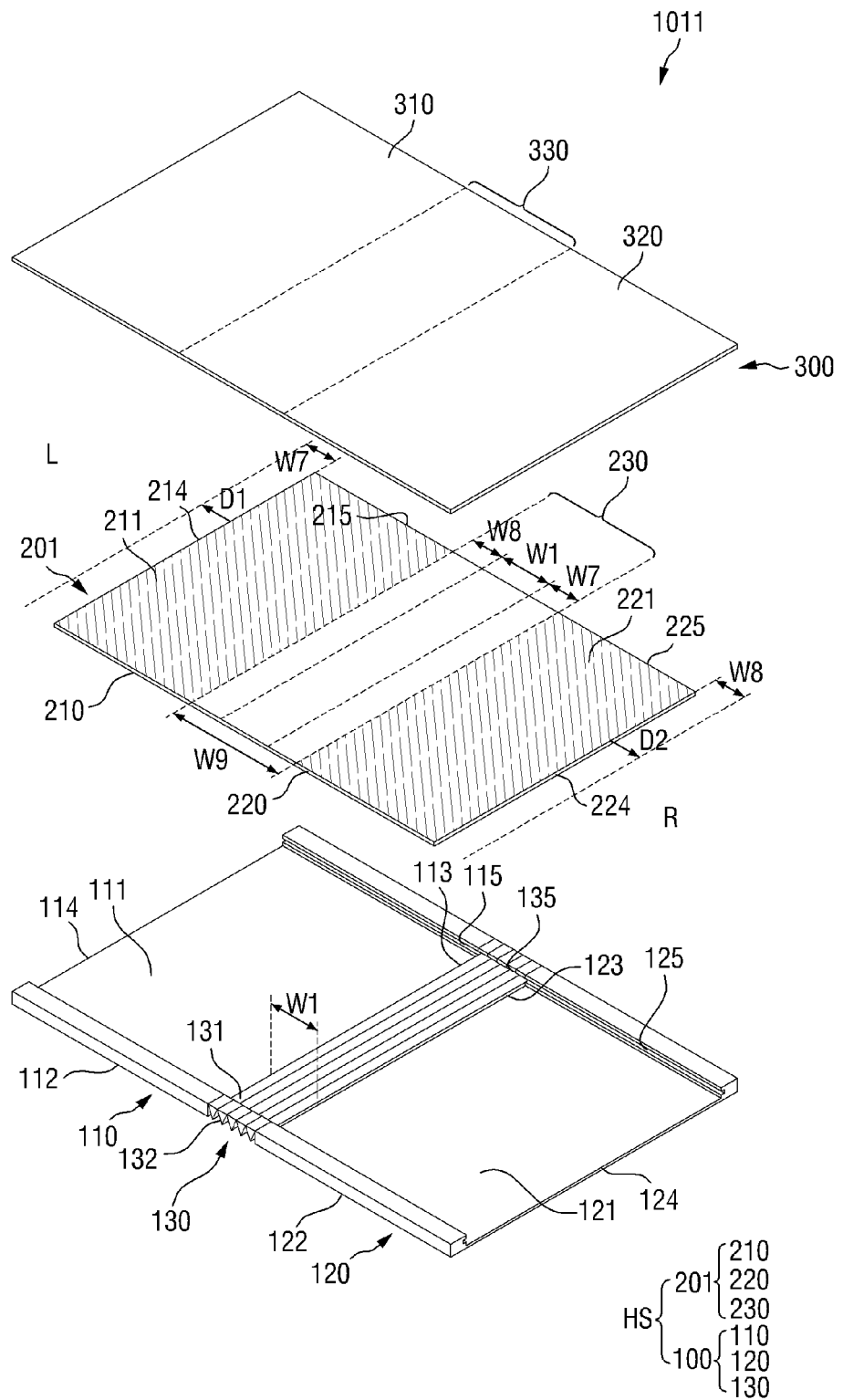
FIG. 11 is an exploded perspective view of a foldable device according to another alternative embodiment.

FIG. 11 is an exploded perspective view of a foldable device 1011 according to another alternative embodiment.

Hereinafter, for convenience of description, any repetitive detailed description of elements and features substantially identical to those of the foldable device 1006 of FIG. 6 will be omitted.

Referring to FIG. 11, a first plate region 210 of a plate structure 201 does not have a position horizontally fixed to a first body 110. A second plate region 220 of the plate structure 201 does not have a position horizontally fixed to a second body 120. A third plate region 230 of the plate structure 201 does not have a position horizontally fixed to a hinge 130.

The hinge 130 may be folded after the plate structure 201 moves a predetermined distance W7 in a first direction D1. In such an embodiment, the hinge 130 may be, for example, out-folded. The hinge 130 may be folded after the plate structure 201 moves a predetermined distance W8 in a second direction D2. The second direction D2 may be substantially opposite to the first direction D1. In such an embodiment, the hinge 130 may be, for example, out-folded.

In the unfolded state, a width W9 of the third plate region 230 of the plate structure 201 is substantially equal to or substantially greater than the sum of the predetermined distance W7, a width W1 and the predetermined distance W8. Therefore, in such an embodiment, even when the hinge 130 is folded after the plate structure 201 moves the predetermined distance W7 in the first direction D1, the interference of the second plate region 220 of the plate structure 201 with the out-folding of a third region 330 of a flexible display panel 300 may be reduced. In such an embodiment, even when the hinge 130 is folded after the plate structure 201 moves the predetermined distance W8 in the second direction D2, the interference of the first plate region 210 of the plate structure 201 with the out-folding of the third region 330 of the flexible display panel 300 may be reduced.

Figure 12:
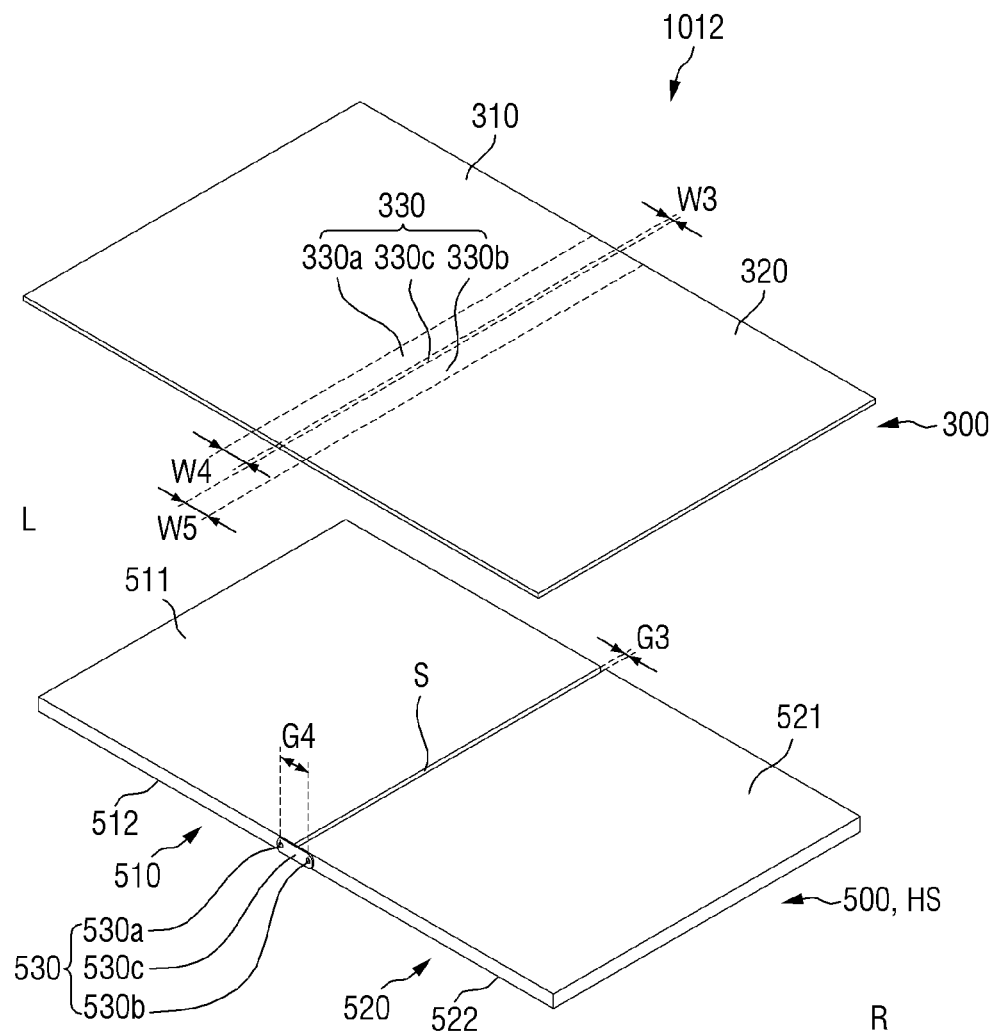
FIGS. 12 and 13 show a foldable device according to another alternative embodiment.
Figure 13:
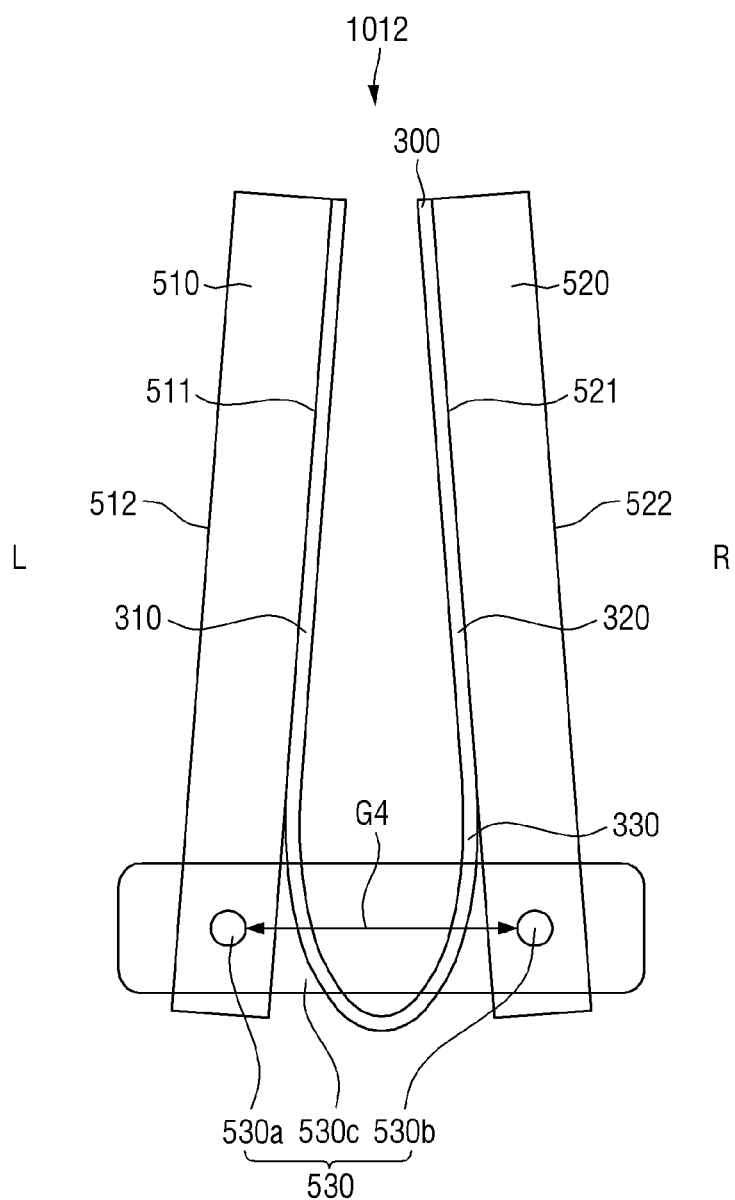

FIGS. 12 and 13 show a foldable device 1012 according to another alternative embodiment.

Referring to FIG. 12, the foldable device 1012 includes a housing HS and a flexible display panel 300. The housing HS corresponds to a hinge structure 500. The hinge structure 500 includes a first body 510, a second body 520, and a hinge 530. The first body 510 includes an upper surface 511 and a lower surface 512 located substantially opposite the upper surface 511. The second body 520 includes an upper surface 521 and a lower surface 522 located substantially opposite the upper surface 521. The foldable device 1012 has a right side R and a left side L.

The hinge 530 may connect the first body 510 to the second body 520. The hinge 530 includes a first rotatable shaft 530*a*, a second rotatable shaft 530*b*, and a connecting body 530*c*. The first rotatable shaft 530*a* is inserted into the first body 510. The second rotatable shaft 530*b* is inserted into the second body 520. The first rotatable shaft 530*a* and the second rotatable shaft 530*b* are inserted into the connecting body 530*c*.

In the unfolded state, the upper surface 511 of the first body 510 and the upper surface 521 of the second body 520 are located in a substantially same plane, and the lower surface 512 of the first body 510 and the lower surface 522 of the second body 520 are located in a substantially same plane. In such an embodiment, an upper surface of the substantially the same plane may not be exactly flat. In the unfolded state, the first body 510 and the second body 520 are spaced apart from each other by a gap G3.

The flexible display panel 300 is located on the housing HS. The flexible display panel 300 includes a first region 310, a second region 320, and a third region 330. In an embodiment, a buffer flexible sheet (not shown) may be attached to a lower surface of the flexible display panel 300 to offset irregularities that an upper surface of the housing HS may have.

The first region 310 has a position horizontally fixed to the first body 510. In one embodiment, for example, the first region 310 may be attached to the first body 510. The second region 320 has a position horizontally fixed to the second body 520. In one embodiment, for example, the second region 320 may be attached to the second body 520. The third region 330 is located between the first region 310 and the second region 320. The third region 330 includes a first peripheral portion 330*a*, a middle portion 330*c*, and a second peripheral portion 330*b*. The middle portion 330*c* is located in a space defined between the first region 310 and the second region 320. The middle portion 330*c* corresponds to a space S between the first body 510 and the second body 520. A width W3 of the middle portion 330*c* may be substantially equal to the gap G3 between the first body 510 and the second body 520.

The first peripheral portion 330*a* is located between the first region 310 and the middle portion 330*c*. The first peripheral portion 330*a* is not attached to the first body 510. The second peripheral portion 330*b* is located between the second region 320 and the middle portion 330*c*. The second peripheral portion 330*b* is not attached to the second body 520. A width W4 of the first peripheral portion 330*a* may be substantially equal to a width W5 of the second peripheral portion 330*b*. Since the first region 310 and the second region 320 have positions horizontally fixed to the first body 510 and the second body 520, respectively, the middle portion 330*c* has a position horizontally fixed to a middle portion of the hinge 530.

Referring to FIG. 13, the foldable device 1012 may be in-folded by the hinge 530. In the in-folded state, the upper surface 511 of the first body 510 and the upper surface 521 of the second body 520 face each other, and the lower surface 512 of the first body 510 and the lower surface 522 of the second body 520 are located substantially opposite each other.

When the foldable device 1012 is in-folded by the hinge 530, the first rotatable shaft 530*a* and the second rotatable shaft 530*b* are spaced apart by a gap G4 by the connecting body 530*c*. Therefore, the upper surface 511 of the first body 510 and the upper surface 521 of the second body 520 are also spaced apart from each other. Therefore, the third region 330 of the flexible display panel 300 may be folded with a predetermined radius of curvature. Accordingly, in such an embodiment, when the foldable device 1012 is in-folded by the hinge 530, the damage to the third region 330 of the flexible display panel 300 may be effectively prevented.

Figure 14:
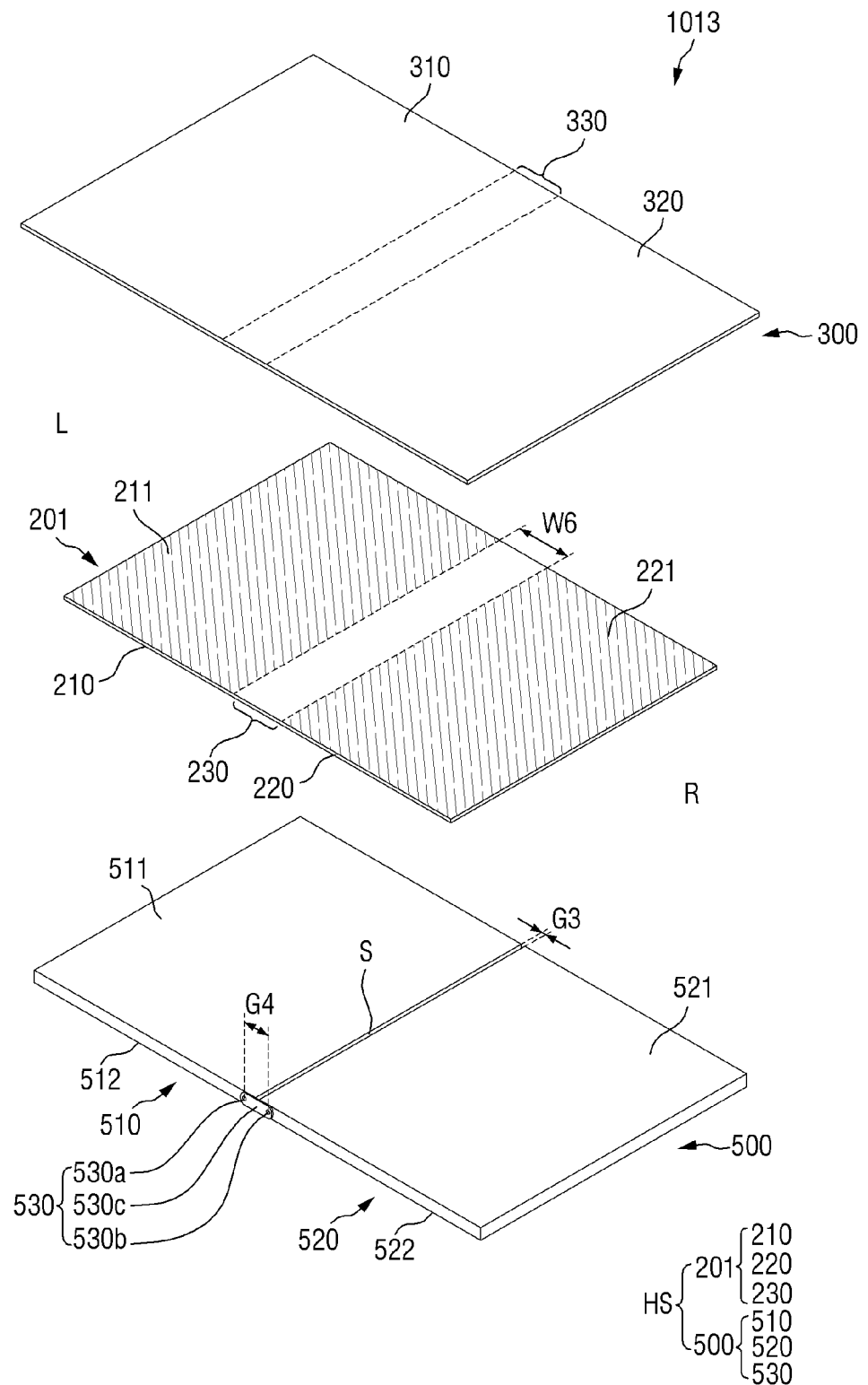
FIGS. 14 and 15 show a foldable device according to another alternative embodiment.
Figure 15:
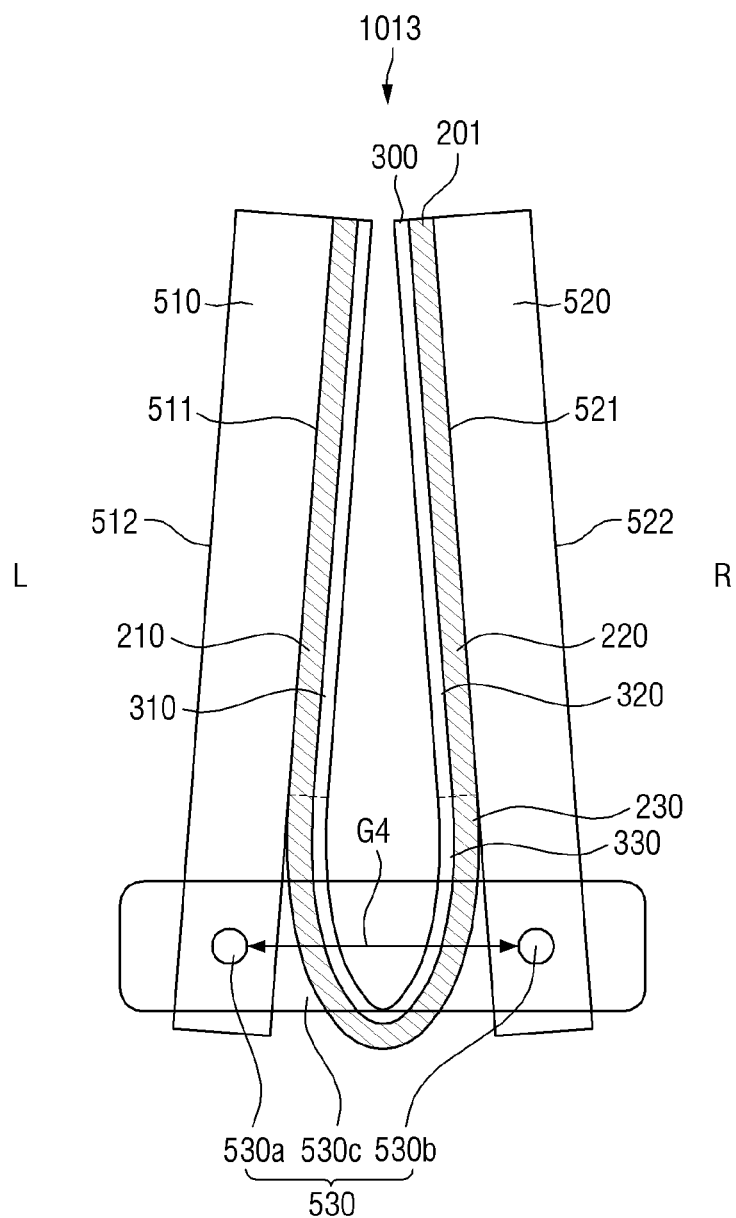

FIGS. 14 and 15 show a foldable device 1013 according to another alternative embodiment. Hereinafter, for convenience of description, any repetitive detailed description of elements and features substantially identical to those of the foldable device 1012 of FIGS. 12 and 13 will be omitted.

Referring to FIG. 14, a housing HS further includes a plate structure 201. The plate structure 201 is located on a hinge structure 500. The plate structure 201 includes a first plate region 210, a second plate region 220, and a third plate region 230. The first plate region 210 corresponds to a first body 510. The first plate region 210 has a position horizontally fixed to the first body 510. In one embodiment, for example, the first plate region 210 is attached to the first body 510. The second plate region 220 corresponds to a second body 520. The second plate region 220 has a position horizontally fixed to the second body 520. In one embodiment, for example, the second plate region 220 is attached to the second body 520. The third plate region 230 is located between the first plate region 210 and the second plate region 220. The third plate region 230 corresponds to a hinge 530. The third plate region 230 may have lower rigidity than the first plate region 210 and the second plate region 220. In one embodiment, for example, the third plate region 230 may be flexible. The third plate region 230 has a width W6 substantially greater than a gap G3 between the first body 510 and the second body 520. The third plate region 230 is not attached to the hinge structure 500.

A flexible display panel 300 is located on the housing HS. The flexible display panel 300 has a first region 310, a second region 320, and a third region 330. In an embodiment, a buffer flexible sheet (not shown) may be attached to a lower surface of the flexible display panel 300 to offset irregularities that an upper surface of the housing HS may have. The first region 310 has a position horizontally fixed to the first plate region 210 of the plate structure 201. The second region 320 has a position horizontally fixed to the second plate region 220 of the plate structure 201. The third region 330 is located between the first region 310 and the second region 320. The third region 330 has a position horizontally fixed to the third plate region 230 of the plate structure 201.

In the unfolded state, the third plate region 230 of the plate structure 201 is located between a space S defined between the first body 510 and the second body 520 and the third region 330 of the flexible display panel 300. Therefore, in the unfolded state, a lower surface of the third region 330 of the flexible display panel 300 may be maintained substantially flat on the space S between the first body 510 and the second body 520.

Referring to FIG. 15, the third region 330 of the flexible display panel 300 is in-folded with a predetermined radius of curvature. In such an embodiment, the third region 330 of the flexible display panel 300 is protected by the third plate region 230 of the plate structure 201. Accordingly, in such an embodiment, when the hinge 530 is in-folded, the damage to the third region 330 of the flexible display panel 300 may be effectively prevented.

Figure 16A:
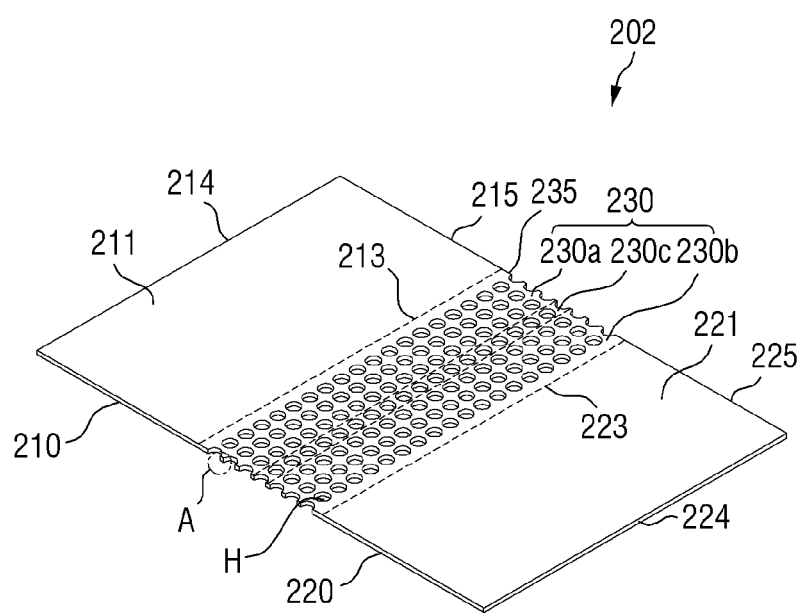
FIG. 16A is a perspective view showing an embodiment of plate structures shown in FIGS. 6 through 11, 14 and 15.

FIG. 16A is a perspective view showing an embodiment of the plate structures shown in FIGS. 6 through 11, 14 and 15.

Referring to FIG. 16A in view of FIGS. 6 through 11, 14 and 15, in an embodiment, a third plate region 230 of a plate structure 202 is a region in which holes H are defined. Therefore, the third plate region 230 of the plate structure 202 may be flexible. In a plan view, the holes H may extend in a direction in which the third plate region 230 extends. As illustrated in FIG. 16A, the direction in which the third plate region 230 extends is substantially the same as a direction in which the first and second rotatable shafts 530a and 530b extend. This is because the width direction of the third plate region 230 is substantially perpendicular to the first and second rotatable shafts 530a and 530b which extend along a length direction of the third plate region 230. Alternatively, in a plan view, the holes H may extend in a direction (i.e., a width direction of the third plate region 230) perpendicular to the direction in which the third plate region 230 extends. The density of the holes H may increase from first and second peripheral portions 230a and 230b toward a middle portion 230c. The holes H may also be defined or formed in a first plate region 210 and a second plate region 220 adjacent to the third plate region 230.

In an embodiment, where the hinge 130 shown in FIGS. 6 through 11 includes a plurality of joints, the width of the holes H of FIG. 16A measured in a direction perpendicular to a folding axis is substantially smaller than that of the joints included in the hinge 130 of FIGS. 6 through 11 measured in the direction perpendicular to the folding axis. Therefore, an upper surface, which is an emission surface, of a flexible display panel 300 may be maintained substantially flat.

Figure 16B:
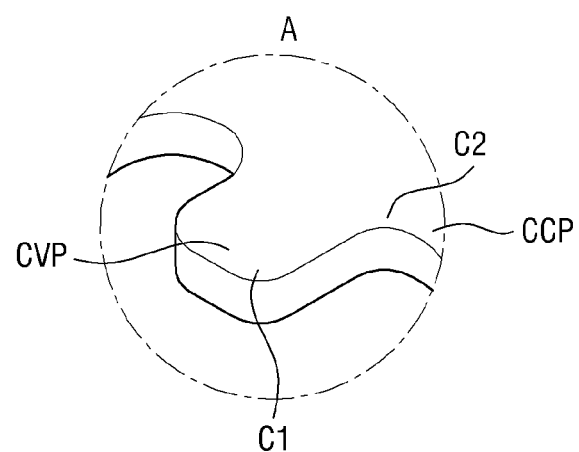
FIG. 16B is an enlarged view of a region "A" in FIG. 16A.

FIG. 16B is an enlarged view of a region "A" in FIG. 16A.

Referring to FIG. 16B in view of FIGS. 6 through 11, 14 and 15, a side area of the third plate region 230 has at least one convex portion CVP which is protruded in a plan view and at least one concave portion CCP which is recessed in a plan view. The convex portion CVP has at least one corner C1 which is rounded in a plan view or when viewed from a plan view in a thickness direction of the hinge 130. Thus, for example, a guide portion 235 of the third plate region 230 may be effectively or smoothly coupled to a guide portion 135 of the hinge 130. When the corner C1 of the convex portion CVP is angled, the corner C1 may be caught on a neighboring structure, e.g., the connecting body 530c, in folding or unfolding the third plate region 230. When the corner C1 is caught on the neighboring structure, the third plate region 230 may be deformed. The defamation of the third plate region 230 may lead to a deformation of the flexible display panel 300. Therefore, the deformation of the flexible display panel 300 may be effectively prevented by allowing the corner C1 to be rounded in a plan view.

The concave portion CCP has at least one recessed corner C2 which is rounded in a plan view or when viewed from a plan view in a thickness direction of the hinge 130. When the side area of the third plate region 230 has the convex portion CVP and the concave portion CCP which has the recessed corner C2, a crack may be easily generated from the recessed corner C2 and, then, the crack may extend bit by bit toward a center of the third plate region 230 by repeatedly folding and unfolding the third plate region 230, compared to when the side area of the third plate region 230 has a straight outline. The crack from the recessed corner C2 may be easily generated when the recessed corner C2 is substantially angled. Therefore, the generation and/or extension of the crack may be effectively prevented by allowing the recessed corner C2 to be rounded in a plan view.

Figure 17:
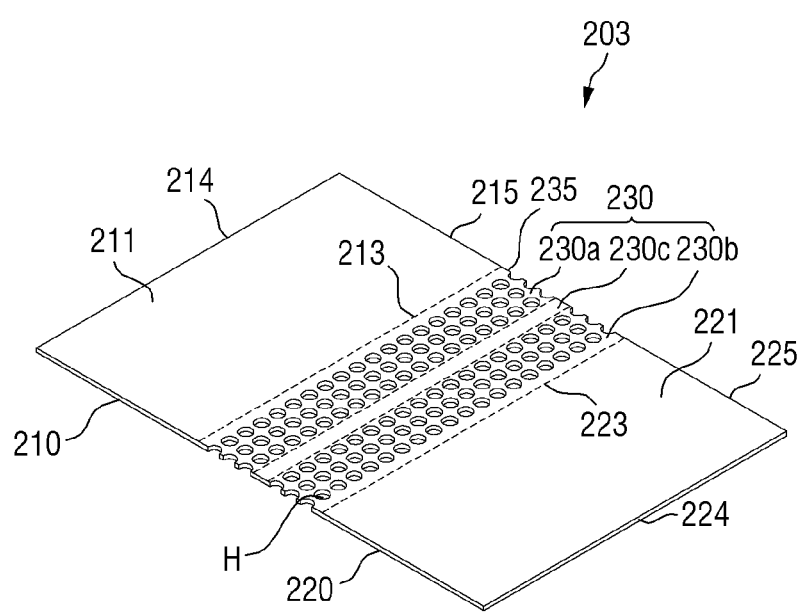
FIG. 17 is a perspective view showing an embodiment of the plate structures shown in FIGS. 6 through 8.

FIG. 17 is a perspective view showing an embodiment of the plate structures 201 shown in FIGS. 6 through 8. Hereinafter, for convenience of description, any repetitive detailed description of elements and features substantially identical to those of the plate structure 202 of FIGS. 16A and 16B will be omitted.

Referring to FIG. 17 in view of FIGS. 6 through 8, in an alternative embodiment, no hole is defined in a middle portion 230c of a third plate region 230 of a plate structure 203. Therefore, the middle portion 230c of the third plate region 230 of the plate structure 203 may have a position more effectively or firmly horizontally fixed to a middle portion 130c of a hinge 130.

Figure 18:
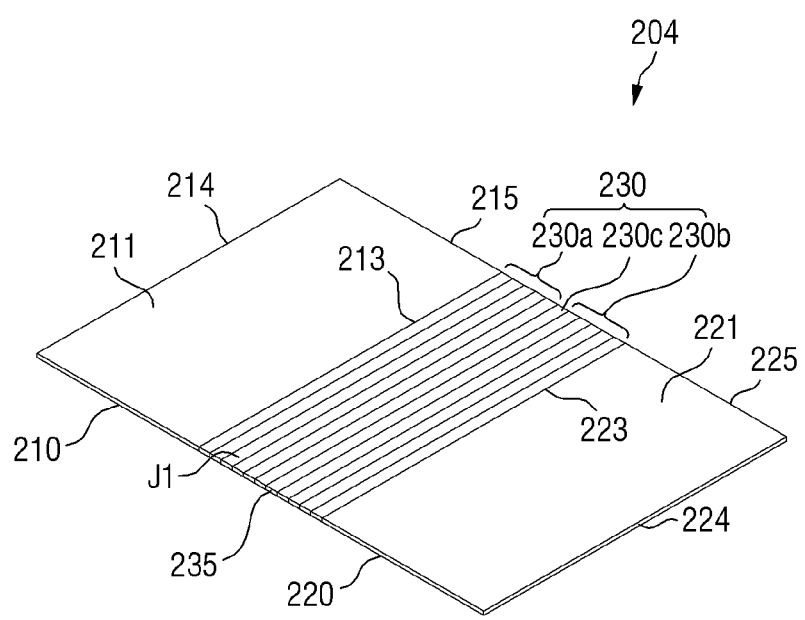
FIG. 18 is a perspective view showing an embodiment of the plate structures shown in FIGS. 6 through 11, 14 and 15.

FIG. 18 is a perspective view showing an embodiment of the plate structures 201 shown in FIGS. 6 through 11, 14 and 15.

Referring to FIG. 18 in view of FIGS. 6 through 11, 14 and 15, a third plate region 230 of a plate structure 204 includes a plurality of joints J1 connected in series between a first plate region 210 and a second plate region 220 of the plate structure 204. Therefore, the third plate region 230 of the plate structure 204 may be flexible.

In an embodiment, where the hinge 130 shown in FIGS. 6 through 11 includes a plurality of joints, the width of the joints J1 of FIG. 18 measured in a direction perpendicular to a folding axis is substantially smaller than that of the joints included in the hinge 130 of FIGS. 6 through 11 measured in the direction perpendicular to the folding axis. Therefore, an upper surface which is an emission surface of a flexible display panel 300 may be maintained substantially flat.

According to an embodiment, the first plate region 210 and the second plate region 220 of the plate structure 204 may also include a plurality of joints J1 connected in series.

Figure 19A:
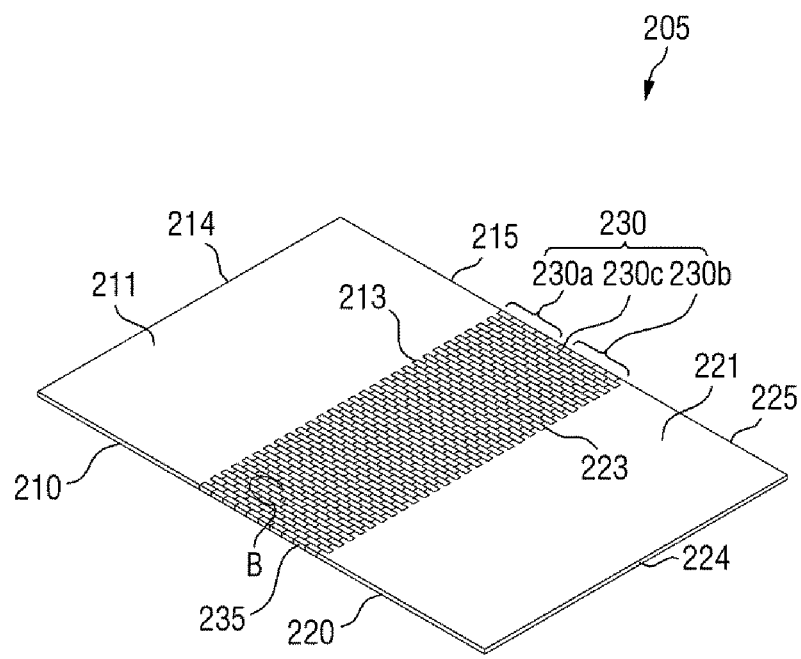
FIG. 19A is a perspective view showing an embodiment of the plate structures shown in FIGS. 6 through 11, 14 and 15.

FIG. 19A is a perspective view showing an embodiment of the plate structures 201 shown in FIGS. 6 through 11, 14 and 15, and FIG. 19B is an enlarged view of the encircled portion B of FIG. 19A.

Referring to FIG. 19A in view of FIGS. 6 through 11, 14 and 15, a third plate region 230 of a plate structure 205 includes a plurality of joints J2 connected between a first plate region 210 and a second plate region 220 of the plate structure 205.

Figure 19B:
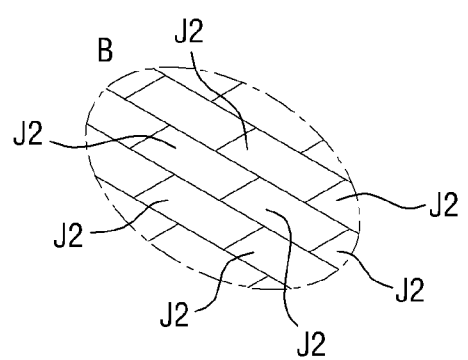
FIG. 19B is an enlarged view of the encircled portion B of FIG. 19A.

As shown in FIG. 19B in view of FIGS. 6 through 11, 14 and 15, one of the joints J2 may be surrounded by at least three other joints J2 in a plan view. Therefore, the third plate region 230 of the plate structure 205 may be flexible.

When the hinge 130 shown in FIGS. 6 through 11 includes a plurality of joints, the width of the joints J2 of FIGS. 19A and 19B measured in a direction perpendicular to a folding axis is substantially smaller than that of the joints included in the hinge 130 of FIGS. 6 through 11 measured in the direction perpendicular to the folding axis. Therefore, an upper surface which is an emission surface of a flexible display panel 300 may be maintained substantially flat.

Figure 20:
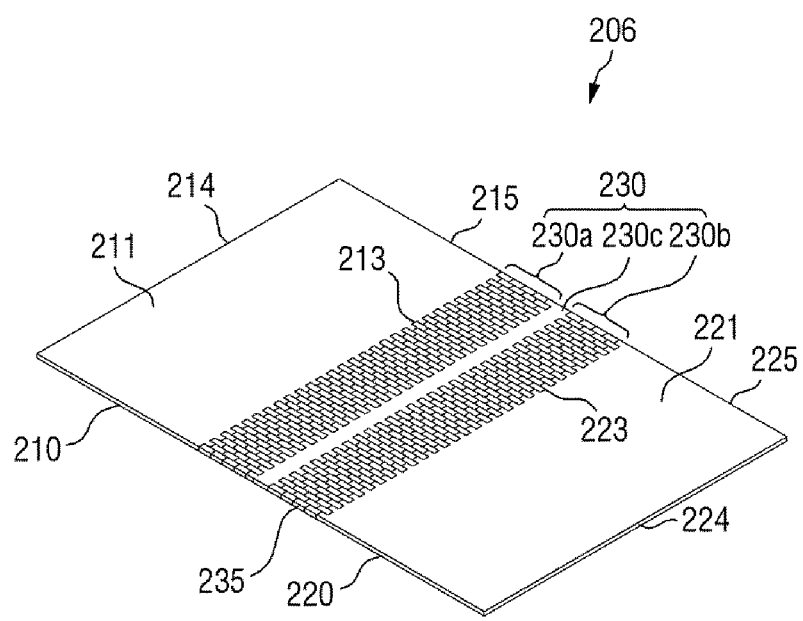
FIG. 20 is a perspective view showing an embodiment of the plate structures shown in FIGS. 6 through 8.

FIG. 20 is a perspective view showing an embodiment of the plate structures 201 shown in FIGS. 6 through 8. Hereinafter, for convenience of description, any repetitive detailed description of elements and features substantially identical to those of the plate structure 205 of FIGS. 19A and 19B will be omitted.

Referring to FIG. 20 in view of FIGS. 6 through 8, a middle portion 230c of a third plate region 230 of a plate structure 206 is shaped like a connecting bar extending along a folding axis. Therefore, the middle portion 230c of the third plate region 230 of the plate structure 206 may have a position more effectively or firmly horizontally fixed to a middle portion 130c of a hinge 130.

Figure 21:
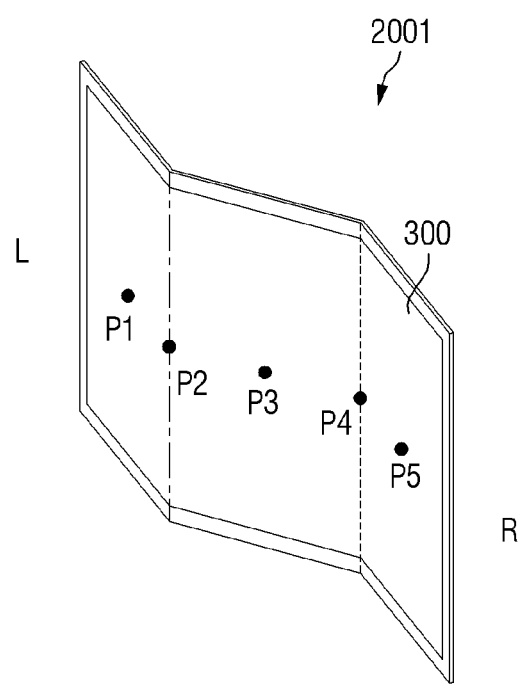
FIG. 21 is a perspective view of a foldable device according to an embodiment.

FIG. 21 is a perspective view of a foldable device 2001 according to an embodiment. In FIG. 21, a dash-dotted line indicates a state where a flexible display panel 300 is out-folded by an out-foldable or in-out-foldable hinge, and a dotted line indicates a state where the flexible display panel 300 is in-folded by an in-foldable or in-out-foldable hinge.

TABLE 1

|  | P1 | P2 | P3 | P4 | P5 |
| --- | --- | --- | --- | --- | --- |
| Embodiment 1 | F | S | S | S | S |
| Embodiment 2 | S | F | S | S | S |
| Embodiment 3 | S | S | F | S | S |
| Embodiment 4 | S | S | F | F | F |
| Embodiment 5 | S | S | S | F | S |
| Embodiment 6 | S | S | S | S | F |

Table 1 shows whether the flexible display panel 300 has a position horizontally fixed to a hinge structure at points P1 through P5 in FIG. 21. In Table 1, a case where the flexible display panel 300 has a position horizontally fixed to the hinge structure is indicated by "F," and a case where the flexible display panel 300 is slidable without having a position horizontally fixed to the hinge structure is indicated by "S."

Referring to FIG. 21 and table 1, Embodiment 1 may be achieved by connecting one selected from the group of a left side L of the foldable device 1004 shown in FIG. 4 and a left side L of the foldable device 1009 shown in FIG. 9 to a right side R of the foldable device 1011 shown in FIG. 11 in a state where they are placed to face each other. For example, in a state where the one selected from the group of the left side L of the foldable device 1004 shown in FIG. 4 and the left side L of the foldable device 1009 shown in FIG. 9 and the right side R of the foldable device 1011 shown in FIG. 11 are placed to face each other, the corresponding one of the foldable device 1004 shown in FIG. 4 and the foldable device 1009 shown in FIG. 9 is connected with the foldable device 1011 shown in FIG. 11.

In one embodiment, for example, a first region 310, the first plate region 210 and a first body 110 of the foldable device 1004 shown in FIG. 4 may be integrally formed as a single unitary and indivisible unit with a second region 320, the second plate region 220 and the second body 120 of the foldable device 1011 shown in FIG. 11, respectively.

In one alternative embodiment, for example, a first region 310, the first plate region 210 and a first body 110 of the foldable device 1009 shown in FIG. 9 may be integrally formed as a single unitary and indivisible unit with the second region 320, the second plate region 220 and the second body 120 of the foldable device 1011 shown in FIG. 11, respectively.

Embodiment 2 may be achieved by connecting one selected from the group of the right side R of the foldable device 1001 shown in FIG. 1, the right side R of the foldable device 1003 shown in FIG. 3, a right side R of the foldable device 1006 shown in FIG. 6, and the right side R of the foldable device 1008 shown in FIG. 8 to a left side L of the foldable device 1011 shown in FIG. 11 in a state where they are placed to face each other.

In one embodiment, for example, the second region 320, the second plate region 220 and the second body 120 of the foldable device 1001 shown in FIG. 1 may be integrally formed as a single unitary and indivisible unit with a first region 310, the first plate region 210 and the first body 110 of the foldable device 1011 shown in FIG. 11, respectively.

In one alternative embodiment, for example, a second region 320, the second plate region 220 and the second body 120 of the foldable device 1003 shown in FIG. 3 may be integrally formed as a single unitary and indivisible unit with the first region 310, the first plate region 210 and the first body 110 of the foldable device 1011 shown in FIG. 11, respectively.

In one alternative embodiment, for example, the second region 320, the second plate region 220 and the second body 120 of the foldable device 1006 shown in FIG. 6 may be integrally formed as a single unitary and indivisible unit with the first region 310, the first plate region 210 and the first body 110 of the foldable device 1011 shown in FIG. 11, respectively.

In one alternative embodiment, for example, a second region 320, the second plate region 220 and the second body 120 of the foldable device 1008 shown in FIG. 8 may be integrally formed as a single unitary and indivisible unit with the first region 310, the first plate region 210 and the first body 110 of the foldable device 1011 shown in FIG. 11, respectively.

Embodiment 3 may be achieved by placing one selected from the group of a right side R of the foldable device 1004 shown in FIG. 4, a right side R of the foldable device 1005 shown in FIG. 5, a right side R of the foldable device 1009 shown in FIG. 9 and a right side R of the foldable device 1010 shown in FIG. 10 as a left side L of a foldable device (i.e., the foldable device 2001 shown in FIG. 21, hereinafter, referred to as the foldable device) and connecting the right side R of the foldable device 1004 shown in FIG. 4, the right side R of the foldable device 1005 shown in FIG. 5, the right side R of the foldable device 1009 shown in FIG. 9 or the right side R of the foldable device 1010 shown in FIG. 10 to one selected from the group of the right side R of another foldable device 1004 shown in FIG. 4, the right side R of another foldable device 1005 shown in FIG. 5, the right side R of another foldable device 1009 shown in FIG. 9 and the right side R of another foldable device 1010 shown in FIG. 10 in a state where they are placed to face each other.

In one embodiment, for example, a second region 320, the second plate region 220 and the second body 120 of the foldable device 1004 shown in FIG. 4 may be integrally formed as a single unitary and indivisible unit with the second region 320, the second plate region 220 and the second body 120 of another foldable device 1004 shown in FIG. 4, respectively. In such an embodiment, the second plate region 220 and the second body 120 of the foldable device 1004 shown in FIG. 4 may be integrally formed as a single unitary and indivisible unit with each other, and the second plate region 220 and the second body 120 of the another foldable device 1004 shown in FIG. 4 may be integrally formed as a single unitary and indivisible unit with each other. In such an embodiment, the second region 320, the second plate region 220 and the second body 120 of the foldable device 1004 shown in FIG. 4 may be disposed on a left side L of a foldable device, and the second region 320, the second plate region 220 and the second body 120 of the another foldable device 1004 shown in FIG. 4 may be disposed on a right side R of the foldable device.

In one alternative embodiment, for example, the second region 320, the second plate region 220 and the second body 120 of the foldable device 1004 shown in FIG. 4 may be integrally formed as a single unitary and indivisible unit with a second region 320, a second plate region 220 and a second body 120 of the foldable device 1005 shown in FIG. 5, respectively. In such an embodiment, the second plate region 220 and the second body 120 of the foldable device 1004 shown in FIG. 4 may be integrally formed as a single unitary and indivisible unit with each other, and the second plate region 220 and the second body 120 of the foldable device 1005 shown in FIG. 5 may be integrally formed as a single unitary and indivisible unit with each other. In such an embodiment, the second region 320, the second plate region 220 and the second body 120 of the foldable device 1004 shown in FIG. 4 may be disposed on a left side L of a foldable device, and the second region 320, the second plate region 220 and the second body 120 of the foldable device 1005 shown in FIG. 5 may be disposed on a right side R of the foldable device.

In one alternative embodiment, for example, the second region 320, the second plate region 220 and the second body 120 of the foldable device 1004 shown in FIG. 4 may be integrally formed as a single unitary and indivisible unit with a second region 320, the second plate region 220 and the second body 120 of the foldable device 1009 shown in FIG. 9, respectively. In such an embodiment, the second plate region 220 and the second body 120 of the foldable device 1004 shown in FIG. 4 may be integrally formed as a single unitary and indivisible unit with each other, and the second plate region 220 and the second body 120 of the foldable device 1009 shown in FIG. 9 may be integrally formed as a single unitary and indivisible unit with each other. In such an embodiment, the second region 320, the second plate region 220 and the second body 120 of the foldable device 1004 shown in FIG. 4 may be disposed on a left side L of a foldable device, and the second region 320, the second plate region 220 and the second body 120 of the foldable device 1009 shown in FIG. 9 may be disposed on a right side R of the foldable device.

In one alternative embodiment, for example, the second region 320, the second plate region 220 and the second body 120 of the foldable device 1004 shown in FIG. 4 may be integrally formed as a single unitary and indivisible unit with a second region 320, a second plate region 220 and a second body 120 of the foldable device 1010 shown in FIG. 10, respectively. In such an embodiment, the second plate region 220 and the second body 120 of the foldable device 1004 shown in FIG. 4 may be integrally formed as a single unitary and indivisible unit with each other, and the second plate region 220 and the second body 120 of the foldable device 1010 shown in FIG. 10 may be integrally formed as a single unitary and indivisible unit with each other. In such an embodiment, the second region 320, the second plate region 220 and the second body 120 of the foldable device 1004 shown in FIG. 4 may be disposed on a left side L of a foldable device, and the second region 320, the second plate region 220 and the second body 120 of the foldable device 1010 shown in FIG. 10 may be disposed on a right side R of the foldable device.

In one alternative embodiment, for example, the second region 320, the second plate region 220 and the second body 120 of the foldable device 1005 shown in FIG. 5 may be integrally formed as a single unitary and indivisible unit with the second region 320, the second plate region 220 and the second body 120 of the foldable device 1004 shown in FIG. 4, respectively. In such an embodiment, the second plate region 220 and the second body 120 of the foldable device 1005 shown in FIG. 5 may be integrally formed as a single unitary and indivisible unit with each other, and the second plate region 220 and the second body 120 of the foldable device 1004 shown in FIG. 4 may be integrally formed as a single unitary and indivisible unit with each other. In such an embodiment, the second region 320, the second plate region 220 and the second body 120 of the foldable device 1005 shown in FIG. 5 may be disposed on a left side L of a foldable device, and the second region 320, the second plate region 220 and the second body 120 of the foldable device 1004 shown in FIG. 4 may be disposed on a right side R of the foldable device.

In one alternative embodiment, for example, the second region 320, the second plate region 220 and the second body 120 of the foldable device 1005 shown in FIG. 5 may be integrally formed as a single unitary and indivisible unit with the second region 320, the second plate region 220 and the second body 120 of another foldable device 1005 shown in FIG. 5, respectively. In such an embodiment, the second plate region 220 and the second body 120 of the foldable device 1005 shown in FIG. 5 may be integrally formed as a single unitary and indivisible unit with each other, and the second plate region 220 and the second body 120 of the another foldable device 1005 shown in FIG. 5 may be integrally formed as a single unitary and indivisible unit with each other. In such an embodiment, the second region 320, the second plate region 220 and the second body 120 of the foldable device 1005 shown in FIG. 5 may be disposed on a left side L of a foldable device, and the second region 320, the second plate region 220 and the second body 120 of the another foldable device 1005 shown in FIG. 5 may be disposed on a right side R of the foldable device.

In one alternative embodiment, for example, the second region 320, the second plate region 220 and the second body 120 of the foldable device 1005 shown in FIG. 5 may be integrally formed as a single unitary and indivisible unit with the second region 320, the second plate region 220 and the second body 120 of the foldable device 1009 shown in FIG. 9, respectively. In such an embodiment, the second plate region 220 and the second body 120 of the foldable device 1005 shown in FIG. 5 may be integrally formed as a single unitary and indivisible unit with each other, and the second plate region 220 and the second body 120 of the foldable device 1009 shown in FIG. 9 may be integrally formed as a single unitary and indivisible unit with each other. In such an embodiment, the second region 320, the second plate region 220 and the second body 120 of the foldable device 1005 shown in FIG. 5 may be disposed on a left side L of a foldable device, and the second region 320, the second plate region 220 and the second body 120 of the foldable device 1009 shown in FIG. 9 may be disposed on a right side R of the foldable device.

In one alternative embodiment, for example, the second region 320, the second plate region 220 and the second body 120 of the foldable device 1005 shown in FIG. 5 may be integrally formed as a single unitary and indivisible unit with the second region 320, the second plate region 220 and the second body 120 of the foldable device 1010 shown in FIG. 10, respectively. In such an embodiment, the second plate region 220 and the second body 120 of the foldable device 1005 shown in FIG. 5 may be integrally formed as a single unitary and indivisible unit with each other, and the second plate region 220 and the second body 120 of the foldable device 1010 shown in FIG. 10 may be integrally formed as a single unitary and indivisible unit with each other. In such an embodiment, the second region 320, the second plate region 220 and the second body 120 of the foldable device 1005 shown in FIG. 5 may be disposed on a left side L of a foldable device, and the second region 320, the second plate region 220 and the second body 120 of the foldable device 1010 shown in FIG. 10 may be disposed on a right side R of the foldable device.

In one alternative embodiment, for example, the second region 320, the second plate region 220 and the second body 120 of the foldable device 1009 shown in FIG. 9 may be integrally formed as a single unitary and indivisible unit with the second region 320, the second plate region 220 and the second body 120 of the foldable device 1004 shown in FIG. 4, respectively. In such an embodiment, the second plate region 220 and the second body 120 of the foldable device 1009 shown in FIG. 9 may be integrally formed as a single unitary and indivisible unit with each other, and the second plate region 220 and the second body 120 of the foldable device 1004 shown in FIG. 4 may be integrally formed as a single unitary and indivisible unit with each other. In such an embodiment, the second region 320, the second plate region 220 and the second body 120 of the foldable device 1009 shown in FIG. 9 may be disposed on a left side L of a foldable device, and the second region 320, the second plate region 220 and the second body 120 of the foldable device 1004 shown in FIG. 4 may be disposed on a right side R of the foldable device.

In one alternative embodiment, for example, the second region 320, the second plate region 220 and the second body 120 of the foldable device 1009 shown in FIG. 9 may be integrally formed as a single unitary and indivisible unit with the second region 320, the second plate region 220 and the second body 120 of the foldable device 1005 shown in FIG. 5, respectively. In such an embodiment, the second plate region 220 and the second body 120 of the foldable device 1009 shown in FIG. 9 may be integrally formed as a single unitary and indivisible unit with each other, and the second plate region 220 and the second body 120 of the foldable device 1005 shown in FIG. 5 may be integrally formed as a single unitary and indivisible unit with each other. In such an embodiment, the second region 320, the second plate region 220 and the second body 120 of the foldable device 1009 shown in FIG. 9 may be disposed on a left side L of a foldable device, and the second region 320, the second plate region 220 and the second body 120 of the foldable device 1005 shown in FIG. 5 may be disposed on a right side R of the foldable device.

In one alternative embodiment, for example, the second region 320, the second plate region 220 and the second body 120 of the foldable device 1009 shown in FIG. 9 may be integrally formed as a single unitary and indivisible unit with the second region 320, the second plate region 220 and the second body 120 of another foldable device 1009 shown in FIG. 9, respectively. In such an embodiment, the second plate region 220 and the second body 120 of the foldable device 1009 shown in FIG. 9 may be integrally formed as a single unitary and indivisible unit with each other, and the second plate region 220 and the second body 120 of the another foldable device 1009 shown in FIG. 9 may be integrally formed as a single unitary and indivisible unit with each other. In such an embodiment, the second region 320, the second plate region 220 and the second body 120 of the foldable device 1009 shown in FIG. 9 may be disposed on a left side L of a foldable device, and the second region 320, the second plate region 220 and the second body 120 of the another foldable device 1009 shown in FIG. 9 may be disposed on a right side R of the foldable device.

In one alternative embodiment, for example, the second region 320, the second plate region 220 and the second body 120 of the foldable device 1009 shown in FIG. 9 may be integrally formed as a single unitary and indivisible unit with the second region 320, the second plate region 220 and the second body 120 of the foldable device 1010 shown in FIG. 10, respectively. In such an embodiment, the second plate region 220 and the second body 120 of the foldable device 1009 shown in FIG. 9 may be integrally formed as a single unitary and indivisible unit with each other, and the second plate region 220 and the second body 120 of the foldable device 1010 shown in FIG. 10 may be integrally formed as a single unitary and indivisible unit with each other. In such an embodiment, the second region 320, the second plate region 220 and the second body 120 of the foldable device 1009 shown in FIG. 9 may be disposed on a left side L of a foldable device, and the second region 320, the second plate region 220 and the second body 120 of the foldable device 1010 shown in FIG. 10 may be disposed on a right side R of the foldable device.

In one alternative embodiment, for example, the second region 320, the second plate region 220 and the second body 120 of the foldable device 1010 shown in FIG. 10 may be integrally formed as a single unitary and indivisible unit with the second region 320, the second plate region 220 and the second body 120 of the foldable device 1004 shown in FIG. 4, respectively. In such an embodiment, the second plate region 220 and the second body 120 of the foldable device 1010 shown in FIG. 10 may be integrally formed as a single unitary and indivisible unit with each other, and the second plate region 220 and the second body 120 of the foldable device 1004 shown in FIG. 4 may be integrally formed as a single unitary and indivisible unit with each other. In such an embodiment, the second region 320, the second plate region 220 and the second body 120 of the foldable device 1010 shown in FIG. 10 may be disposed on a left side L of a foldable device, and the second region 320, the second plate region 220 and the second body 120 of the foldable device 1004 shown in FIG. 4 may be disposed on a right side R of the foldable device.

In one alternative embodiment, for example, the second region 320, the second plate region 220 and the second body 120 of the foldable device 1010 shown in FIG. 10 may be integrally formed as a single unitary and indivisible unit with the second region 320, the second plate region 220 and the second body 120 of the foldable device 1005 shown in FIG. 5, respectively. In such an embodiment, the second plate region 220 and the second body 120 of the foldable device 1010 shown in FIG. 10 may be integrally formed as a single unitary and indivisible unit with each other, and the second plate region 220 and the second body 120 of the foldable device 1005 shown in FIG. 5 may be integrally formed as a single unitary and indivisible unit with each other. In such an embodiment, the second region 320, the second plate region 220 and the second body 120 of the foldable device 1010 shown in FIG. 10 may be disposed on a left side L of a foldable device, and the second region 320, the second plate region 220 and the second body 120 of the foldable device 1005 shown in FIG. 5 may be disposed on a right side R of the foldable device.

In one alternative embodiment, for example, the second region 320, the second plate region 220 and the second body 120 of the foldable device 1010 shown in FIG. 10 may be integrally formed as a single unitary and indivisible unit with the second region 320, the second plate region 220 and the second body 120 of the foldable device 1009 shown in FIG. 9, respectively. In such an embodiment, the second plate region 220 and the second body 120 of the foldable device 1010 shown in FIG. 10 may be integrally formed as a single unitary and indivisible unit with each other, and the second plate region 220 and the second body 120 of the foldable device 1009 shown in FIG. 9 may be integrally formed as a single unitary and indivisible unit with each other. In such an embodiment, the second region 320, the second plate region 220 and the second body 120 of the foldable device 1010 shown in FIG. 10 may be disposed on a left side L of a foldable device, and the second region 320, the second plate region 220 and the second body 120 of the foldable device 1009 shown in FIG. 9 may be disposed on a right side R of the foldable device.

In one alternative embodiment, for example, the second region 320, the second plate region 220 and the second body 120 of the foldable device 1010 shown in FIG. 10 may be integrally formed as a single unitary and indivisible unit with the second region 320, the second plate region 220 and the second body 120 of another foldable device 1010 shown in FIG. 10, respectively. In such an embodiment, the second plate region 220 and the second body 120 of the foldable device 1010 shown in FIG. 10 may be integrally formed as a single unitary and indivisible unit with each other, and the second plate region 220 and the second body 120 of the another foldable device 1010 shown in FIG. 10 may be integrally formed as a single unitary and indivisible unit with each other. In such an embodiment, the second region 320, the second plate region 220 and the second body 120 of the foldable device 1010 shown in FIG. 10 may be disposed on a left side L of a foldable device, and the second region 320, the second plate region 220 and the second body 120 of the another foldable device 1010 shown in FIG. 10 may be disposed on a right side R of the foldable device.

In Embodiment 3, the flexible display panel 300 has a position horizontally fixed to the hinge structure at the point P3 located at the center of the foldable device 2001. Therefore, the force required between the point P3 and the point P5 to fold or unfold the foldable device 2001 is substantially equal to the force required between the point P3 and the point P1 to fold or unfold the foldable device 2001.

Embodiment 4 may be achieved by connecting one selected from the group of the right side R of the foldable device 1004 shown in FIG. 4, the right side R of the foldable device 1005 shown in FIG. 5, the right side R of the foldable device 1009 shown in FIG. 9 and the right side R of the foldable device 1010 shown in FIG. 10 to one selected from the group of the left side L of the foldable device 1012 shown in FIG. 12 and a left side L of the foldable device 1013 shown in FIG. 14 in a state where they are placed to face each other.

In one embodiment, for example, the second region 320 and the second body 120 of the foldable device 1004 shown in FIG. 4 may be integrally formed as a single unitary and indivisible unit with the first region 310 and the first body 510 of the foldable device 1012 shown in FIG. 12, respectively. In such an embodiment, the second plate region 220 and the second body 120 of the foldable device 1004 shown in FIG. 4 may be integrally formed as a single unitary and indivisible unit with each other.

In one embodiment, for another example, the second region 320, the second plate region 220 and the second body 120 of the foldable device 1004 shown in FIG. 4 may be integrally formed as a single unitary and indivisible unit with the first region 310, the first plate region 210 and the first body 510 of the foldable device 1013 shown in FIG. 14, respectively. In such an embodiment, the second plate region 220 and the second body 120 of the foldable device 1004 shown in FIG. 4 may be integrally formed as a single unitary and indivisible unit with each other, and the first plate region 210 and the first body 510 of the foldable device 1013 shown in FIG. 14 may be integrally formed as a single unitary and indivisible unit with each other.

In one alternative embodiment, for example, the second region 320 and the second body 120 of the foldable device 1005 shown in FIG. 5 may be integrally formed as a single unitary and indivisible unit with the first region 310 and the first body 510 of the foldable device 1012 shown in FIG. 12, respectively. In such an embodiment, the second plate region 220 and the second body 120 of the foldable device 1005 shown in FIG. 5 may be integrally formed as a single unitary and indivisible unit with each other.

In one alternative embodiment, for example, the second region 320, the second plate region 220 and the second body 120 of the foldable device 1005 shown in FIG. 5 may be integrally formed as a single unitary and indivisible unit with the first region 310, the first plate region 210 and the first body 510 of the foldable device 1013 shown in FIG. 14, respectively. In such an embodiment, the second plate region 220 and the second body 120 of the foldable device 1005 shown in FIG. 5 may be integrally formed as a single unitary and indivisible unit with each other, and the first plate region 210 and the first body 510 of the foldable device 1013 shown in FIG. 14 may be integrally formed as a single unitary and indivisible unit with each other.

In one alternative embodiment, for example, the second region 320 and the second body 120 of the foldable device 1009 shown in FIG. 9 may be integrally formed as a single unitary and indivisible unit with the first region 310 and the first body 510 of the foldable device 1012 shown in FIG. 12, respectively. In such an embodiment, the second plate region 220 and the second body 120 of the foldable device 1009 shown in FIG. 9 may be integrally formed as a single unitary and indivisible unit with each other.

In one alternative embodiment, for example, the second region 320, the second plate region 220 and the second body 120 of the foldable device 1009 shown in FIG. 9 may be integrally formed as a single unitary and indivisible unit with the first region 310, the first plate region 210 and the first body 510 of the foldable device 1013 shown in FIG. 14, respectively. In such an embodiment, the second plate region 220 and the second body 120 of the foldable device 1009 shown in FIG. 9 may be integrally formed as a single unitary and indivisible unit with each other, and the first plate region 210 and the first body 510 of the foldable device 1013 shown in FIG. 14 may be integrally formed as a single unitary and indivisible unit with each other.

In one alternative embodiment, for example, the second region 320 and the second body 120 of the foldable device 1010 shown in FIG. 10 may be integrally formed as a single unitary and indivisible unit with the first region 310 and the first body 510 of the foldable device 1012 shown in FIG. 12, respectively. In such an embodiment, the second plate region 220 and the second body 120 of the foldable device 1010 shown in FIG. 10 may be integrally formed as a single unitary and indivisible unit with each other.

In one alternative embodiment, for example, the second region 320, the second plate region 220 and the second body 120 of the foldable device 1010 shown in FIG. 10 may be integrally formed as a single unitary and indivisible unit with the first region 310, the first plate region 210 and the first body 510 of the foldable device 1013 shown in FIG. 14, respectively. In such an embodiment, the second plate region 220 and the second body 120 of the foldable device 1010 shown in FIG. 10 may be integrally formed as a single unitary and indivisible unit with each other, and the first plate region 210 and the first body 510 of the foldable device 1013 shown in FIG. 14 may be integrally formed as a single unitary and indivisible unit with each other.

In Embodiment 4, the flexible display panel 300 has a position horizontally fixed to the hinge structure at the point P3, the point P4 and the point P5 of the foldable device 2001. Therefore, the flexible display panel 300 can be firmly fixed to the hinge structure.

Embodiment 5 may be implemented as described in Embodiment 2.

Embodiment 6 may be implemented as described in Embodiment 1.

According to embodiments, the foldable device 2001 shown in FIG. 21 may be formed by connecting one selected from the group of a right side R of the foldable device 1002 shown in FIG. 2, a left side L of the foldable device 1003 shown in FIG. 3, a right side R of the foldable device 1007 shown in FIG. 7 and a left side L of the foldable device 1008 shown in FIG. 8 to one selected from the group of the left side L of the foldable device 1012 shown in FIG. 12 and the left side L of the foldable device 1013 shown in FIG. 14 in a state where they are placed to face each other. This case can be understood as a modified example in which the left side L of the foldable device 1008 shown in FIG. 8 is disposed on the right side R of the foldable device 1008.

In one embodiment, for example, a second region 320 and the second plate region 220 of the foldable device 1002 shown in FIG. 2 may be integrally formed as a single unitary and indivisible unit with the first region 310 and the first body 510 of the foldable device 1012 shown in FIG. 12, respectively.

In one alternative embodiment, for example, the second region 320 and the second plate region 220 of the foldable device 1002 shown in FIG. 2 may be integrally formed as a single unitary and indivisible unit with the first region 310 and the first plate region 210 of the foldable device 1013 shown in FIG. 14, respectively. In such an embodiment, the first plate region 210 and the first body 510 of the foldable device 1013 shown in FIG. 14 may be integrally formed as a single unitary and indivisible unit with each other. Alternatively, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, a first region 310 and the first plate region 210 of the foldable device 1003 shown in FIG. 3 may be integrally formed as a single unitary and indivisible unit with the first region 310 and the first body 510 of the foldable device 1012 shown in FIG. 12, respectively.

In one alternative embodiment, for example, the first region 310 and the first plate region 210 of the foldable device 1003 shown in FIG. 3 may be integrally formed as a single unitary and indivisible unit with the first region 310 and the first plate region 210 of the foldable device 1013 shown in FIG. 14, respectively. In such an embodiment, the first plate region 210 and the first body 510 of the foldable device 1013 shown in FIG. 14 may be integrally formed as a single unitary and indivisible unit with each other. Alternatively, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, a second region 320 and the second plate region 220 of the foldable device 1007 shown in FIG. 7 may be integrally formed as a single unitary and indivisible unit with the first region 310 and the first body 510 of the foldable device 1012 shown in FIG. 12, respectively.

In one alternative embodiment, for example, the second region 320 and the second plate region 220 of the foldable device 1007 shown in FIG. 7 may be integrally formed as a single unitary and indivisible unit with the first region 310 and the first plate region 210 of the foldable device 1013 shown in FIG. 14, respectively. In such an embodiment, the first plate region 210 and the first body 510 of the foldable device 1013 shown in FIG. 14 may be integrally formed as a single unitary and indivisible unit with each other. Alternatively, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, a first region 310 and the first plate region 210 of the foldable device 1008 shown in FIG. 8 may be integrally formed as a single unitary and indivisible unit with the first region 310 and the first body 510 of the foldable device 1012 shown in FIG. 12, respectively.

In one alternative embodiment, for example, the first region 310 and the first plate region 210 of the foldable device 1008 shown in FIG. 8 may be integrally formed as a single unitary and indivisible unit with the first region 310 and the first plate region 210 of the foldable device 1013 shown in FIG. 14, respectively. In such an embodiment, the first plate region 210 and the first body 510 of the foldable device 1013 shown in FIG. 14 may be integrally formed as a single unitary and indivisible unit with each other. Alternatively, the first plate region 210 and the second plate region 220 of the foldable device 1013 shown in FIG. 14 may be integrally formed as a single unitary and indivisible unit with the first body 510 and the second body 520, respectively.

Figure 22:
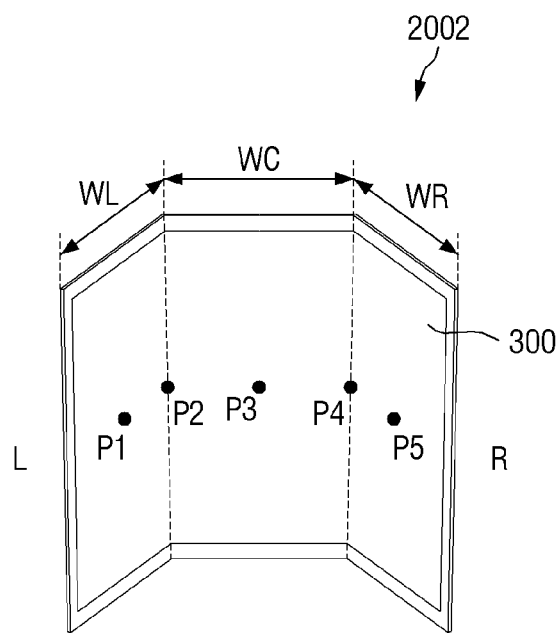
FIG. 22 is a perspective view of a foldable device according to an alternative embodiment.

FIG. 22 is a perspective view of a foldable device 2002 according to an alternative embodiment. In FIG. 22, a dotted line indicates a state where a flexible display panel 300 is in-folded by an in-foldable or in-out-foldable hinge. A middle width WC may be substantially equal to a right width WR and a left width WL. Alternatively, the middle width WC may be substantially greater than the right width WR and the left width WL. In one embodiment, for example, the right width WR and the left width WL may be substantially equal, and the middle width WC may be about twice the right width WR and the left width WL.

TABLE 2

|  | P1 | P2 | P3 | P4 | P5 |
|---|---|---|---|---|---|
| Embodiment 7 | F | S | S | S | S |
| Embodiment 8 | F | F | F | S | S |
| Embodiment 9 | F | F | F | F | F |
| Embodiment 10 | S | S | F | F | F |
| Embodiment 11 | S | S | S | S | F |

Table 2 shows whether the flexible display panel 300 has a position horizontally fixed to a hinge structure at points P1 through P5 in FIG. 22. In Table 2, a case where the flexible display panel 300 has a position horizontally fixed to the hinge structure is indicated by "F," and a case where the flexible display panel 300 is slidable without having a position horizontally fixed to the hinge structure is indicated by "S."

Referring to FIG. 22 and table 2, Embodiment 7 may be as described in Embodiment 1.

Embodiment 8 may be implemented as described in Embodiment 4.

In Embodiment 8, the flexible display panel 300 has a position horizontally fixed to the hinge structure at the point P1, the point P2 and the point P3 of the foldable device 2002. Therefore, the flexible display panel 300 can be firmly fixed to the hinge structure.

Embodiment 9 may be achieved by connecting one selected from the group of the right side R of the foldable device 1012 shown in FIG. 12 and a right side R of the foldable device 1013 shown in FIG. 14 to one selected from the group of the left side L of the foldable device 1012 shown in FIG. 12 and the left side L of the foldable device 1013 shown in FIG. 14 in a state where they are placed to face each other.

In one embodiment, for example, the second region 320 and the second body 520 of the foldable device 1012 shown in FIG. 12 may be integrally formed as a single unitary and indivisible unit with the first region 310 and the first body 510 of another foldable device 1012 shown in FIG. 12, respectively.

In one alternative embodiment, for example, the second region 320, the second plate region 220 and the second body 520 of the foldable device 1013 shown in FIG. 14 may be integrally formed as a single unitary and indivisible unit with the first region 310, the first plate region 210 and the first body 510 of another foldable device 1013 shown in FIG. 14, respectively.

In one alternative embodiment, for example, the second region 320 and the second body 520 of the foldable device 1012 shown in FIG. 12 may be integrally formed as a single unitary and indivisible unit with the first region 310 and the first body 510 of the foldable device 1013 shown in FIG. 14, respectively. In such an embodiment, the first plate region 210 and the first body 510 of the foldable device 1013 shown in FIG. 14 may be integrally formed as a single unitary and indivisible unit with each other. Alternatively, the first plate region 210 and the second plate region 220 of the foldable device 1013 shown in FIG. 14 may be integrally formed as a single unitary and indivisible unit with the first body 510 and the second body 520, respectively.

In Embodiment 9, the flexible display panel 300 has a position horizontally fixed to the hinge structure at the point P1, the point P3 and the point P5 of the foldable device 2002. Therefore, the flexible display panel 300 can be firmly fixed to the hinge structure.

Embodiment 10 may be implemented as described in Embodiment 4.

In Embodiment 10, the flexible display panel 300 has a position horizontally fixed to the hinge structure at the point P3, the point P4 and the point P5 of the foldable device 2002. Therefore, the flexible display panel 300 can be firmly fixed to the hinge structure.

Embodiment 11 may be implemented as described in Embodiment 1.

Figure 23:
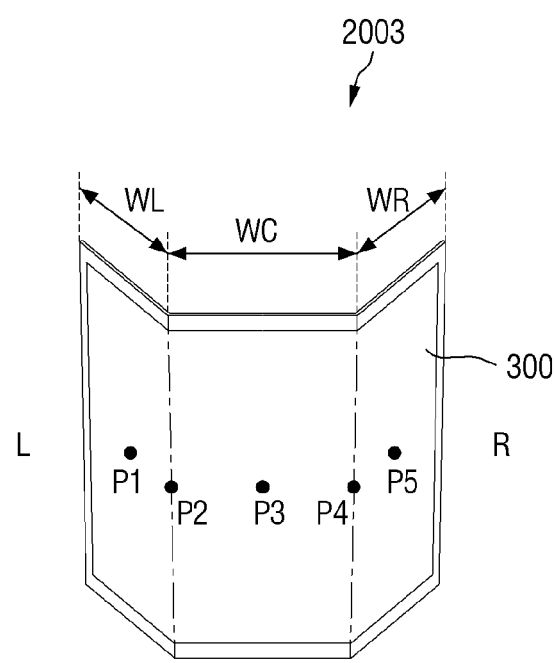
FIG. 23 is a perspective view of a foldable device according to another alternative embodiment.

FIG. 23 is a perspective view of a foldable device 2003 according to another alternative embodiment. In FIG. 23, a dash-dotted line indicates a state where a flexible display panel 300 is out-folded by an out-foldable or in-out-foldable hinge. A middle width WC may be substantially equal to a right width WR and a left width WL.

Alternatively, the middle width WC may be substantially greater than the right width WR and the left width WL. In one embodiment, for example, the right width WR and the left width WL may be substantially equal, and the middle width WC may be about twice the right width WR and the left width WL.

TABLE 3

|  | P1 | P2 | P3 | P4 | P5 |
|---|---|---|---|---|---|
| Embodiment 12 | F | S | S | S | S |
| Embodiment 13 | S | F | S | S | S |
| Embodiment 14 | S | S | F | S | S |
| Embodiment 15 | S | S | S | F | S |
| Embodiment 16 | S | S | S | S | F |

Table 3 shows whether the flexible display panel 300 has a position horizontally fixed to a hinge structure at points P1 through P5 in FIG. 23. In Table 3, a case where the flexible display panel 300 has a position horizontally fixed to the hinge structure is indicated by "F," and a case where the flexible display panel 300 is slidable without having a position horizontally fixed to the hinge structure is indicated by "S."

Referring to FIG. 23 and table 3, Embodiment 12 may be implemented as described in Embodiment 1.

Embodiment 13 may be implemented as described in Embodiment 2.

Embodiment 14 may be implemented as described in Embodiment 3.

In Embodiment 14, the flexible display panel 300 has a position horizontally fixed to the hinge structure at the point P3 located at the center of the foldable device 2003. Therefore, the force required between the point P3 and the point P5 to fold or unfold the foldable device 2003 is substantially equal to the force required between the point P3 and the point P1 to fold or unfold the foldable device 2003.

Embodiment 15 may be implemented as described in Embodiment 2.

Embodiment 16 may be implemented as described in Embodiment 1.

According to embodiments, the foldable device 2003 shown in FIG. 23 may be formed by placing one selected from the group of the right side R of the foldable device 1002 shown in FIG. 2, the left side L of the foldable device 1003 shown in FIG. 3, the right side R of the foldable device 1007 shown in FIG. 7, the left side L of the foldable device 1008 shown in FIG. 8, a left side L of the foldable device 1005 shown in FIG. 5 and a left side L of the foldable device 1010 shown in FIG. 10 on a right side R of a foldable device (i.e., the foldable device 2003 shown in FIG. 23, hereinafter, referred to as the foldable device) and connecting the right side R of the foldable device 1002 shown in FIG. 2, the left side L of the foldable device 1003 shown in FIG. 3, the right side R of the foldable device 1007 shown in FIG. 7, the left side L of the foldable device 1008 shown in FIG. 8, the left side L of the foldable device 1005 shown in FIG. 5 or the left side L of the foldable device 1010 shown in FIG. 10 to one selected from the group of a left side L of the foldable device 1002 shown in FIG. 2, the left side L of the foldable device 1003 shown in FIG. 3, a left side L of the foldable device 1007 shown in FIG. 7, the left side L of the foldable device 1008 shown in FIG. 8, the left side L of the foldable device 1005 shown in FIG. 5 and the left side L of the foldable device 1010 shown in FIG. 10 in a state where they are placed to face each other.

In one embodiment, for example, the second region 320 and the second plate region 220 of the foldable device 1002 shown in FIG. 2 may be integrally formed as a single unitary and indivisible unit with a first region 310 and the first plate region 210 of another foldable device 1002 shown in FIG. 2, respectively. In such an embodiment, the second body 120 of the foldable device 1002 shown in FIG. 2 is spaced apart from the first body 110 of the another foldable device 1002 shown in FIG. 2.

In one alternative embodiment, for example, the second region 320 and the second plate region 220 of the foldable device 1002 shown in FIG. 2 may be integrally formed as a single unitary and indivisible unit with the first region 310 and the first plate region 210 of the foldable device 1003 shown in FIG. 3, respectively. In such an embodiment, the second body 120 of the foldable device 1002 shown in FIG. 2 is spaced apart from the first body 110 of the foldable device 1003 shown in FIG. 3.

In one alternative embodiment, for example, the second region 320 and the second plate region 220 of the foldable device 1002 shown in FIG. 2 may be integrally formed as a single unitary and indivisible unit with a first region 310 and the first plate region 210 of the foldable device 1007 shown in FIG. 7, respectively. In such an embodiment, the second body 120 of the foldable device 1002 shown in FIG. 2 is spaced apart from the first body 110 of the foldable device 1007 shown in FIG. 7.

In one alternative embodiment, for example, the second region 320 and the second plate region 220 of the foldable device 1002 shown in FIG. 2 may be integrally formed as a single unitary and indivisible unit with the first region 310 and the first plate region 210 of the foldable device 1008 shown in FIG. 8, respectively. In such an embodiment, the second body 120 of the foldable device 1002 shown in FIG. 2 is spaced apart from the first body 110 of the foldable device 1008 shown in FIG. 8.

In one alternative embodiment, for example, the second region 320 and the second plate region 220 of the foldable device 1002 shown in FIG. 2 may be integrally formed as a single unitary and indivisible unit with a first region 310 and the first plate region 210 of the foldable device 1005 shown in FIG. 5, respectively. In such an embodiment, the second body 120 of the foldable device 1002 shown in FIG. 2 is spaced apart from the first body 110 of the foldable device 1005 shown in FIG. 5.

In one alternative embodiment, for example, the second region 320 and the second plate region 220 of the foldable device 1002 shown in FIG. 2 may be integrally formed as a single unitary and indivisible unit with a first region 310 and the first plate region 210 of the foldable device 1010 shown in FIG. 10, respectively. In such an embodiment, the second body 120 of the foldable device 1002 shown in FIG. 2 is spaced apart from the first body 110 of the foldable device 1010 shown in FIG. 10.

In one alternative embodiment, for example, the first region 310 and the first plate region 210 of the foldable device 1003 shown in FIG. 3 may be integrally formed as a single unitary and indivisible unit with the first region 310 and the first plate region 210 of the foldable device 1002 shown in FIG. 2, respectively. In such an embodiment, the first body 110 of the foldable device 1003 shown in FIG. 3 is spaced apart from the first body 110 of the foldable device 1002 shown in FIG. 2. In such an embodiment, the first region 310 and the first plate region 210 of the foldable device 1003 shown in FIG. 3 may be disposed on a right side R of a foldable device, and the first region 310 and the first plate region 210 of the foldable device 1002 shown in FIG. 2 may be disposed on a left side L of the foldable device.

In one alternative embodiment, for example, the first region 310 and the first plate region 210 of the foldable device 1003 shown in FIG. 3 may be integrally formed as a single unitary and indivisible unit with the first region 310 and the first plate region 210 of another foldable device 1003 shown in FIG. 3, respectively. In such an embodiment, the first body 110 of the foldable device 1003 shown in FIG. 3 is spaced apart from the first body 110 of the another foldable device 1003 shown in FIG. 3. In such an embodiment, the first region 310 and the first plate region 210 of the foldable device 1003 shown in FIG. 3 may be disposed on a right side R of a foldable device, and the first region 310 and the first plate region 210 of the another foldable device 1003 shown in FIG. 3 may be disposed on a left side L of the foldable device.

In one alternative embodiment, for example, the first region 310 and the first plate region 210 of the foldable device 1003 shown in FIG. 3 may be integrally formed as a single unitary and indivisible unit with the first region 310 and the first plate region 210 of the foldable device 1007 shown in FIG. 7, respectively. In such an embodiment, the first body 110 of the foldable device 1003 shown in FIG. 3 is spaced apart from the first body 110 of the foldable device 1007 shown in FIG. 7. In such an embodiment, the first region 310 and the first plate region 210 of the foldable device 1003 shown in FIG. 3 may be disposed on a right side R of a foldable device, and the first region 310 and the first plate region 210 of the foldable device 1007 shown in FIG. 7 may be disposed on a left side L of the foldable device.

In one alternative embodiment, for example, the first region 310 and the first plate region 210 of the foldable device 1003 shown in FIG. 3 may be integrally formed as a single unitary and indivisible unit with the first region 310 and the first plate region 210 of the foldable device 1008 shown in FIG. 8, respectively. In such an embodiment, the first body 110 of the foldable device 1003 shown in FIG. 3 is spaced apart from the first body 110 of the foldable device 1008 shown in FIG. 8. In such an embodiment, the first region 310 and the first plate region 210 of the foldable device 1003 shown in FIG. 3 may be disposed on a right side R of a foldable device, and the first region 310 and the first plate region 210 of the foldable device 1008 shown in FIG. 8 may be disposed on a left side L of the foldable device.

In one alternative embodiment, for example, the first region 310 and the first plate region 210 of the foldable device 1003 shown in FIG. 3 may be integrally formed as a single unitary and indivisible unit with the first region 310 and the first plate region 210 of the foldable device 1005 shown in FIG. 5, respectively. In such an embodiment, the first body 110 of the foldable device 1003 shown in FIG. 3 is spaced apart from the first body 110 of the foldable device 1005 shown in FIG. 5. In such an embodiment, the first region 310 and the first plate region 210 of the foldable device 1003 shown in FIG. 3 may be disposed on a right side R of a foldable device, and the first region 310 and the first plate region 210 of the foldable device 1005 shown in FIG. 5 may be disposed on a left side L of the foldable device.

In one alternative embodiment, for example, the first region 310 and the first plate region 210 of the foldable device 1003 shown in FIG. 3 may be integrally formed as a single unitary and indivisible unit with the first region 310 and the first plate region 210 of the foldable device 1010 shown in FIG. 10, respectively. In such an embodiment, the first body 110 of the foldable device 1003 shown in FIG. 3 is spaced apart from the first body 110 of the foldable device 1010 shown in FIG. 10. In such an embodiment, the first region 310 and the first plate region 210 of the foldable device 1003 shown in FIG. 3 may be disposed on a right side R of a foldable device, and the first region 310 and the first plate region 210 of the foldable device 1010 shown in FIG. 10 may be disposed on a left side L of the foldable device.

In one alternative embodiment, for example, the second region 320 and the second plate region 220 of the foldable device 1007 shown in FIG. 7 may be integrally formed as a single unitary and indivisible unit with the first region 310 and the first plate region 210 of the foldable device 1002 shown in FIG. 2, respectively. In such an embodiment, the second body 120 of the foldable device 1007 shown in FIG. 7 is spaced apart from the first body 110 of the foldable device 1002 shown in FIG. 2. In such an embodiment, the second region 320 and the second plate region 220 of the foldable device 1007 shown in FIG. 7 may be disposed on a right side R of a foldable device, and the first region 310 and the first plate region 210 of the foldable device 1002 shown in FIG. 2 may be disposed on a left side L of the foldable device.

In one alternative embodiment, for example, the second region 320 and the second plate region 220 of the foldable device 1007 shown in FIG. 7 may be integrally formed as a single unitary and indivisible unit with the first region 310 and the first plate region 210 of the foldable device 1003 shown in FIG. 3, respectively. In such an embodiment, the second body 120 of the foldable device 1007 shown in FIG. 7 is spaced apart from the first body 110 of the foldable device 1003 shown in FIG. 3. In such an embodiment, the second region 320 and the second plate region 220 of the foldable device 1007 shown in FIG. 7 may be disposed on a right side R of a foldable device, and the first region 310 and the first plate region 210 of the foldable device 1003 shown in FIG. 3 may be disposed on a left side L of the foldable device.

In one alternative embodiment, for example, the second region 320 and the second plate region 220 of the foldable device 1007 shown in FIG. 7 may be integrally formed as a single unitary and indivisible unit with the first region 310 and the first plate region 210 of another foldable device 1007 shown in FIG. 7, respectively. In such an embodiment, the second body 120 of the foldable device 1007 shown in FIG. 7 is spaced apart from the first body 110 of the another foldable device 1007 shown in FIG. 7. In such an embodiment, the second region 320 and the second plate region 220 of the foldable device 1007 shown in FIG. 7 may be disposed on a right side R of a foldable device, and the first region 310 and the first plate region 210 of the another foldable device 1007 shown in FIG. 7 may be disposed on a left side L of the foldable device.

In one alternative embodiment, for example, the second region 320 and the second plate region 220 of the foldable device 1007 shown in FIG. 7 may be integrally formed as a single unitary and indivisible unit with the first region 310 and the first plate region 210 of the foldable device 1008 shown in FIG. 8, respectively. In such an embodiment, the second body 120 of the foldable device 1007 shown in FIG. 7 is spaced apart from the first body 110 of the foldable device 1008 shown in FIG. 8. In such an embodiment, the second region 320 and the second plate region 220 of the foldable device 1007 shown in FIG. 7 may be disposed on a right side R of a foldable device, and the first region 310 and the first plate region 210 of the foldable device 1008 shown in FIG. 8 may be disposed on a left side L of the foldable device.

In one alternative embodiment, for example, the second region 320 and the second plate region 220 of the foldable device 1007 shown in FIG. 7 may be integrally formed as a single unitary and indivisible unit with the first region 310 and the first plate region 210 of the foldable device 1005 shown in FIG. 5, respectively. In such an embodiment, the second body 120 of the foldable device 1007 shown in FIG. 7 is spaced apart from the first body 110 of the foldable device 1005 shown in FIG. 5. In such an embodiment, the second region 320 and the second plate region 220 of the foldable device 1007 shown in FIG. 7 may be disposed on a right side R of a foldable device, and the first region 310 and the first plate region 210 of the foldable device 1005 shown in FIG. 5 may be disposed on a left side L of the foldable device.

In one alternative embodiment, for example, the second region 320 and the second plate region 220 of the foldable device 1007 shown in FIG. 7 may be integrally formed as a single unitary and indivisible unit with the first region 310 and the first plate region 210 of the foldable device 1010 shown in FIG. 10, respectively. In such an embodiment, the second body 120 of the foldable device 1007 shown in FIG. 7 is spaced apart from the first body 110 of the foldable device 1010 shown in FIG. 10. In such an embodiment, the second region 320 and the second plate region 220 of the foldable device 1007 shown in FIG. 7 may be disposed on a right side R of a foldable device, and the first region 310 and the first plate region 210 of the foldable device 1010 shown in FIG. 10 may be disposed on a left side L of the foldable device.

In one alternative embodiment, for example, the first region 310 and the first plate region 210 of the foldable device 1008 shown in FIG. 8 may be integrally formed as a single unitary and indivisible unit with the first region 310 and the first plate region 210 of the foldable device 1002 shown in FIG. 2, respectively. In such an embodiment, the first body 110 of the foldable device 1008 shown in FIG. 8 is spaced apart from the first body 110 of the foldable device 1002 shown in FIG. 2. In such an embodiment, the first region 310 and the first plate region 210 of the foldable device 1008 shown in FIG. 8 may be disposed on a right side R of a foldable device, and the first region 310 and the first plate region 210 of the foldable device 1002 shown in FIG. 2 may be disposed on a left side L of the foldable device.

In one alternative embodiment, for example, the first region 310 and the first plate region 210 of the foldable device 1008 shown in FIG. 8 may be integrally formed as a single unitary and indivisible unit with the first region 310 and the first plate region 210 of the foldable device 1003 shown in FIG. 3, respectively. In such an embodiment, the first body 110 of the foldable device 1008 shown in FIG. 8 is spaced apart from the first body 110 of the foldable device 1003 shown in FIG. 3. In such an embodiment, the first region 310 and the first plate region 210 of the foldable device 1008 shown in FIG. 8 may be disposed on a right side R of a foldable device, and the first region 310 and the first plate region 210 of the foldable device 1003 shown in FIG. 3 may be disposed on a left side L of the foldable device.

In one alternative embodiment, for example, the first region 310 and the first plate region 210 of the foldable device 1008 shown in FIG. 8 may be integrally formed as a single unitary and indivisible unit with the first region 310 and the first plate region 210 of the foldable device 1007 shown in FIG. 7, respectively. In such an embodiment, the first body 110 of the foldable device 1008 shown in FIG. 8 is spaced apart from the first body 110 of the foldable device 1007 shown in FIG. 7. In such an embodiment, the first region 310 and the first plate region 210 of the foldable device 1008 shown in FIG. 8 may be disposed on a right side R of a foldable device, and the first region 310 and the first plate region 210 of the foldable device 1007 shown in FIG. 7 may be disposed on a left side L of the foldable device.

In one alternative embodiment, for example, the first region 310 and the first plate region 210 of the foldable device 1008 shown in FIG. 8 may be integrally formed as a single unitary and indivisible unit with the first region 310 and the first plate region 210 of another foldable device 1008 shown in FIG. 8, respectively. In such an embodiment, the first body 110 of the foldable device 1008 shown in FIG. 8 is spaced apart from the first body 110 of the another foldable device 1008 shown in FIG. 8. In such an embodiment, the first region 310 and the first plate region 210 of the foldable device 1008 shown in FIG. 8 may be disposed on a right side R of a foldable device, and the first region 310 and the first plate region 210 of the another foldable device 1008 shown in FIG. 8 may be disposed on a left side L of the foldable device.

In one alternative embodiment, for example, the first region 310 and the first plate region 210 of the foldable device 1008 shown in FIG. 8 may be integrally formed as a single unitary and indivisible unit with the first region 310 and the first plate region 210 of the foldable device 1005 shown in FIG. 5, respectively. In such an embodiment, the first body 110 of the foldable device 1008 shown in FIG. 8 is spaced apart from the first body 110 of the foldable device 1005 shown in FIG. 5. In such an embodiment, the first region 310 and the first plate region 210 of the foldable device 1008 shown in FIG. 8 may be disposed on a right side R of a foldable device, and the first region 310 and the first plate region 210 of the foldable device 1005 shown in FIG. 5 may be disposed on a left side L of the foldable device.

In one alternative embodiment, for example, the first region 310 and the first plate region 210 of the foldable device 1008 shown in FIG. 8 may be integrally formed as a single unitary and indivisible unit with the first region 310 and the first plate region 210 of the foldable device 1010 shown in FIG. 10, respectively. In such an embodiment, the first body 110 of the foldable device 1008 shown in FIG. 8 is spaced apart from the first body 110 of the foldable device 1010 shown in FIG. 10. In such an embodiment, the first region 310 and the first plate region 210 of the foldable device 1008 shown in FIG. 8 may be disposed on a right side R of a foldable device, and the first region 310 and the first plate region 210 of the foldable device 1010 shown in FIG. 10 may be disposed on a left side L of the foldable device.

In one alternative embodiment, for example, the first region 310 and the first plate region 210 of the foldable device 1005 shown in FIG. 5 may be integrally formed as a single unitary and indivisible unit with the first region 310 and the first plate region 210 of the foldable device 1002 shown in FIG. 2, respectively. In such an embodiment, the first body 110 of the foldable device 1005 shown in FIG. 5 is spaced apart from the first body 110 of the foldable device 1002 shown in FIG. 2. In such an embodiment, the first region 310 and the first plate region 210 of the foldable device 1005 shown in FIG. 5 may be disposed on a right side R of a foldable device, and the first region 310 and the first plate region 210 of the foldable device 1002 shown in FIG. 2 may be disposed on a left side L of the foldable device.

In one alternative embodiment, for example, the first region 310 and the first plate region 210 of the foldable device 1005 shown in FIG. 5 may be integrally formed as a single unitary and indivisible unit with the first region 310 and the first plate region 210 of the foldable device 1003 shown in FIG. 3, respectively. In such an embodiment, the first body 110 of the foldable device 1005 shown in FIG. 5 is spaced apart from the first body 110 of the foldable device 1003 shown in FIG. 3. In such an embodiment, the first region 310 and the first plate region 210 of the foldable device 1005 shown in FIG. 5 may be disposed on a right side R of a foldable device, and the first region 310 and the first plate region 210 of the foldable device 1003 shown in FIG. 3 may be disposed on a left side L of the foldable device.

In one alternative embodiment, for example, the first region 310 and the first plate region 210 of the foldable device 1005 shown in FIG. 5 may be integrally formed as a single unitary and indivisible unit with the first region 310 and the first plate region 210 of the foldable device 1007 shown in FIG. 7, respectively. In such an embodiment, the first body 110 of the foldable device 1005 shown in FIG. 5 is spaced apart from the first body 110 of the foldable device 1007 shown in FIG. 7. In such an embodiment, the first region 310 and the first plate region 210 of the foldable device 1005 shown in FIG. 5 may be disposed on a right side R of a foldable device, and the first region 310 and the first plate region 210 of the foldable device 1007 shown in FIG. 7 may be disposed on a left side L of the foldable device.

In one alternative embodiment, for example, the first region 310 and the first plate region 210 of the foldable device 1005 shown in FIG. 5 may be integrally formed as a single unitary and indivisible unit with the first region 310 and the first plate region 210 of the foldable device 1008 shown in FIG. 8, respectively. In such an embodiment, the first body 110 of the foldable device 1005 shown in FIG. 5 is spaced apart from the first body 110 of the foldable device 1008 shown in FIG. 8. In such an embodiment, the first region 310 and the first plate region 210 of the foldable device 1005 shown in FIG. 5 may be disposed on a right side R of a foldable device, and the first region 310 and the first plate region 210 of the foldable device 1008 shown in FIG. 8 may be disposed on a left side L of the foldable device.

In one alternative embodiment, for example, the first region 310 and the first plate region 210 of the foldable device 1005 shown in FIG. 5 may be integrally formed as a single unitary and indivisible unit with the first region 310 and the first plate region 210 of another foldable device 1005 shown in FIG. 5, respectively. In such an embodiment, the first body 110 of the another foldable device 1005 shown in FIG. 5 is spaced apart from the first body 110 of the foldable device 1005 shown in FIG. 5. In such an embodiment, the first region 310 and the first plate region 210 of the foldable device 1005 shown in FIG. 5 may be disposed on a right side R of a foldable device, and the first region 310 and the first plate region 210 of the another foldable device 1005 shown in FIG. 5 may be disposed on a left side L of the foldable device.

In one alternative embodiment, for example, the first region 310 and the first plate region 210 of the foldable device 1005 shown in FIG. 5 may be integrally formed as a single unitary and indivisible unit with the first region 310 and the first plate region 210 of the foldable device 1010 shown in FIG. 10, respectively. In such an embodiment, the first body 110 of the foldable device 1005 shown in FIG. 5 is spaced apart from the first body 110 of the foldable device 1010 shown in FIG. 10. In such an embodiment, the first region 310 and the first plate region 210 of the foldable device 1005 shown in FIG. 5 may be disposed on a right side R of a foldable device, and the first region 310 and the first plate region 210 of the foldable device 1010 shown in FIG. 10 may be disposed on a left side L of the foldable device.

In one alternative embodiment, for example, the first region 310 and the first plate region 210 of the foldable device 1010 shown in FIG. 10 may be integrally formed as a single unitary and indivisible unit with the first region 310 and the first plate region 210 of the foldable device 1002 shown in FIG. 2, respectively. In such an embodiment, the first body 110 of the foldable device 1010 shown in FIG. 10 is spaced apart from the first body 110 of the foldable device 1002 shown in FIG. 2. In such an embodiment, the first region 310 and the first plate region 210 of the foldable device 1010 shown in FIG. 10 may be disposed on a right side R of a foldable device, and the first region 310 and the first plate region 210 of the foldable device 1002 shown in FIG. 2 may be disposed on a left side L of the foldable device.

In one alternative embodiment, for example, the first region 310 and the first plate region 210 of the foldable device 1010 shown in FIG. 10 may be integrally formed as a single unitary and indivisible unit with the first region 310 and the first plate region 210 of the foldable device 1003 shown in FIG. 3, respectively. In such an embodiment, the first body 110 of the foldable device 1010 shown in FIG. 10 is spaced apart from the first body 110 of the foldable device 1003 shown in FIG. 3. In such an embodiment, the first region 310 and the first plate region 210 of the foldable device 1010 shown in FIG. 10 may be disposed on a right side R of a foldable device, and the first region 310 and the first plate region 210 of the foldable device 1003 shown in FIG. 3 may be disposed on a left side L of the foldable device.

In one alternative embodiment, for example, the first region 310 and the first plate region 210 of the foldable device 1010 shown in FIG. 10 may be integrally formed as a single unitary and indivisible unit with the first region 310 and the first plate region 210 of the foldable device 1007 shown in FIG. 7, respectively. In such an embodiment, the first body 110 of the foldable device 1010 shown in FIG. 10 is spaced apart from the first body 110 of the foldable device 1007 shown in FIG. 7. In such an embodiment, the first region 310 and the first plate region 210 of the foldable device 1010 shown in FIG. 10 may be disposed on a right side R of a foldable device, and the first region 310 and the first plate region 210 of the foldable device 1007 shown in FIG. 7 may be disposed on a left side L of the foldable device.

In one alternative embodiment, for example, the first region 310 and the first plate region 210 of the foldable device 1010 shown in FIG. 10 may be integrally formed as a single unitary and indivisible unit with the first region 310 and the first plate region 210 of the foldable device 1008 shown in FIG. 8, respectively. In such an embodiment, the first body 110 of the foldable device 1010 shown in FIG. 10 is spaced apart from the first body 110 of the foldable device 1008 shown in FIG. 8. In such an embodiment, the first region 310 and the first plate region 210 of the foldable device 1010 shown in FIG. 10 may be disposed on a right side R of a foldable device, and the first region 310 and the first plate region 210 of the foldable device 1008 shown in FIG. 8 may be disposed on a left side L of the foldable device.

In one alternative embodiment, for example, the first region 310 and the first plate region 210 of the foldable device 1010 shown in FIG. 10 may be integrally formed as a single unitary and indivisible unit with the first region 310 and the first plate region 210 of the foldable device 1005 shown in FIG. 5, respectively. In such an embodiment, the first body 110 of the foldable device 1010 shown in FIG. 10 is spaced apart from the first body 110 of the foldable device 1005 shown in FIG. 5. In such an embodiment, the first region 310 and the first plate region 210 of the foldable device 1010 shown in FIG. 10 may be disposed on a right side R of a foldable device, and the first region 310 and the first plate region 210 of the foldable device 1005 shown in FIG. 5 may be disposed on a left side L of the foldable device.

In one alternative embodiment, for example, the first region 310 and the first plate region 210 of the foldable device 1010 shown in FIG. 10 may be integrally formed as a single unitary and indivisible unit with the first region 310 and the first plate region 210 of another foldable device 1010 shown in FIG. 10, respectively. In such an embodiment, the first body 110 of the foldable device 1010 shown in FIG. 10 is spaced apart from the first body 110 of the another foldable device 1010 shown in FIG. 10. In such an embodiment, the first region 310 and the first plate region 210 of the foldable device 1010 shown in FIG. 10 may be disposed on a right side R of a foldable device, and the first region 310 and the first plate region 210 of the another foldable device 1010 shown in FIG. 10 may be disposed on a left side L of the foldable device.

Figure 24:
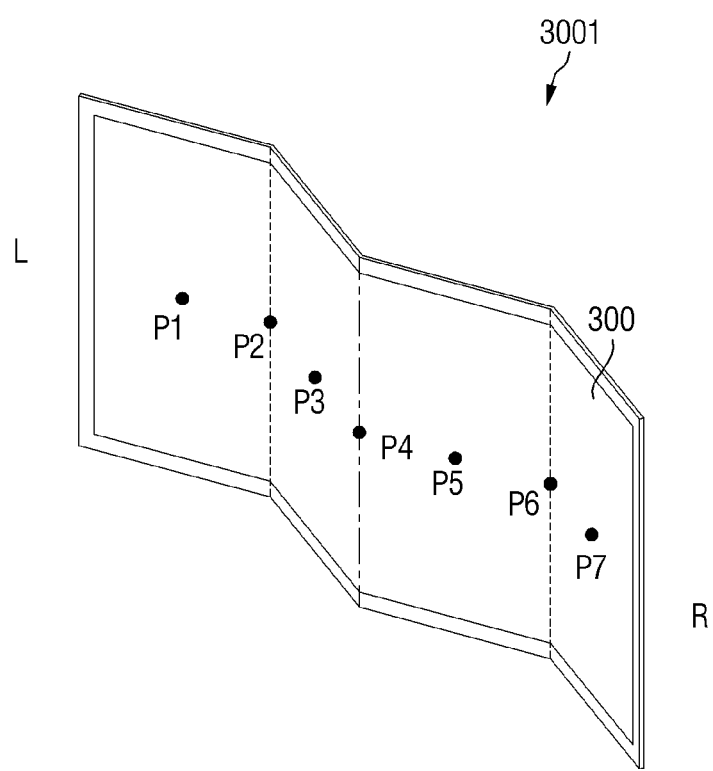
FIG. 24 is a perspective view of a foldable device according to another alternative embodiment.

FIG. 24 is a perspective view of a foldable device 3001 according to another alternative embodiment. In FIG. 24, a dash-dotted line indicates a state where a flexible display panel 300 is out-folded by an out-foldable or in-out-foldable hinge, and a dotted line indicates a state where the flexible display panel 300 is in-folded by an in-foldable or in-out-foldable hinge.

TABLE 4

|  | P1 | P2 | P3 | P4 | P5 | P6 | P7 |
|---|---|---|---|---|---|---|---|
| Embodiment 17 | F | S | S | S | S | S | S |
| Embodiment 18 | S | F | S | S | S | S | S |
| Embodiment 19 | F | F | F | S | S | S | S |
| Embodiment 20 | S | S | S | F | S | S | S |
| Embodiment 21 | S | S | S | S | F | S | S |
| Embodiment 22 | S | S | S | S | F | F | F |
| Embodiment 23 | S | S | S | S | S | F | S |
| Embodiment 24 | S | S | S | S | S | S | F |

Table 4 shows whether the flexible display panel 300 has a position horizontally fixed to a hinge structure at points P1 through P7 in FIG. 24. In Table 4, a case where the flexible display panel 300 has a position horizontally fixed to the hinge structure is indicated by "F," and a case where the flexible display panel 300 is slidable without having a position horizontally fixed to the hinge structure is indicated by "S."

Referring to FIG. 24 and table 4, Embodiment 17 may be achieved by using the foldable device 1011 shown in FIG. 11 as a middle foldable device 1011, connecting the left side L of the middle foldable device 1011 to one selected from the group of the left side L of the foldable device 1004 shown in FIG. 4 and the left side L of the foldable device 1009 shown in FIG. 9 in a state where they are placed to face each other, and connecting a right side R of the middle foldable device 1011 to the left side L of another foldable device 1011 shown in FIG. 11 in a state where they are placed to face each other.

In one embodiment, for example, the first region 310, the first plate region 210 and the first body 110 of the middle foldable device 1011 may be integrally formed as a single unitary and indivisible unit with the first region 310, the first plate region 210 and the first body 110 of the foldable device 1004 shown in FIG. 4, respectively, and the second region 320, the second plate region 220 and the second body 120 of the middle foldable device 1011 may be integrally formed as a single unitary and indivisible unit with the first region 310, the first plate region 210 and the first body 110 of another foldable device 1011 shown in FIG. 11, respectively.

In one alternative embodiment, for example, the first region 310, the first plate region 210 and the first body 110 of the middle foldable device 1011 may be integrally formed as a single unitary and indivisible unit with the first region 310, the first plate region 210 and the first body 110 of the foldable device 1009 shown in FIG. 9, respectively, and the second region 320, the second plate region 220 and the second body 120 of the middle foldable device 1011 may be integrally formed as a single unitary and indivisible unit with the first region 310, the first plate region 210 and the first body 110 of another foldable device 1011 shown in FIG. 11, respectively.

Embodiment 18 may be achieved by using the foldable device 1011 shown in FIG. 11 as a middle foldable device 1011, connecting the left side L of the middle foldable device 1011 to one selected from the group of the right side R of the foldable device 1001 shown in FIG. 1, the left side L of the foldable device 1001 shown in FIG. 1, the right side R of the foldable device 1003 shown in FIG. 3, a left side L of the foldable device 1006 shown in FIG. 6, the right side R of the foldable device 1006 shown in FIG. 6 and the right side R of the foldable device 1008 shown in FIG. 8 in a state where they are placed to face each other, and connecting the right side R of the middle foldable device 1011 to the left side L of another foldable device 1011 shown in FIG. 11 in a state where they are placed to face each other.

In one embodiment, for example, the first region 310, the first plate region 210 and the first body 110 of the middle foldable device 1011 shown in FIG. 11 may be integrally formed as a single unitary and indivisible unit with the second region 320, the second plate region 220 and the second body 120 of the foldable device 1001 shown in FIG. 1, respectively, and the second region 320, the second plate region 220 and the second body 120 of the middle foldable device 1011 shown in FIG. 11 may be integrally formed as a single unitary and indivisible unit with the first region 310, the first plate region 210 and the first body 110 of another foldable device 1011 shown in FIG. 11, respectively.

In one alternative embodiment, for example, the first region 310, the first plate region 210 and the first body 110 of the middle foldable device 1011 shown in FIG. 11 may be integrally formed as a single unitary and indivisible unit with the first region 310, the first plate region 210 and the first body 110 of the foldable device 1001 shown in FIG. 1, respectively, and the second region 320, the second plate region 220 and the second body 120 of the middle foldable device 1011 shown in FIG. 11 may be integrally formed as a single unitary and indivisible unit with the first region 310, the first plate region 210 and the first body 110 of another foldable device 1011 shown in FIG. 11, respectively.

In one alternative embodiment, for example, the first region 310, the first plate region 210 and the first body 110 of the middle foldable device 1011 shown in FIG. 11 may be integrally formed as a single unitary and indivisible unit with the second region 320, the second plate region 220 and the second body 120 of the foldable device 1003 shown in FIG. 3, respectively, and the second region 320, the second plate region 220 and the second body 120 of the middle foldable device 1011 shown in FIG. 11 may be integrally formed as a single unitary and indivisible unit with the first region 310, the first plate region 210 and the first body 110 of another foldable device 1011 shown in FIG. 11, respectively.

In one alternative embodiment, for example, the first region 310, the first plate region 210 and the first body 110 of the middle foldable device 1011 shown in FIG. 11 may be integrally formed as a single unitary and indivisible unit with the second region 320, the second plate region 220 and the second body 120 of the foldable device 1006 shown in FIG. 6, respectively, and the second region 320, the second plate region 220 and the second body 120 of the middle foldable device 1011 shown in FIG. 11 may be integrally formed as a single unitary and indivisible unit with the first region 310, the first plate region 210 and the first body 110 of another foldable device 1011 shown in FIG. 11, respectively.

In one alternative embodiment, for example, the first region 310, the first plate region 210 and the first body 110 of the middle foldable device 1011 shown in FIG. 11 may be integrally formed as a single unitary and indivisible unit with the first region 310, the first plate region 210 and the first body 110 of the foldable device 1006 shown in FIG. 6, respectively, and the second region 320, the second plate region 220 and the second body 120 of the middle foldable device 1011 shown in FIG. 11 may be integrally formed as a single unitary and indivisible unit with the first region 310, the first plate region 210 and the first body 110 of another foldable device 1011 shown in FIG. 11, respectively.

In one alternative embodiment, for example, the first region 310, the first plate region 210 and the first body 110 of the middle foldable device 1011 shown in FIG. 11 may be integrally formed as a single unitary and indivisible unit with the second region 320, the second plate region 220 and the second body 120 of the foldable device 1008 shown in FIG. 8, respectively, and the second region 320, the second plate region 220 and the second body 120 of the middle foldable device 1011 shown in FIG. 11 may be integrally formed as a single unitary and indivisible unit with the first region 310, the first plate region 210 and the first body 110 of another foldable device 1011 shown in FIG. 11, respectively.

Embodiment 19 may be achieved by using the foldable device 1004 shown in FIG. 4 as a middle foldable device 1004, connecting the right side R of the middle foldable device 1004 to one selected from the group of the right side R of the foldable device 1012 shown in FIG. 12 and the right side R of the foldable device 1013 shown in FIG. 14 in a state where they are placed to face each other, and connecting the left side L of the middle foldable device 1004 to the left side L of the foldable device 1011 shown in FIG. 11 in a state where they are placed to face each other.

In one embodiment, for example, the second region 320 and the second body 120 of the middle foldable device 1004 may be integrally formed as a single unitary and indivisible unit with the second region 320 and the second body 520 of the foldable device 1012 shown in FIG. 12, respectively, and may be disposed on the left side L of the foldable device 3001, and the first region 310, the first plate region 210 and the first body 110 of the middle foldable device 1004 may be integrally formed as a single unitary and indivisible unit with the first region 310, the first plate region 210 and the first body 110 of the foldable device 1011 shown in FIG. 11, respectively, and may be disposed on the right side R of the foldable device 3001. In such an embodiment, the first plate region 210 and the first body 110 of the middle foldable device 1004 may be integrally formed as a single unitary and indivisible unit with each other.

In one alternative embodiment, for example, the second region 320, the second plate region 220 and the second body 120 of the middle foldable device 1004 may be integrally formed as a single unitary and indivisible unit with the second region 320, the second plate region 220 and the second body 520 of the foldable device 1013 shown in FIG. 14, respectively, and may be disposed on the left side L of the foldable device 3001, and the first region 310, the first plate region 210 and the first body 110 of the middle foldable device 1004 may be integrally formed as a single unitary and indivisible unit with the first region 310, the first plate region 210 and the first body 110 of the foldable device 1011 shown in FIG. 11, respectively, and may be disposed on the right side R of the foldable device 3001.

In Embodiment 19, the flexible display panel 300 has a position horizontally fixed to the hinge structure at the point P1, the point P2 and the point P3 of the foldable device 3001. Therefore, the flexible display panel 300 can be firmly fixed to the hinge structure.

Embodiment 20 may be achieved by using one selected from the group of the foldable device 1001 shown in FIG. 1 and the foldable device 1006 shown in FIG. 6 as a middle foldable device, connecting a left side L of the middle foldable device to the right side R of the foldable device 1011 shown in FIG. 11 in a state where they are placed to face each other, and connecting a right side R of the middle foldable device to the left side L of another foldable device 1011 shown in FIG. 11 in a state where they are placed to face each other.

In one embodiment, for example, the first region 310, the first plate region 210 and the first body 110 of the middle foldable device 1001 shown in FIG. 1 may be integrally formed as a single unitary and indivisible unit with the second region 320, the second plate region 220 and the second body 120 of the foldable device 1011 shown in FIG. 11, respectively, and the second region 320, the second plate region 220 and the second body 120 of the middle foldable device 1001 may be integrally formed as a single unitary and indivisible unit with the first region 310, the first plate region 210 and the first body 110 of another foldable device 1011 shown in FIG. 11, respectively.

In one alternative embodiment, for example, the first region 310, the first plate region 210 and the first body 110 of the middle foldable device 1006 shown in FIG. 6 may be integrally formed as a single unitary and indivisible unit with the second region 320, the second plate region 220 and the second body 120 of the foldable device 1011 shown in FIG. 11, respectively, and the second region 320, the second plate region 220 and the second body 120 of the middle foldable device 1006 may be integrally formed as a single unitary and indivisible unit with the first region 310, the first plate region 210 and the first body 110 of another foldable device 1011 shown in FIG. 11, respectively.

In Embodiment 20, the flexible display panel 300 has a position horizontally fixed to the hinge structure at the point P4 located at the center of the foldable device 3001. Therefore, the force required between the point P4 and the point P1 to fold or unfold the foldable device 3001 may be substantially equal to the force required between the point P4 and the point P7 to fold or unfold the foldable device 3001.

Embodiment 21 may be achieved by using the foldable device 1004 shown in FIG. 4 as a middle foldable device 1004, connecting the left side L of the middle foldable device 1004 to the right side R of the foldable device 1011 shown in FIG. 11 in a state where they are placed to face each other, and connecting the right side R of the middle foldable device 1004 to one selected from the group of the right side R of another foldable device 1004 shown in FIG. 4, the right side R of the foldable device 1005 shown in FIG. 5, the right side R of the foldable device 1009 shown in FIG. 9 and the right side R of the foldable device 1010 shown in FIG. 10 in a state where they are placed to face each other.

In one embodiment, for example, the first region 310, the first plate region 210 and the first body 110 of the middle foldable device 1004 shown in FIG. 4 may be integrally formed as a single unitary and indivisible unit with the second region 320, the second plate region 220 and the second body 120 of the foldable device 1011 shown in FIG. 11, respectively, and the second region 320, the second plate region 220 and the second body 120 of the middle foldable device 1004 may be integrally formed as a single unitary and indivisible unit with the second region 320, the second plate region 220 and the second body 120 of another foldable device 1004 shown in FIG. 4, respectively.

In one alternative embodiment, for example, the first region 310, the first plate region 210 and the first body 110 of the middle foldable device 1004 shown in FIG. 4 may be integrally formed as a single unitary and indivisible unit with the second region 320, the second plate region 220 and the second body 120 of the foldable device 1011 shown in FIG. 11, respectively, and the second region 320, the second plate region 220 and the second body 120 of the middle foldable device 1004 may be integrally formed as a single unitary and indivisible unit with the second region 320, the second plate region 220 and the second body 120 of the foldable device 1005 shown in FIG. 5, respectively.

In one alternative embodiment, for example, the first region 310, the first plate region 210 and the first body 110 of the middle foldable device 1004 shown in FIG. 4 may be integrally formed as a single unitary and indivisible unit with the second region 320, the second plate region 220 and the second body 120 of the foldable device 1011 shown in FIG. 11, respectively, and the second region 320, the second plate region 220 and the second body 120 of the middle foldable device 1004 may be integrally formed as a single unitary and indivisible unit with the second region 320, the second plate region 220 and the second body 120 of the foldable device 1009 shown in FIG. 9, respectively.

In one alternative embodiment, for example, the first region 310, the first plate region 210 and the first body 110 of the middle foldable device 1004 shown in FIG. 4 may be integrally formed as a single unitary and indivisible unit with the second region 320, the second plate region 220 and the second body 120 of the foldable device 1011 shown in FIG. 11, respectively, and the second region 320, the second plate region 220 and the second body 120 of the middle foldable device 1004 may be integrally formed as a single unitary and indivisible unit with the second region 320, the second plate region 220 and the second body 120 of the foldable device 1010 shown in FIG. 10, respectively.

Embodiment 22 may be implemented as described in Embodiment 19.

In Embodiment 22, the flexible display panel 300 has a position horizontally fixed to the hinge structure at the point P5, the point P6 and the point P7 of the foldable device 3001. Therefore, the flexible display panel 300 can be firmly fixed to the hinge structure.

Embodiment 23 may be implemented as described in Embodiment 18.

Embodiment 24 may be implemented as described in Embodiment 17.

According to embodiments, the foldable device 3001 shown in FIG. 24 may be formed by using one selected from the group of the foldable device 1002 shown in FIG. 2, the foldable device 1003 shown in FIG. 3, the foldable device 1005 shown in FIG. 5, the foldable device 1007 shown in FIG. 7, the foldable device 1008 shown in FIG. 8 and the foldable device 1010 shown in FIG. 10 as a middle foldable device, connecting a left side L of the middle foldable device to one selected from the group of the right side R of the foldable device 1012 shown in FIG. 12 and the right side R of the foldable device 1013 shown in FIG. 14 in a state where they are placed to face each other, and connecting a right side R of the middle foldable device to one selected from the group of the left side L of the foldable device 1012 shown in FIG. 12 and the left side L of the foldable device 1013 shown in FIG. 14 in a state where they are placed to face each other.

In one embodiment, for example, the first region 310 and the first plate region 210 of the middle foldable device 1002 shown in FIG. 2 may be integrally formed as a single unitary and indivisible unit with the second region 320 and the second body 520 of the foldable device 1012 shown in FIG. 12, respectively, and the second region 320 and the second plate region 220 of the middle foldable device 1002 shown in FIG. 2 may be integrally formed as a single unitary and indivisible unit with the first region 310 and the first body 510 of another foldable device 1012 shown in FIG. 12, respectively.

In one alternative embodiment, for example, the first region 310 and the first plate region 210 of the middle foldable device 1002 shown in FIG. 2 may be integrally formed as a single unitary and indivisible unit with the second region 320 and the second body 520 of the foldable device 1012 shown in FIG. 12, respectively, and the second region 320 and the second plate region 220 of the middle foldable device 1002 shown in FIG. 2 may be integrally formed as a single unitary and indivisible unit with the first region 310 and the first body 510 of the foldable device 1013 shown in FIG. 14, respectively. The first plate region 210 and the first body 510 of the foldable device 1013 shown in FIG. 14 may be integrally formed as a single unitary and indivisible unit with each other. Alternatively, the first plate region 210 and the first body 510 of the foldable device 1013 shown in FIG. 14 may be integrally formed as a single unitary and indivisible unit with each other, and the second plate region 220 and the second body 520 may also be integrally formed as a single unitary and indivisible unit with each other.

In one alternative embodiment, for example, the first region 310 and the first plate region 210 of the middle foldable device 1002 shown in FIG. 2 may be integrally formed as a single unitary and indivisible unit with the second region 320 and the second plate region 220 of the foldable device 1013 shown in FIG. 14, respectively, and the second region 320 and the second plate region 220 of the middle foldable device 1002 shown in FIG. 2 may be integrally formed as a single unitary and indivisible unit with the first region 310 and the first plate region 210 of another foldable device 1013 shown in FIG. 14, respectively. The second plate region 220 and the second body 520 of the foldable device 1013 shown in FIG. 14 may be integrally formed as a single unitary and indivisible unit with each other. Alternatively, the second plate region 220 and the second body 520 of the foldable device 1013 shown in FIG. 14 may be integrally formed as a single unitary and indivisible unit with each other, and the first plate region 210 and the first body 510 may also be integrally formed as a single unitary and indivisible unit with each other. The first plate region 210 and the first body 510 of the another foldable device 1013 shown in FIG. 14 may be integrally formed as a single unitary and indivisible unit with each other. Alternatively, the first plate region 210 and the first body 510 of the another foldable device 1013 shown in FIG. 14 may be integrally formed as a single unitary and indivisible unit with each other, and the second plate region 220 and the second body 520 may also be integrally formed as a single unitary and indivisible unit with each other.

In one alternative embodiment, for example, the first region 310 and the first plate region 210 of the middle foldable device 1003 shown in FIG. 3 may be integrally formed as a single unitary and indivisible unit with the second region 320 and the second body 520 of the foldable device 1012 shown in FIG. 12, respectively, and the second region 320 and the second plate region 220 of the middle foldable device 1003 shown in FIG. 3 may be integrally formed as a single unitary and indivisible unit with the first region 310 and the first body 510 of another foldable device 1012 shown in FIG. 12, respectively.

In one alternative embodiment, for example, the first region 310 and the first plate region 210 of the middle foldable device 1003 shown in FIG. 3 may be integrally formed as a single unitary and indivisible unit with the second region 320 and the second body 520 of the foldable device 1012 shown in FIG. 12, respectively, and the second region 320 and the second plate region 220 of the middle foldable device 1003 shown in FIG. 3 may be integrally formed as a single unitary and indivisible unit with the first region 310 and the first body 510 of the foldable device 1013 shown in FIG. 14, respectively. The first plate region 210 and the first body 510 of the foldable device 1013 shown in FIG. 14 may be integrally formed as a single unitary and indivisible unit with each other. Alternatively, the first plate region 210 and the first body 510 of the foldable device 1013 shown in FIG. 14 may be integrally formed as a single unitary and indivisible unit with each other, and the second plate region 220 and the second body 520 may also be integrally formed as a single unitary and indivisible unit with each other.

In one alternative embodiment, for example, the first region 310 and the first plate region 210 of the middle foldable device 1003 shown in FIG. 3 may be integrally formed as a single unitary and indivisible unit with the second region 320 and the second plate region 220 of the foldable device 1013 shown in FIG. 14, respectively, and the second region 320 and the second plate region 220 of the middle foldable device 1003 shown in FIG. 3 may be integrally formed as a single unitary and indivisible unit with the first region 310 and the first plate region 210 of another foldable device 1013 shown in FIG. 14, respectively. The second plate region 220 and the second body 520 of the foldable device 1013 shown in FIG. 14 may be integrally formed as a single unitary and indivisible unit with each other. Alternatively, the second plate region 220 and the second body 520 of the foldable device 1013 shown in FIG. 14 may be integrally formed as a single unitary and indivisible unit with each other, and the first plate region 210 and the first body 510 may also be integrally formed as a single unitary and indivisible unit with each other. The first plate region 210 and the first body 510 of the another foldable device 1013 shown in FIG. 14 may be integrally formed as a single unitary and indivisible unit with each other. Alternatively, the first plate region 210 and the first body 510 of the another foldable device 1013 shown in FIG. 14 may be integrally formed as a single unitary and indivisible unit with each other, and the second plate region 220 and the second body 520 may also be integrally formed as a single unitary and indivisible unit with each other.

In one alternative embodiment, for example, the first region 310 and the first plate region 210 of the middle foldable device 1003 shown in FIG. 3 may be integrally formed as a single unitary and indivisible unit with the second region 320 and the second plate region 220 of the foldable device 1013 shown in FIG. 14, respectively, and the second region 320 and the second plate region 220 of the middle foldable device 1003 shown in FIG. 3 may be integrally formed as a single unitary and indivisible unit with the first region 310 and the first plate region 210 of the foldable device 1012 shown in FIG. 12, respectively. The second plate region 220 and the second body 520 of the foldable device 1013 shown in FIG. 14 may be integrally formed as a single unitary and indivisible unit with each other. Alternatively, the second plate region 220 and the second body 520 of the foldable device 1013 shown in FIG. 14 may be integrally formed as a single unitary and indivisible unit with each other, and the first plate region 210 and the first body 510 may also be integrally formed as a single unitary and indivisible unit with each other.

In one alternative embodiment, for example, the first region 310 and the first plate region 210 of the middle foldable device 1005 shown in FIG. 5 may be integrally formed as a single unitary and indivisible unit with the second region 320 and the second body 520 of the foldable device 1012 shown in FIG. 12, respectively, and the second region 320 and the second plate region 220 of the middle foldable device 1005 shown in FIG. 5 may be integrally formed as a single unitary and indivisible unit with the first region 310 and the first body 510 of another foldable device 1012 shown in FIG. 12, respectively.

In one alternative embodiment, for example, the first region 310 and the first plate region 210 of the middle foldable device 1005 shown in FIG. 5 may be integrally formed as a single unitary and indivisible unit with the second region 320 and the second body 520 of the foldable device 1012 shown in FIG. 12, respectively, and the second region 320 and the second plate region 220 of the middle foldable device 1005 shown in FIG. 5 may be integrally formed as a single unitary and indivisible unit with the first region 310 and the first body 510 of the foldable device 1013 shown in FIG. 14, respectively. The first plate region 210 and the first body 510 of the foldable device 1013 shown in FIG. 14 may be integrally formed as a single unitary and indivisible unit with each other. Alternatively, the first plate region 210 and the first body 510 of the foldable device 1013 shown in FIG. 14 may be integrally formed as a single unitary and indivisible unit with each other, and the second plate region 220 and the second body 520 may also be integrally formed as a single unitary and indivisible unit with each other.

In one alternative embodiment, for example, the first region 310 and the first plate region 210 of the middle foldable device 1005 shown in FIG. 5 may be integrally formed as a single unitary and indivisible unit with the second region 320 and the second plate region 220 of the foldable device 1013 shown in FIG. 14, respectively, and the second region 320 and the second plate region 220 of the middle foldable device 1005 shown in FIG. 5 may be integrally formed as a single unitary and indivisible unit with the first region 310 and the first plate region 210 of another foldable device 1013 shown in FIG. 14, respectively. The second plate region 220 and the second body 520 of the foldable device 1013 shown in FIG. 14 may be integrally formed as a single unitary and indivisible unit with each other. Alternatively, the second plate region 220 and the second body 520 of the foldable device 1013 shown in FIG. 14 may be integrally formed as a single unitary and indivisible unit with each other, and the first plate region 210 and the first body 510 may also be integrally formed as a single unitary and indivisible unit with each other. The first plate region 210 and the first body 510 of another foldable device 1013 shown in FIG. 14 may be integrally formed as a single unitary and indivisible unit with each other. Alternatively, the first plate region 210 and the first body 510 of the another foldable device 1013 shown in FIG. 14 may be integrally formed as a single unitary and indivisible unit with each other, and the second plate region 220 and the second body 520 may also be integrally formed as a single unitary and indivisible unit with each other.

In one alternative embodiment, for example, the first region 310 and the first plate region 210 of the middle foldable device 1005 shown in FIG. 5 may be integrally formed as a single unitary and indivisible unit with the second region 320 and the second plate region 220 of the foldable device 1013 shown in FIG. 14, respectively, and the second region 320 and the second plate region 220 of the middle foldable device 1005 shown in FIG. 5 may be integrally formed as a single unitary and indivisible unit with the first region 310 and the first plate region 210 of the foldable device 1012 shown in FIG. 12, respectively. The second plate region 220 and the second body 520 of the foldable device 1013 shown in FIG. 14 may be integrally formed as a single unitary and indivisible unit with each other. Alternatively, the second plate region 220 and the second body 520 of the foldable device 1013 shown in FIG.

14 may be integrally formed as a single unitary and indivisible unit with each other, and the first plate region 210 and the first body 510 may also be integrally formed as a single unitary and indivisible unit with each other.

In one alternative embodiment, for example, the first region 310 and the first plate region 210 of the middle foldable device 1007 shown in FIG. 7 may be integrally formed as a single unitary and indivisible unit with the second region 320 and the second body 520 of the foldable device 1012 shown in FIG. 12, respectively, and the second region 320 and the second plate region 220 of the middle foldable device 1007 shown in FIG. 7 may be integrally formed as a single unitary and indivisible unit with the first region 310 and the first body 510 of another foldable device 1012 shown in FIG. 12, respectively.

In one alternative embodiment, for example, the first region 310 and the first plate region 210 of the middle foldable device 1007 shown in FIG. 7 may be integrally formed as a single unitary and indivisible unit with the second region 320 and the second body 520 of the foldable device 1012 shown in FIG. 12, respectively, and the second region 320 and the second plate region 220 of the middle foldable device 1007 shown in FIG. 7 may be integrally formed as a single unitary and indivisible unit with the first region 310 and the first body 510 of the foldable device 1013 shown in FIG. 14, respectively. The first plate region 210 and the first body 510 of the foldable device 1013 shown in FIG. 14 may be integrally formed as a single unitary and indivisible unit with each other. Alternatively, the first plate region 210 and the first body 510 of the foldable device 1013 shown in FIG. 14 may be integrally formed as a single unitary and indivisible unit with each other, and the second plate region 220 and the second body 520 may also be integrally formed as a single unitary and indivisible unit with each other.

In one alternative embodiment, for example, the first region 310 and the first plate region 210 of the middle foldable device 1007 shown in FIG. 7 may be integrally formed as a single unitary and indivisible unit with the second region 320 and the second plate region 220 of the foldable device 1013 shown in FIG. 14, respectively, and the second region 320 and the second plate region 220 of the middle foldable device 1007 shown in FIG. 7 may be integrally formed as a single unitary and indivisible unit with the first region 310 and the first plate region 210 of another foldable device 1013 shown in FIG. 14, respectively. The second plate region 220 and the second body 520 of the foldable device 1013 shown in FIG. 14 may be integrally formed as a single unitary and indivisible unit with each other. Alternatively, the second plate region 220 and the second body 520 of the foldable device 1013 shown in FIG. 14 may be integrally formed as a single unitary and indivisible unit with each other, and the first plate region 210 and the first body 510 may also be integrally formed as a single unitary and indivisible unit with each other. The first plate region 210 and the first body 510 of the another foldable device 1013 shown in FIG. 14 may be integrally formed as a single unitary and indivisible unit with each other. Alternatively, the first plate region 210 and the first body 510 of the another foldable device 1013 shown in FIG. 14 may be integrally formed as a single unitary and indivisible unit with each other, and the second plate region 220 and the second body 520 may also be integrally formed as a single unitary and indivisible unit with each other.

In one alternative embodiment, for example, the first region 310 and the first plate region 210 of the middle foldable device 1007 shown in FIG. 7 may be integrally formed as a single unitary and indivisible unit with the second region 320 and the second plate region 220 of the foldable device 1013 shown in FIG. 14, respectively, and the second region 320 and the second plate region 220 of the middle foldable device 1007 shown in FIG. 7 may be integrally formed as a single unitary and indivisible unit with the first region 310 and the first plate region 210 of the foldable device 1012 shown in FIG. 12, respectively. The second plate region 220 and the second body 520 of the foldable device 1013 shown in FIG. 14 may be integrally formed as a single unitary and indivisible unit with each other. Alternatively, the second plate region 220 and the second body 520 of the foldable device 1013 shown in FIG. 14 may be integrally formed as a single unitary and indivisible unit with each other, and the first plate region 210 and the first body 510 may also be integrally formed as a single unitary and indivisible unit with each other.

In one alternative embodiment, for example, the first region 310 and the first plate region 210 of the middle foldable device 1008 shown in FIG. 8 may be integrally formed as a single unitary and indivisible unit with the second region 320 and the second body 520 of the foldable device 1012 shown in FIG. 12, respectively, and the second region 320 and the second plate region 220 of the middle foldable device 1008 shown in FIG. 8 may be integrally formed as a single unitary and indivisible unit with the first region 310 and the first body 510 of another foldable device 1012 shown in FIG. 12, respectively.

In one alternative embodiment, for example, the first region 310 and the first plate region 210 of the middle foldable device 1008 shown in FIG. 8 may be integrally formed as a single unitary and indivisible unit with the second region 320 and the second body 520 of the foldable device 1012 shown in FIG. 12, respectively, and the second region 320 and the second plate region 220 of the middle foldable device 1008 shown in FIG. 8 may be integrally formed as a single unitary and indivisible unit with the first region 310 and the first body 510 of the foldable device 1013 shown in FIG. 14, respectively. The first plate region 210 and the first body 510 of the foldable device 1013 shown in FIG. 14 may be integrally formed as a single unitary and indivisible unit with each other. Alternatively, the first plate region 210 and the first body 510 of the foldable device 1013 shown in FIG. 14 may be integrally formed as a single unitary and indivisible unit with each other, and the second plate region 220 and the second body 520 may also be integrally formed as a single unitary and indivisible unit with each other.

In one alternative embodiment, for example, the first region 310 and the first plate region 210 of the middle foldable device 1008 shown in FIG. 8 may be integrally formed as a single unitary and indivisible unit with the second region 320 and the second plate region 220 of the foldable device 1013 shown in FIG. 14, respectively, and the second region 320 and the second plate region 220 of the middle foldable device 1008 shown in FIG. 8 may be integrally formed as a single unitary and indivisible unit with the first region 310 and the first plate region 210 of another foldable device 1013 shown in FIG. 14, respectively. The second plate region 220 and the second body 520 of the foldable device 1013 shown in FIG. 14 may be integrally formed as a single unitary and indivisible unit with each other. Alternatively, the second plate region 220 and the second body 520 of the foldable device 1013 shown in FIG. 14 may be integrally formed as a single unitary and indivisible unit with each other, and the first plate region 210 and the first body 510 may also be integrally formed as a single unitary and indivisible unit with each other. The first plate region 210 and the first body 510 of the another foldable device 1013 shown in FIG. 14 may be integrally formed as a single unitary and indivisible unit with each other. Alternatively, the first plate region 210 and the first body 510 of the another foldable device 1013 shown in FIG. 14 may be integrally formed as a single unitary and indivisible unit with each other, and the second plate region 220 and the second body 520 may also be integrally formed as a single unitary and indivisible unit with each other.

In one alternative embodiment, for example, the first region 310 and the first plate region 210 of the middle foldable device 1008 shown in FIG. 8 may be integrally formed as a single unitary and indivisible unit with the second region 320 and the second plate region 220 of the foldable device 1013 shown in FIG. 14, respectively, and the second region 320 and the second plate region 220 of the middle foldable device 1008 shown in FIG. 8 may be integrally formed as a single unitary and indivisible unit with the first region 310 and the first plate region 210 of the foldable device 1012 shown in FIG. 12, respectively. The second plate region 220 and the second body 520 of the foldable device 1013 shown in FIG. 14 may be integrally formed as a single unitary and indivisible unit with each other. Alternatively, the second plate region 220 and the second body 520 of the foldable device 1013 shown in FIG. 14 may be integrally formed as a single unitary and indivisible unit with each other, and the first plate region 210 and the first body 510 may also be integrally formed as a single unitary and indivisible unit with each other.

In one alternative embodiment, for example, the first region 310 and the first plate region 210 of the middle foldable device 1010 shown in FIG. 10 may be integrally formed as a single unitary and indivisible unit with the second region 320 and the second body 520 of the foldable device 1012 shown in FIG. 12, respectively, and the second region 320 and the second plate region 220 of the middle foldable device 1010 shown in FIG. 10 may be integrally formed as a single unitary and indivisible unit with the first region 310 and the first body 510 of another foldable device 1012 shown in FIG. 12, respectively.

In one alternative embodiment, for example, the first region 310 and the first plate region 210 of the middle foldable device 1010 shown in FIG. 10 may be integrally formed as a single unitary and indivisible unit with the second region 320 and the second body 520 of the foldable device 1012 shown in FIG. 12, respectively, and the second region 320 and the second plate region 220 of the middle foldable device 1010 shown in FIG. 10 may be integrally formed as a single unitary and indivisible unit with the first region 310 and the first body 510 of the foldable device 1013 shown in FIG. 14, respectively. The first plate region 210 and the first body 510 of the foldable device 1013 shown in FIG. 14 may be integrally formed as a single unitary and indivisible unit with each other. Alternatively, the first plate region 210 and the first body 510 of the foldable device 1013 shown in FIG. 14 may be integrally formed as a single unitary and indivisible unit with each other, and the second plate region 220 and the second body 520 may also be integrally formed as a single unitary and indivisible unit with each other.

In one alternative embodiment, for example, the first region 310 and the first plate region 210 of the middle foldable device 1010 shown in FIG. 10 may be integrally formed as a single unitary and indivisible unit with the second region 320 and the second plate region 220 of the middle foldable device 1010 shown in FIG. 10 may be integrally formed as a single unitary and indivisible unit with the first region 310 and the first plate region 210 of another foldable device 1013 shown in FIG. 14, respectively. The second plate region 220 and the second body 520 of the foldable device 1013 shown in FIG. 14 may be integrally formed as a single unitary and indivisible unit with each other. Alternatively, the second plate region 220 and the second body 520 of the foldable device 1013 shown in FIG. 14 may be integrally formed as a single unitary and indivisible unit with each other, and the first plate region 210 and the first body 510 may also be integrally formed as a single unitary and indivisible unit with each other. The first plate region 210 and the first body 510 of the another foldable device 1013 shown in FIG. 14 may be integrally formed as a single unitary and indivisible unit with each other. Alternatively, the first plate region 210 and the first body 510 of the another foldable device 1013 shown in FIG. 14 may be integrally formed as a single unitary and indivisible unit with each other, and the second plate region 220 and the second body 520 may also be integrally formed as a single unitary and indivisible unit with each other.

In one alternative embodiment, for example, the first region 310 and the first plate region 210 of the middle foldable device 1010 shown in FIG. 10 may be integrally formed as a single unitary and indivisible unit with the second region 320 and the second plate region 220 of the foldable device 1013 shown in FIG. 14, respectively, and the second region 320 and the second plate region 220 of the middle foldable device 1010 shown in FIG. 10 may be integrally formed as a single unitary and indivisible unit with the first region 310 and the first plate region 210 of the foldable device 1012 shown in FIG. 12, respectively. The second plate region 220 and the second body 520 of the foldable device 1013 shown in FIG. 14 may be integrally formed as a single unitary and indivisible unit with each other. Alternatively, the second plate region 220 and the second body 520 of the foldable device 1013 shown in FIG. 14 may be integrally formed as a single unitary and indivisible unit with each other, and the first plate region 210 and the first body 510 may also be integrally formed as a single unitary and indivisible unit with each other.

Figure 25:
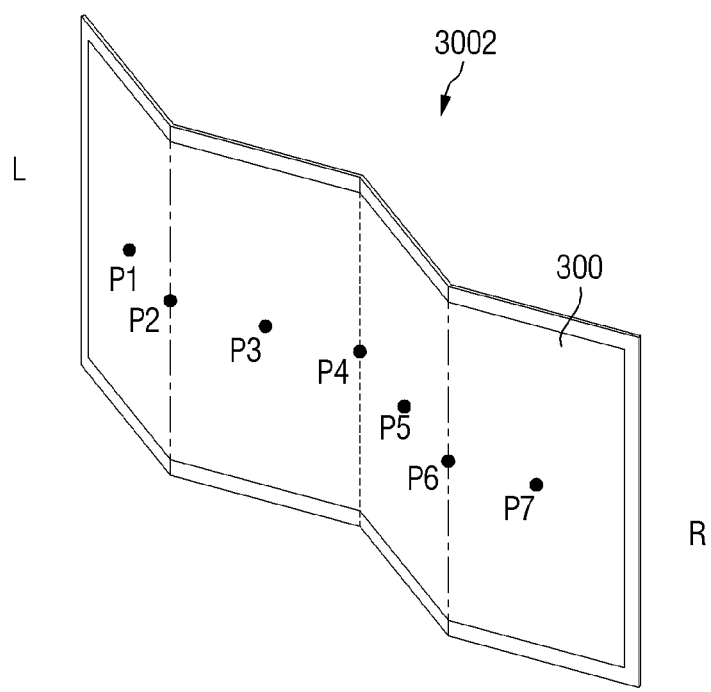
FIG. 25 is a perspective view of a foldable device according to another alternative embodiment.

FIG. 25 is a perspective view of a foldable device 3002 according to another alternative embodiment. In FIG. 25, a dash-dotted line indicates a state where a flexible display panel 300 is out-folded by an out-foldable or in-out-foldable hinge, and a dotted line indicates a state where the flexible display panel 300 is in-folded by an in-foldable or in-out-foldable hinge.

TABLE 5

|  | P1 | P2 | P3 | P4 | P5 | P6 | P7 |
|---|---|---|---|---|---|---|---|
| Embodiment 25 | F | S | S | S | S | S | S |
| Embodiment 26 | S | F | S | S | S | S | S |
| Embodiment 27 | S | S | F | S | S | S | S |
| Embodiment 28 | S | S | F | F | F | S | S |
| Embodiment 29 | S | S | S | F | S | S | S |
| Embodiment 30 | S | S | S | S | F | S | S |
| Embodiment 31 | S | S | S | S | S | F | S |
| Embodiment 32 | S | S | S | S | S | S | F |

Table 5 shows whether the flexible display panel 300 has a position horizontally fixed to a hinge structure at points P1 through P7 in FIG. 25. In Table 5, a case where the flexible display panel 300 has a position horizontally fixed to the hinge structure is indicated by "F," and a case where the flexible display panel 300 is slidable without having a position horizontally fixed to the hinge structure is indicated by "S."

Referring to FIG. 25 and table 5, Embodiment 25 may be implemented as described in Embodiment 17.

Embodiment 26 may be implemented as described in Embodiment 18.

Embodiment 27 may be implemented as described in Embodiment 21.

Embodiment 28 may be achieved by using one selected from the group of the foldable device 1012 shown in FIG. 12 and the foldable device 1013 shown in FIG. 14 as a middle foldable device, connecting a left side L of the middle foldable device to one selected from the group of the right side R of the foldable device 1004 shown in FIG. 4, the right side R of the foldable device 1005 shown in FIG. 5, the right side R of the foldable device 1009 shown in FIG. 9 and the right side R of the foldable device 1010 shown in FIG. 10 in a state where they are placed to face each other, and connecting a right side R of the middle foldable device to one selected from the group of the right side R of another foldable device 1004 shown in FIG. 4, the right side R of another foldable device 1005 shown in FIG. 5, the right side R of another foldable device 1009 shown in FIG. 9 and the right side R of another foldable device 1010 shown in FIG. 10 in a state where they are placed to face each other.

In one embodiment, for example, the first region 310 and the first body 510 of the middle foldable device 1012 shown in FIG. 12 may be integrally formed as a single unitary and indivisible unit with the second region 320 and the second body 120 of the foldable device 1004 shown in FIG. 4, respectively, and the second region 320 and the second body 520 of the middle foldable device 1012 shown in FIG. 12 may be integrally formed as a single unitary and indivisible unit with the second region 320 and the second body 120 of another foldable device 1004 shown in FIG. 4, respectively. In such an embodiment, the second plate region 220 and the second body 120 of the foldable device 1004 shown in FIG. 4 may be integrally formed as a single unitary and indivisible unit with each other, and the second plate region 220 and the second body 120 of the another foldable device 1004 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1004 shown in FIG. 4, respectively, and the second region 320 and the second body 520 of the middle foldable device 1012 shown in FIG. 12 may be integrally formed as a single unitary and indivisible unit with the second region 320 and the second body 120 of the foldable device 1005 shown in FIG. 5, respectively. In such an embodiment, the second plate region 220 and the second body 120 of the foldable device 1004 shown in FIG. 4 may be integrally formed as a single unitary and indivisible unit with each other, and the second plate region 220 and the second body 120 of the foldable device 1005 shown in FIG. 5 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1004 shown in FIG. 4, respectively, and the second region 320 and the second body 520 of the middle foldable device 1012 shown in FIG. 12 may be integrally formed as a single unitary and indivisible unit with the second region 320 and the second body 120 of the foldable device 1009 shown in FIG. 9, respectively. In such an embodiment, the second plate region 220 and the second body 120 of the foldable device 1004 shown in FIG. 4 may be integrally formed as a single unitary and indivisible unit with each other, and the second plate region 220 and the second body 120 of the foldable device 1009 shown in FIG. 9 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1004 shown in FIG. 4, respectively, and the second region 320 and the second body 520 of the middle foldable device 1012 shown in FIG. 12 may be integrally formed as a single unitary and indivisible unit with the second region 320 and the second body 120 of the foldable device 1010 shown in FIG. 10, respectively. In such an embodiment, the second plate region 220 and the second body 120 of the foldable device 1004 shown in FIG. 4 may be integrally formed as a single unitary and indivisible unit with each other, and the second plate region 220 and the second body 120 of the foldable device 1010 shown in FIG. 10 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1005 shown in FIG. 5, respectively, and the second region 320 and the second body 520 of the middle foldable device 1012 shown in FIG. 12 may be integrally formed as a single unitary and indivisible unit with the second region 320 and the second body 120 of the foldable device 1004 shown in FIG. 4, respectively. In such an embodiment, the second plate region 220 and the second body 120 of the foldable device 1005 shown in FIG. 5 may be integrally formed as a single unitary and indivisible unit with each other, and the second plate region 220 and the second body 120 of the foldable device 1004 shown in FIG. 4 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1005 shown in FIG. 5, respectively, and the second region 320 and the second body 520 of the middle foldable device 1012 shown in FIG. 12 may be integrally formed as a single unitary and indivisible unit with the second region 320 and the second body 120 of another foldable device 1005 shown in FIG. 5, respectively.

In such an embodiment, the second plate region 220 and the second body 120 of the foldable device 1005 shown in FIG. 5 may be integrally formed as a single unitary and indivisible unit with each other, and the second plate region 220 and the second body 120 of the another foldable device 1005 shown in FIG. 5 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1005 shown in FIG. 5, respectively, and the second region 320 and the second body 520 of the middle foldable device 1012 shown in FIG. 12 may be integrally formed as a single unitary and indivisible unit with the second region 320 and the second body 120 of the foldable device 1009 shown in FIG. 9, respectively. In such an embodiment, the second plate region 220 and the second body 120 of the foldable device 1005 shown in FIG. 5 may be integrally formed as a single unitary and indivisible unit with each other, and the second plate region 220 and the second body 120 of the foldable device 1009 shown in FIG. 9 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1005 shown in FIG. 5, respectively, and the second region 320 and the second body 520 of the middle foldable device 1012 shown in FIG. 12 may be integrally formed as a single unitary and indivisible unit with the second region 320 and the second body 120 of the foldable device 1010 shown in FIG. 10, respectively. In such an embodiment, the second plate region 220 and the second body 120 of the foldable device 1005 shown in FIG. 5 may be integrally formed as a single unitary and indivisible unit with each other, and the second plate region 220 and the second body 120 of the foldable device 1010 shown in FIG. 10 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1009 shown in FIG. 9, respectively, and the second region 320 and the second body 520 of the middle foldable device 1012 shown in FIG. 12 may be integrally formed as a single unitary and indivisible unit with the second region 320 and the second body 120 of the foldable device 1004 shown in FIG. 4, respectively. In such an embodiment, the second plate region 220 and the second body 120 of the foldable device 1009 shown in FIG. 9 may be integrally formed as a single unitary and indivisible unit with each other, and the second plate region 220 and the second body 120 of the foldable device 1004 shown in FIG. 4 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1009 shown in FIG. 9, respectively, and the second region 320 and the second body 520 of the middle foldable device 1012 shown in FIG. 12 may be integrally formed as a single unitary and indivisible unit with the second region 320 and the second body 120 of the foldable device 1005 shown in FIG. 5, respectively. In such an embodiment, the second plate region 220 and the second body 120 of the foldable device 1009 shown in FIG. 9 may be integrally formed as a single unitary and indivisible unit with each other, and the second plate region 220 and the second body 120 of the foldable device 1005 shown in FIG. 5 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1009 shown in FIG. 9, respectively, and the second region 320 and the second body 520 of the middle foldable device 1012 shown in FIG. 12 may be integrally formed as a single unitary and indivisible unit with the second region 320 and the second body 120 of another foldable device 1009 shown in FIG. 9, respectively. In such an embodiment, the second plate region 220 and the second body 120 of the foldable device 1009 shown in FIG. 9 may be integrally formed as a single unitary and indivisible unit with each other, and the second plate region 220 and the second body 120 of the another foldable device 1009 shown in FIG. 9 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1009 shown in FIG. 9, respectively, and the second region 320 and the second body 520 of the middle foldable device 1012 shown in FIG. 12 may be integrally formed as a single unitary and indivisible unit with the second region 320 and the second body 120 of the foldable device 1010 shown in FIG. 10, respectively. In such an embodiment, the second plate region 220 and the second body 120 of the foldable device 1009 shown in FIG. 9 may be integrally formed as a single unitary and indivisible unit with each other, and the second plate region 220 and the second body 120 of the foldable device 1010 shown in FIG. 10 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1010 shown in FIG. 10, respectively, and the second region 320 and the second body 520 of the middle foldable device 1012 shown in FIG. 12 may be integrally formed as a single unitary and indivisible unit with the second region 320 and the second body 120 of the foldable device 1004 shown in FIG. 4, respectively. In such an embodiment, the second plate region 220 and the second body 120 of the foldable device 1010 shown in FIG. 10 may be integrally formed as a single unitary and indivisible unit with each other, and the second plate region 220 and the second body 120 of the foldable device 1004 shown in FIG. 4 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1010 shown in FIG. 10, respectively, and the second region 320 and the second body 520 of the middle foldable device 1012 shown in FIG. 12 may be integrally formed as a single unitary and indivisible unit with the second region 320 and the second body 120 of the foldable device 1005 shown in FIG. 5, respectively. In such an embodiment, the second plate region 220 and the second body 120 of the foldable device 1010 shown in FIG. 10 may be integrally formed as a single unitary and indivisible unit with each other, and the second plate region 220 and the second body 120 of the foldable device 1005 shown in FIG. 5 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1010 shown in FIG. 10, respectively, and the second region 320 and the second body 520 of the middle foldable device 1012 shown in FIG. 12 may be integrally formed as a single unitary and indivisible unit with the second region 320 and the second body 120 of the foldable device 1009 shown in FIG. 9, respectively. In such an embodiment, the second plate region 220 and the second body 120 of the foldable device 1010 shown in FIG. 10 may be integrally formed as a single unitary and indivisible unit with each other, and the second plate region 220 and the second body 120 of the foldable device 1009 shown in FIG. 9 may be integrally formed as a single unitary and indivisible unit with each other.

In one alternative embodiment, for example, the first region 310 and the first body 510 of the middle foldable device 1012 shown in FIG. 12 may be integrally formed as a single unitary and indivisible unit with the second region 320 and the second body 120 of the foldable device 1010 shown in FIG. 10, respectively, and the second region 320 and the second body 520 of the middle foldable device 1012 shown in FIG. 12 may be integrally formed as a single unitary and indivisible unit with the second region 320 and the second body 120 of another foldable device 1010 shown in FIG. 10, respectively. In such an embodiment, the second plate region 220 and the second body 120 of the foldable device 1010 shown in FIG. 10 may be integrally formed as a single unitary and indivisible unit with each other, and the second plate region 220 and the second body 120 of the another foldable device 1010 shown in FIG. 10 may be integrally formed as a single unitary and indivisible unit with each other.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1004 shown in FIG. 4, respectively, and the second region 320 and the second body 520 of the middle foldable device 1013 shown in FIG. 14 may be integrally formed as a single unitary and indivisible unit with the second region 320 and the second body 120 of another foldable device 1004 shown in FIG. 4, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1005 shown in FIG. 5, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1004 shown in FIG. 4, respectively, and the second region 320 and the second body 520 of the middle foldable device 1013 shown in FIG. 14 may be integrally formed as a single unitary and indivisible unit with the second region 320 and the second body 120 of the foldable device 1009 shown in FIG. 9, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1004 shown in FIG. 4, respectively, and the second region 320 and the second body 520 of the middle foldable device 1013 shown in FIG. 14 may be integrally formed as a single unitary and indivisible unit with the second region 320 and the second body 120 of the foldable device 1010 shown in FIG. 10, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1005 shown in FIG. 5, respectively, and the second region 320 and the second body 520 of the middle foldable device 1013 shown in FIG. 14 may be integrally formed as a single unitary and indivisible unit with the second region 320 and the second body 120 of the foldable device 1004 shown in FIG. 4, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1005 shown in FIG. 5, respectively, and the second region 320 and the second body 520 of the middle foldable device 1013 shown in FIG. 14 may be integrally formed as a single unitary and indivisible unit with the second region 320 and the second body 120 of another foldable device 1005 shown in FIG. 5, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1005 shown in FIG. 5, respectively, and the second region 320 and the second body 520 of the middle foldable device 1013 shown in FIG. 14 may be integrally formed as a single unitary and indivisible unit with the second region 320 and the second body 120 of the foldable device 1009 shown in FIG. 9, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1005 shown in FIG. 5, respectively, and the second region 320 and the second body 520 of the middle foldable device 1013 shown in FIG. 14 may be integrally formed as a single unitary and indivisible unit with the second region 320 and the second body 120 of the foldable device 1010 shown in FIG. 10, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1009 shown in FIG. 9, respectively, and the second region 320 and the second body 520 of the middle foldable device 1013 shown in FIG. 14 may be integrally formed as a single unitary and indivisible unit with the second region 320 and the second body 120 of the foldable device 1004 shown in FIG. 4, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1009 shown in FIG. 9, respectively, and the second region 320 and the second body 520 of the middle foldable device 1013 shown in FIG. 14 may be integrally formed as a single unitary and indivisible unit with the second region 320 and the second body 120 of the foldable device 1005 shown in FIG. 5, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1009 shown in FIG. 9, respectively, and the second region 320 and the second body 520 of the middle foldable device 1013 shown in FIG. 14 may be integrally formed as a single unitary and indivisible unit with the second region 320 and the second body 120 of another foldable device 1009 shown in FIG. 9, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1009 shown in FIG. 9, respectively, and the second region 320 and the second body 520 of the middle foldable device 1013 shown in FIG. 14 may be integrally formed as a single unitary and indivisible unit with the second region 320 and the second body 120 of the foldable device 1010 shown in FIG. 10, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1010 shown in FIG. 10, respectively, and the second region 320 and the second body 520 of the middle foldable device 1013 shown in FIG. 14 may be integrally formed as a single unitary and indivisible unit with the second region 320 and the second body 120 of the foldable device 1004 shown in FIG. 4, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1010 shown in FIG. 10, respectively, and the second region 320 and the second body 520 of the middle foldable device 1013 shown in FIG. 14 may be integrally formed as a single unitary and indivisible unit with the second region 320 and the second body 120 of the foldable device 1005 shown in FIG. 5, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1010 shown in FIG. 10, respectively, and the second region 320 and the second body 520 of the middle foldable device 1013 shown in FIG. 14 may be integrally formed as a single unitary and indivisible unit with the second region 320 and the second body 120 of the foldable device 1009 shown in FIG. 9, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In one alternative embodiment, for example, the first region 310 and the first body 510 of the middle foldable device 1013 shown in FIG. 14 may be integrally formed as a single unitary and indivisible unit with the second region 320 and the second body 120 of the foldable device 1010 shown in FIG. 10, respectively, and the second region 320 and the second body 520 of the middle foldable device 1013 shown in FIG. 14 may be integrally formed as a single unitary and indivisible unit with the second region 320 and the second body 120 of another foldable device 1010 shown in FIG. 10, respectively. In such an embodiment, the first plate region 210 and the second plate region 220 of the middle foldable device 1013 shown in FIG. 14 may be integrally formed as a single unitary and indivisible unit with the first body 510 and the second body 520, respectively.

In Embodiment 28, the flexible display panel 300 has a position horizontally fixed to the hinge structure at the point P3, the point P4 and the point P5 of the foldable device 3002. Therefore, the flexible display panel 300 can be firmly fixed to the hinge structure. In such an embodiment, since the point P3, the point P4 and the point P5 are located at the center of the foldable device 3002, the force required between the point P5 and the point P7 to fold or unfold the foldable device 3002 may be substantially equal to the force required between the point P3 and the point P1 to fold or unfold the foldable device 3002.

Embodiment 29 may be implemented as described in Embodiment 20.

In Embodiment 29, the flexible display panel 300 has a position horizontally fixed to the hinge structure at the point P4 located at the center of the foldable device 3002. Therefore, the force required between the point P4 and the point P1 to fold or unfold the foldable device 3002 may be substantially equal to the force required between the point P4 and the point P7 to fold or unfold the foldable device 3002.

Embodiment 30 may be implemented as described in Embodiment 21.

Embodiment 31 may be implemented as described in Embodiment 18.

Embodiment 32 may be implemented as described in Embodiment 17.

According to embodiments, the foldable device 3002 shown in FIG. 25 may be formed by connecting the left side L of the middle foldable device 1012 (hereinafter, referred to as the foldable device 1012) shown in FIG. 12 to one selected from the group of the right side R of the foldable device 1002 shown in FIG. 2, the left side L of the foldable device 1003 shown in FIG. 3, the left side L of the foldable device 1005 shown in FIG. 5, the right side R of the foldable device 1007 shown in FIG. 7, the left side L of the foldable device 1008 shown in FIG. 8, the left side L of the foldable device 1010 shown in FIG. 10, the right side R of the foldable device 1004 shown in FIG. 4, the right side R of the foldable device 1005 shown in FIG. 5, the right side R of the foldable device 1009 shown in FIG. 9 and the right side R of the foldable device 1010 shown in FIG. 10 in a state where they are placed to face each other and connecting the right side R of the middle foldable device 1012 shown in FIG. 12 to one selected from the group of the left side L of the foldable device 1002 shown in FIG. 2, the left side L of the foldable device 1003 shown in FIG. 3, the left side L of the foldable device 1005 shown in FIG. 5, the left side L of the foldable device 1007 shown in FIG. 7 and the left side L of the foldable device 1008 shown in FIG. 8 in a state where they are placed to face each other.

In one embodiment, for example, the first region 310 and the first body 510 of the foldable device 1012 shown in FIG. 12 may be integrally formed as a single unitary and indivisible unit with the second region 320 and the second plate region 220 of the foldable device 1002 shown in FIG. 2, respectively, and the second region 320 and the second body 520 of the foldable device 1012 shown in FIG. 12 may be integrally formed as a single unitary and indivisible unit with the first region 310 and the first plate region 210 of another foldable device 1002 shown in FIG. 2, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1003 shown in FIG. 3, respectively, and the second region 320 and the second body 520 of the foldable device 1012 shown in FIG. 12 may be integrally formed as a single unitary and indivisible unit with the first region 310 and the first plate region 210 of the foldable device 1002 shown in FIG. 2, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1005 shown in FIG. 5, respectively, and the second region 320 and the second body 520 of the foldable device 1012 shown in FIG. 12 may be integrally formed as a single unitary and indivisible unit with the first region 310 and the first plate region 210 of the foldable device 1002 shown in FIG. 2, respectively.

In one alternative embodiment, for example, the first region 310 and the first body 510 of the foldable device 1012 shown in FIG. 12 may be integrally formed as a single unitary and indivisible unit with the second region 320 and the second plate region 220 of the foldable device 1007 shown in FIG. 7, respectively, and the second region 320 and the second body 520 of the foldable device 1012 shown in FIG. 12 may be integrally formed as a single unitary and indivisible unit with the first region 310 and the first plate region 210 of the foldable device 1002 shown in FIG. 2, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1008 shown in FIG. 8, respectively, and the second region 320 and the second body 520 of the foldable device 1012 shown in FIG. 12 may be integrally formed as a single unitary and indivisible unit with the first region 310 and the first plate region 210 of the foldable device 1002 shown in FIG. 2, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1010 shown in FIG. 10, respectively, and the second region 320 and the second body 520 of the foldable device 1012 shown in FIG. 12 may be integrally formed as a single unitary and indivisible unit with the first region 310 and the first plate region 210 of the foldable device 1002 shown in FIG. 2, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1004 shown in FIG. 4, respectively, and the second region 320 and the second body 520 of the foldable device 1012 shown in FIG. 12 may be integrally formed as a single unitary and indivisible unit with the first region 310 and the first plate region 210 of the foldable device 1002 shown in FIG. 2, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1005 shown in FIG. 5, respectively, and the second region 320 and the second body 520 of the foldable device 1012 shown in FIG. 12 may be integrally formed as a single unitary and indivisible unit with the first region 310 and the first plate region 210 of the foldable device 1002 shown in FIG. 2, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1009 shown in FIG. 9, respectively, and the second region 320 and the second body 520 of the foldable device 1012 shown in FIG. 12 may be integrally formed as a single unitary and indivisible unit with the first region 310 and the first plate region 210 of the foldable device 1002 shown in FIG. 2, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1010 shown in FIG. 10, respectively, and the second region 320 and the second body 520 of the foldable device 1012 shown in FIG. 12 may be integrally formed as a single unitary and indivisible unit with the first region 310 and the first plate region 210 of the foldable device 1002 shown in FIG. 2, respectively.

In one alternative embodiment, for example, the first region 310 and the first body 510 of the foldable device 1012 shown in FIG. 12 may be integrally formed as a single unitary and indivisible unit with the second region 320 and the second plate region 220 of the foldable device 1002 shown in FIG. 2, respectively, and the second region 320 and the second body 520 of the foldable device 1012 shown in FIG. 12 may be integrally formed as a single unitary and indivisible unit with the first region 310 and the first plate region 210 of the foldable device 1003 shown in FIG. 3, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1003 shown in FIG. 3, respectively, and the second region 320 and the second body 520 of the foldable device 1012 shown in FIG. 12 may be integrally formed as a single unitary and indivisible unit with the first region 310 and the first plate region 210 of another foldable device 1003 shown in FIG. 3, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1005 shown in FIG. 5, respectively, and the second region 320 and the second body 520 of the foldable device 1012 shown in FIG. 12 may be integrally formed as a single unitary and indivisible unit with the first region 310 and the first plate region 210 of the foldable device 1003 shown in FIG. 3, respectively.

In one alternative embodiment, for example, the first region 310 and the first body 510 of the foldable device 1012 shown in FIG. 12 may be integrally formed as a single unitary and indivisible unit with the second region 320 and the second plate region 220 of the foldable device 1007 shown in FIG. 7, respectively, and the second region 320 and the second body 520 of the foldable device 1012 shown in FIG. 12 may be integrally formed as a single unitary and indivisible unit with the first region 310 and the first plate region 210 of the foldable device 1003 shown in FIG. 3, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1008 shown in FIG. 8, respectively, and the second region 320 and the second body 520 of the foldable device 1012 shown in FIG. 12 may be integrally formed as a single unitary and indivisible unit with the first region 310 and the first plate region 210 of the foldable device 1003 shown in FIG. 3, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1010 shown in FIG. 10, respectively, and the second region 320 and the second body 520 of the foldable device 1012 shown in FIG. 12 may be integrally formed as a single unitary and indivisible unit with the first region 310 and the first plate region 210 of the foldable device 1003 shown in FIG. 3, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1004 shown in FIG. 4, respectively, and the second region 320 and the second body 520 of the foldable device 1012 shown in FIG. 12 may be integrally formed as a single unitary and indivisible unit with the first region 310 and the first plate region 210 of the foldable device 1003 shown in FIG. 3, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1005 shown in FIG. 5, respectively, and the second region 320 and the second body 520 of the foldable device 1012 shown in FIG. 12 may be integrally formed as a single unitary and indivisible unit with the first region 310 and the first plate region 210 of the foldable device 1003 shown in FIG. 3, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1009 shown in FIG. 9, respectively, and the second region 320 and the second body 520 of the foldable device 1012 shown in FIG. 12 may be integrally formed as a single unitary and indivisible unit with the first region 310 and the first plate region 210 of the foldable device 1003 shown in FIG. 3, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1010 shown in FIG. 10, respectively, and the second region 320 and the second body 520 of the foldable device 1012 shown in FIG. 12 may be integrally formed as a single unitary and indivisible unit with the first region 310 and the first plate region 210 of the foldable device 1003 shown in FIG. 3, respectively.

In one alternative embodiment, for example, the first region 310 and the first body 510 of the foldable device 1012 shown in FIG. 12 may be integrally formed as a single unitary and indivisible unit with the second region 320 and the second plate region 220 of the foldable device 1002 shown in FIG. 2, respectively, and the second region 320 and the second body 520 of the foldable device 1012 shown in FIG. 12 may be integrally formed as a single unitary and indivisible unit with the first region 310 and the first plate region 210 of the foldable device 1005 shown in FIG. 5, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1003 shown in FIG. 3, respectively, and the second region 320 and the second body 520 of the foldable device 1012 shown in FIG. 12 may be integrally formed as a single unitary and indivisible unit with the first region 310 and the first plate region 210 of the foldable device 1005 shown in FIG. 5, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1005 shown in FIG. 5, respectively, and the second region 320 and the second body 520 of the foldable device 1012 shown in FIG. 12 may be integrally formed as a single unitary and indivisible unit with the first region 310 and the first plate region 210 of another foldable device 1005 shown in FIG. 5, respectively.

In one alternative embodiment, for example, the first region 310 and the first body 510 of the foldable device 1012 shown in FIG. 12 may be integrally formed as a single unitary and indivisible unit with the second region 320 and the second plate region 220 of the foldable device 1007 shown in FIG. 7, respectively, and the second region 320 and the second body 520 of the foldable device 1012 shown in FIG. 12 may be integrally formed as a single unitary and indivisible unit with the first region 310 and the first plate region 210 of the foldable device 1005 shown in FIG. 5, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1008 shown in FIG. 8, respectively, and the second region 320 and the second body 520 of the foldable device 1012 shown in FIG. 12 may be integrally formed as a single unitary and indivisible unit with the first region 310 and the first plate region 210 of the foldable device 1005 shown in FIG. 5, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1010 shown in FIG. 10, respectively, and the second region 320 and the second body 520 of the foldable device 1012 shown in FIG. 12 may be integrally formed as a single unitary and indivisible unit with the first region 310 and the first plate region 210 of the foldable device 1005 shown in FIG. 5, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1004 shown in FIG. 4, respectively, and the second region 320 and the second body 520 of the foldable device 1012 shown in FIG. 12 may be integrally formed as a single unitary and indivisible unit with the first region 310 and the first plate region 210 of the foldable device 1005 shown in FIG. 5, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1005 shown in FIG. 5, respectively, and the second region 320 and the second body 520 of the foldable device 1012 shown in FIG. 12 may be integrally formed as a single unitary and indivisible unit with the first region 310 and the first plate region 210 of another foldable device 1005 shown in FIG. 5, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1009 shown in FIG. 9, respectively, and the second region 320 and the second body 520 of the foldable device 1012 shown in FIG. 12 may be integrally formed as a single unitary and indivisible unit with the first region 310 and the first plate region 210 of the foldable device 1005 shown in FIG. 5, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1010 shown in FIG. 10, respectively, and the second region 320 and the second body 520 of the foldable device 1012 shown in FIG. 12 may be integrally formed as a single unitary and indivisible unit with the first region 310 and the first plate region 210 of the foldable device 1005 shown in FIG. 5, respectively.

In one alternative embodiment, for example, the first region 310 and the first body 510 of the foldable device 1012 shown in FIG. 12 may be integrally formed as a single unitary and indivisible unit with the second region 320 and the second plate region 220 of the foldable device 1002 shown in FIG. 2, respectively, and the second region 320 and the second body 520 of the foldable device 1012 shown in FIG. 12 may be integrally formed as a single unitary and indivisible unit with the first region 310 and the first plate region 210 of the foldable device 1007 shown in FIG. 7, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1003 shown in FIG. 3, respectively, and the second region 320 and the second body 520 of the foldable device 1012 shown in FIG. 12 may be integrally formed as a single unitary and indivisible unit with the first region 310 and the first plate region 210 of the foldable device 1007 shown in FIG. 7, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1005 shown in FIG. 5, respectively, and the second region 320 and the second body 520 of the foldable device 1012 shown in FIG. 12 may be integrally formed as a single unitary and indivisible unit with the first region 310 and the first plate region 210 of the foldable device 1007 shown in FIG. 7, respectively.

In one alternative embodiment, for example, the first region 310 and the first body 510 of the foldable device 1012 shown in FIG. 12 may be integrally formed as a single unitary and indivisible unit with the second region 320 and the second plate region 220 of the foldable device 1007 shown in FIG. 7, respectively, and the second region 320 and the second body 520 of the foldable device 1012 shown in FIG. 12 may be integrally formed as a single unitary and indivisible unit with the first region 310 and the first plate region 210 of another foldable device 1007 shown in FIG. 7, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1008 shown in FIG. 8, respectively, and the second region 320 and the second body 520 of the foldable device 1012 shown in FIG. 12 may be integrally formed as a single unitary and indivisible unit with the first region 310 and the first plate region 210 of the foldable device 1007 shown in FIG. 7, respectively.

In one alternative embodiment, for example, the first region 310 and the first body 510 of the foldable device 1012 shown in FIG. 12 may be integrally formed as a single unitary and indivisible unit with the second region 320 and the first plate region 210 of the foldable device 1010 shown in FIG. 10, respectively, and the second region 320 and the second body 520 of the foldable device 1012 shown in FIG. 12 may be integrally formed as a single unitary and indivisible unit with the first region 310 and the first plate region 210 of the foldable device 1007 shown in FIG. 7, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1004 shown in FIG. 4, respectively, and the second region 320 and the second body 520 of the foldable device 1012 shown in FIG. 12 may be integrally formed as a single unitary and indivisible unit with the first region 310 and the first plate region 210 of the foldable device 1007 shown in FIG. 7, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1005 shown in FIG. 5, respectively, and the second region 320 and the second body 520 of the foldable device 1012 shown in FIG. 12 may be integrally formed as a single unitary and indivisible unit with the first region 310 and the first plate region 210 of the foldable device 1007 shown in FIG. 7, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1009 shown in FIG. 9, respectively, and the second region 320 and the second body 520 of the foldable device 1012 shown in FIG. 12 may be integrally formed as a single unitary and indivisible unit with the first region 310 and the first plate region 210 of the foldable device 1007 shown in FIG. 7, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1010 shown in FIG. 10, respectively, and the second region 320 and the second body 520 of the foldable device 1012 shown in FIG. 12 may be integrally formed as a single unitary and indivisible unit with the first region 310 and the first plate region 210 of the foldable device 1007 shown in FIG. 7, respectively.

In one alternative embodiment, for example, the first region 310 and the first body 510 of the foldable device 1012 shown in FIG. 12 may be integrally formed as a single unitary and indivisible unit with the second region 320 and the second plate region 220 of the foldable device 1002 shown in FIG. 2, respectively, and the second region 320 and the second body 520 of the foldable device 1012 shown in FIG. 12 may be integrally formed as a single unitary and indivisible unit with the first region 310 and the first plate region 210 of the foldable device 1008 shown in FIG. 8, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1003 shown in FIG. 3, respectively, and the second region 320 and the second body 520 of the foldable device 1012 shown in FIG. 12 may be integrally formed as a single unitary and indivisible unit with the first region 310 and the first plate region 210 of the foldable device 1008 shown in FIG. 8, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1005 shown in FIG. 5, respectively, and the second region 320 and the second body 520 of the foldable device 1012 shown in FIG. 12 may be integrally formed as a single unitary and indivisible unit with the first region 310 and the first plate region 210 of the foldable device 1008 shown in FIG. 8, respectively.

In one alternative embodiment, for example, the first region 310 and the first body 510 of the foldable device 1012 shown in FIG. 12 may be integrally formed as a single unitary and indivisible unit with the second region 320 and the second plate region 220 of the foldable device 1007 shown in FIG. 7, respectively, and the second region 320 and the second body 520 of the foldable device 1012 shown in FIG. 12 may be integrally formed as a single unitary and indivisible unit with the first region 310 and the first plate region 210 of the foldable device 1008 shown in FIG. 8, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1008 shown in FIG. 8, respectively, and the second region 320 and the second body 520 of the foldable device 1012 shown in FIG. 12 may be integrally formed as a single unitary and indivisible unit with the first region 310 and the first plate region 210 of another foldable device 1008 shown in FIG. 8, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1010 shown in FIG. 10, respectively, and the second region 320 and the second body 520 of the foldable device 1012 shown in FIG. 12 may be integrally formed as a single unitary and indivisible unit with the first region 310 and the first plate region 210 of the foldable device 1008 shown in FIG. 8, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1004 shown in FIG. 4, respectively, and the second region 320 and the second body 520 of the foldable device 1012 shown in FIG. 12 may be integrally formed as a single unitary and indivisible unit with the first region 310 and the first plate region 210 of the foldable device 1008 shown in FIG. 8, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1005 shown in FIG. 5, respectively, and the second region 320 and second body 520 of the foldable device 1012 shown in FIG. 12 may be integrally formed as a single unitary and indivisible unit with the first region 310 and the first plate region 210 of the foldable device 1008 shown in FIG. 8, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1009 shown in FIG. 9, respectively, and the second region 320 and the second body 520 of the foldable device 1012 shown in FIG. 12 may be integrally formed as a single unitary and indivisible unit with the first region 310 and the first plate region 210 of the foldable device 1008 shown in FIG. 8, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1010 shown in FIG. 10, respectively, and the second region 320 and the second body 520 of the foldable device 1012 shown in FIG. 12 may be integrally formed as a single unitary and indivisible unit with the first region 310 and the first plate region 210 of the foldable device 1008 shown in FIG. 8, respectively.

In one alternative embodiment, for example, the first region 310 and the first body 510 of the foldable device 1012 shown in FIG. 12 may be integrally formed as a single unitary and indivisible unit with the second region 320 and the second plate region 220 of the foldable device 1002 shown in FIG. 2, respectively, and the second region 320 and the second body 520 of the foldable device 1012 shown in FIG. 12 may be integrally formed as a single unitary and indivisible unit with the first region 310 and the first plate region 210 of the foldable device 1010 shown in FIG. 10, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1003 shown in FIG. 3, respectively, and the second region 320 and the second body 520 of the foldable device 1012 shown in FIG. 12 may be integrally formed as a single unitary and indivisible unit with the first region 310 and the first plate region 210 of the foldable device 1010 shown in FIG. 10, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1005 shown in FIG. 5, respectively, and the second region 320 and the second body 520 of the foldable device 1012 shown in FIG. 12 may be integrally formed as a single unitary and indivisible unit with the first region 310 and the first plate region 210 of the foldable device 1010 shown in FIG. 10, respectively.

In one alternative embodiment, for example, the first region 310 and the first body 510 of the foldable device 1012 shown in FIG. 12 may be integrally formed as a single unitary and indivisible unit with the second region 320 and the second plate region 220 of the foldable device 1007 shown in FIG. 7, respectively, and the second region 320 and the second body 520 of the foldable device 1012 shown in FIG. 12 may be integrally formed as a single unitary and indivisible unit with the first region 310 and the first plate region 210 of the foldable device 1010 shown in FIG. 10, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1008 shown in FIG. 8, respectively, and the second region 320 and the second body 520 of the foldable device 1012 shown in FIG. 12 may be integrally formed as a single unitary and indivisible unit with the first region 310 and the first plate region 210 of the foldable device 1010 shown in FIG. 10, respectively.

In one alternative embodiment, for example, the first region 310 and the first body 510 of the foldable device 1012 shown in FIG. 12 may be integrally formed as a single unitary and indivisible unit with the first region 310 and the first plate region 210 of the foldable device 1010 shown in FIG. 10, respectively, and the second region 320 and the second body 520 of the foldable device 1012 shown in FIG. 12 may be integrally formed as a single unitary and indivisible unit with the first region 310 and the first plate region 210 of another foldable device 1010 shown in FIG. 10, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1004 shown in FIG. 4, respectively, and the second region 320 and the second body 520 of the foldable device 1012 shown in FIG. 12 may be integrally formed as a single unitary and indivisible unit with the first region 310 and the first plate region 210 of the foldable device 1010 shown in FIG. 10, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1005 shown in FIG. 5, respectively, and the second region 320 and the second body 520 of the foldable device 1012 shown in FIG. 12 may be integrally formed as a single unitary and indivisible unit with the first region 310 and the first plate region 210 of the foldable device 1010 shown in FIG. 10, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1009 shown in FIG. 9, respectively, and the second region 320 and the second body 520 of the foldable device 1012 shown in FIG. 12 may be integrally formed as a single unitary and indivisible unit with the first region 310 and the first plate region 210 of the foldable device 1010 shown in FIG. 10, respectively.

In one alternative embodiment, for example, the first region 310 and the first body 510 of the foldable device 1012 shown in FIG. 12 may be integrally formed as a single unitary and indivisible unit with the second region 320 and the second body 120 of the foldable device 1010 shown in FIG. 10, respectively, and the second region 320 and the second body 520 of the foldable device 1012 shown in FIG. 12 may be integrally formed as a single unitary and indivisible unit with the first region 310 and the first plate region 210 of another foldable device 1010 shown in FIG. 10, respectively.

According to embodiments, the foldable device 3002 shown in FIG. 25 may be formed by connecting the left side L of the middle foldable device 1013 (hereinafter, referred to as the foldable device 1013) shown in FIG. 14 to one selected from the group of the right side R of the foldable device 1002 shown in FIG. 2, the left side L of the foldable device 1003 shown in FIG. 3, the left side L of the foldable device 1005 shown in FIG. 5, the right side R of the foldable device 1007 shown in FIG. 7, the left side L of the foldable device 1008 shown in FIG. 8, the left side L of the foldable device 1010 shown in FIG. 10, the right side R of the foldable device 1004 shown in FIG. 4, the right side R of the foldable device 1005 shown in FIG. 5, the right side R of the foldable device 1009 shown in FIG. 9 and the right side R of the foldable device 1010 shown in FIG. 10 in a state where they are placed to face each other and connecting the right side R of the middle foldable device 1013 shown in FIG. 14 to one selected from the group of the left side L of the foldable device 1002 shown in FIG. 2, the left side L of the foldable device 1003 shown in FIG. 3, the left side L of the foldable device 1005 shown in FIG. 5, the left side L of the foldable device 1007 shown in FIG. 7, the left side L of the foldable device 1008 shown in FIG. 8 and the left side L of the foldable device 1010 shown in FIG. 10 in a state where they are placed to face each other.

In one embodiment, for example, the first region 310 and the first plate region 210 of the foldable device 1013 shown in FIG. 14 may be integrally formed as a single unitary and indivisible unit with the second region 320 and the second plate region 220 of the foldable device 1002 shown in FIG. 2, respectively, and the second region 320 and the second plate region 220 of the foldable device 1013 shown in FIG. 14 may be integrally formed as a single unitary and indivisible unit with the first region 310 and the first plate region 210 of another foldable device 1002 shown in FIG. 2, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second plate region 220 of the foldable device 1002 shown in FIG. 2, respectively, and the second region 320 and the second plate region 220 of the foldable device 1013 shown in FIG. 14 may be integrally formed as a single unitary and indivisible unit with the first region 310 and the first plate region 210 of the foldable device 1003 shown in FIG. 3, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second plate region 220 of the foldable device 1002 shown in FIG. 2, respectively, and the second region 320 and the second plate region 220 of the foldable device 1013 shown in FIG. 14 may be integrally formed as a single unitary and indivisible unit with the first region 310 and the first plate region 210 of the foldable device 1005 shown in FIG. 5, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second plate region 220 of the foldable device 1002 shown in FIG. 2, respectively, and the second region 320 and the second plate region 220 of the foldable device 1013 shown in FIG. 14 may be integrally formed as a single unitary and indivisible unit with the first region 310 and the first plate region 210 of the foldable device 1007 shown in FIG. 7, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second plate region 220 of the foldable device 1002 shown in FIG. 2, respectively, and the second region 320 and the second plate region 220 of the foldable device 1013 shown in FIG. 14 may be integrally formed as a single unitary and indivisible unit with the first region 310 and the first plate region 210 of the foldable device 1008 shown in FIG. 8, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second plate region 220 of the foldable device 1002 shown in FIG. 2, respectively, and the second region 320 and the second plate region 220 of the foldable device 1013 shown in FIG. 14 may be integrally formed as a single unitary and indivisible unit with the first region 310 and the first plate region 210 of the foldable device 1010 shown in FIG. 10, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1003 shown in FIG. 3, respectively, and the second region 320 and the second plate region 220 of the foldable device 1013 shown in FIG. 14 may be integrally formed as a single unitary and indivisible unit with the first region 310 and the first plate region 210 of the foldable device 1002 shown in FIG. 2, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1003 shown in FIG. 3, respectively, and the second region 320 and the second plate region 220 of the foldable device 1013 shown in FIG. 14 may be integrally formed as a single unitary and indivisible unit with the first region 310 and the first plate region 210 of another foldable device 1003 shown in FIG. 3, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1003 shown in FIG. 3, respectively, and the second region 320 and the second plate region 220 of the foldable device 1013 shown in FIG. 14 may be integrally formed as a single unitary and indivisible unit with the first region 310 and the first plate region 210 of the foldable device 1005 shown in FIG. 5, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1003 shown in FIG. 3, respectively, and the second region 320 and the second plate region 220 of the foldable device 1013 shown in FIG. 14 may be integrally formed as a single unitary and indivisible unit with the first region 310 and the first plate region 210 of the foldable device 1007 shown in FIG. 7, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1003 shown in FIG. 3, respectively, and the second region 320 and the second plate region 220 of the foldable device 1013 shown in FIG. 14 may be integrally formed as a single unitary and indivisible unit with the first region 310 and the first plate region 210 of the foldable device 1008 shown in FIG. 8, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1003 shown in FIG. 3, respectively, and the second region 320 and the second plate region 220 of the foldable device 1013 shown in FIG. 14 may be integrally formed as a single unitary and indivisible unit with the first region 310 and the first plate region 210 of the foldable device 1010 shown in FIG. 10, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1005 shown in FIG. 5, respectively, and the second region 320 and the second plate region 220 of the foldable device 1013 shown in FIG. 14 may be integrally formed as a single unitary and indivisible unit with the first region 310 and the first plate region 210 of the foldable device 1002 shown in FIG. 2, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1005 shown in FIG. 5, respectively, and the second region 320 and the second plate region 220 of the foldable device 1013 shown in FIG. 14 may be integrally formed as a single unitary and indivisible unit with the first region 310 and the first plate region 210 of the foldable device 1003 shown in FIG. 3, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1005 shown in FIG. 5, respectively, and the second region 320 and the second plate region 220 of the foldable device 1013 shown in FIG. 14 may be integrally formed as a single unitary and indivisible unit with the first region 310 and the first plate region 210 of another foldable device 1005 shown in FIG. 5, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1005 shown in FIG. 5, respectively, and the second region 320 and the second plate region 220 of the foldable device 1013 shown in FIG. 14 may be integrally formed as a single unitary and indivisible unit with the first region 310 and the first plate region 210 of the foldable device 1007 shown in FIG. 7, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1005 shown in FIG. 5, respectively, and the second region 320 and the second plate region 220 of the foldable device 1013 shown in FIG. 14 may be integrally formed as a single unitary and indivisible unit with the first region 310 and the first plate region 210 of the foldable device 1008 shown in FIG. 8, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1005 shown in FIG. 5, respectively, and the second region 320 and the second plate region 220 of the foldable device 1013 shown in FIG. 14 may be integrally formed as a single unitary and indivisible unit with the first region 310 and the first plate region 210 of the foldable device 1010 shown in FIG. 10, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second plate region 220 of the foldable device 1007 shown in FIG. 7, respectively, and the second region 320 and the second plate region 220 of the foldable device 1013 shown in FIG. 14 may be integrally formed as a single unitary and indivisible unit with the first region 310 and the first plate region 210 of the foldable device 1002 shown in FIG. 2, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second plate region 220 of the foldable device 1007 shown in FIG. 7, respectively, and the second region 320 and the second plate region 220 of the foldable device 1013 shown in FIG. 14 may be integrally formed as a single unitary and indivisible unit with the first region 310 and the first plate region 210 of the foldable device 1003 shown in FIG. 3, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second plate region 220 of the foldable device 1007 shown in FIG. 7, respectively, and the second region 320 and the second plate region 220 of the foldable device 1013 shown in FIG. 14 may be integrally formed as a single unitary and indivisible unit with the first region 310 and the first plate region 210 of the foldable device 1005 shown in FIG. 5, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second plate region 220 of the foldable device 1007 shown in FIG. 7, respectively, and the second region 320 and the second plate region 220 of the foldable device 1013 shown in FIG. 14 may be integrally formed as a single unitary and indivisible unit with the first region 310 and the first plate region 210 of another foldable device 1007 shown in FIG. 7, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second plate region 220 of the foldable device 1007 shown in FIG. 7, respectively, and the second region 320 and the second plate region 220 of the foldable device 1013 shown in FIG. 14 may be integrally formed as a single unitary and indivisible unit with the first region 310 and the first plate region 210 of the foldable device 1008 shown in FIG. 8, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second plate region 220 of the foldable device 1007 shown in FIG. 7, respectively, and the second region 320 and the second plate region 220 of the foldable device 1013 shown in FIG. 14 may be integrally formed as a single unitary and indivisible unit with the first region 310 and the first plate region 210 of the foldable device 1010 shown in FIG. 10, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1008 shown in FIG. 8, respectively, and the second region 320 and the second plate region 220 of the foldable device 1013 shown in FIG. 14 may be integrally formed as a single unitary and indivisible unit with the first region 310 and the first plate region 210 of the foldable device 1002 shown in FIG. 2, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1008 shown in FIG. 8, respectively, and the second region 320 and the second plate region 220 of the foldable device 1013 shown in FIG. 14 may be integrally formed as a single unitary and indivisible unit with the first region 310 and the first plate region 210 of the foldable device 1003 shown in FIG. 3, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1008 shown in FIG. 8, respectively, and the second region 320 and the second plate region 220 of the foldable device 1013 shown in FIG. 14 may be integrally formed as a single unitary and indivisible unit with the first region 310 and the first plate region 210 of the foldable device 1005 shown in FIG. 5, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1008 shown in FIG. 8, respectively, and the second region 320 and the second plate region 220 of the foldable device 1013 shown in FIG. 14 may be integrally formed as a single unitary and indivisible unit with the first region 310 and the first plate region 210 of the foldable device 1007 shown in FIG. 7, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1008 shown in FIG. 8, respectively, and the second region 320 and the second plate region 220 of the foldable device 1013 shown in FIG. 14 may be integrally formed as a single unitary and indivisible unit with the first region 310 and the first plate region 210 of another foldable device 1008 shown in FIG. 8, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1008 shown in FIG. 8, respectively, and the second region 320 and the second plate region 220 of the foldable device 1013 shown in FIG. 14 may be integrally formed as a single unitary and indivisible unit with the first region 310 and the first plate region 210 of the foldable device 1010 shown in FIG. 10, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1010 shown in FIG. 10, respectively, and the second region 320 and the second plate region 220 of the foldable device 1013 shown in FIG. 14 may be integrally formed as a single unitary and indivisible unit with the first region 310 and the first plate region 210 of the foldable device 1002 shown in FIG. 2, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1010 shown in FIG. 10, respectively, and the second region 320 and the second plate region 220 of the foldable device 1013 shown in FIG. 14 may be integrally formed as a single unitary and indivisible unit with the first region 310 and the first plate region 210 of the foldable device 1003 shown in FIG. 3, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1010 shown in FIG. 10, respectively, and the second region 320 and the second plate region 220 of the foldable device 1013 shown in FIG. 14 may be integrally formed as a single unitary and indivisible unit with the first region 310 and the first plate region 210 of the foldable device 1005 shown in FIG. 5, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1010 shown in FIG. 10, respectively, and the second region 320 and the second plate region 220 of the foldable device 1013 shown in FIG. 14 may be integrally formed as a single unitary and indivisible unit with the first region 310 and the first plate region 210 of the foldable device 1007 shown in FIG. 7, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1010 shown in FIG. 10, respectively, and the second region 320 and the second plate region 220 of the foldable device 1013 shown in FIG. 14 may be integrally formed as a single unitary and indivisible unit with the first region 310 and the first plate region 210 of the foldable device 1008 shown in FIG. 8, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the first region 310 and the first plate region 210 of the foldable device 1010 shown in FIG. 10, respectively, and the second region 320 and the second plate region 220 of the foldable device 1013 shown in FIG. 14 may be integrally formed as a single unitary and indivisible unit with the first region 310 and the first plate region 210 of another foldable device 1010 shown in FIG. 10, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1004 shown in FIG. 4, respectively, and the second region 320 and the second plate region 220 of the foldable device 1013 shown in FIG. 14 may be integrally formed as a single unitary and indivisible unit with the first region 310 and the first plate region 210 of the foldable device 1002 shown in FIG. 2, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1004 shown in FIG. 4, respectively, and the second region 320 and the second plate region 220 of the foldable device 1013 shown in FIG. 14 may be integrally formed as a single unitary and indivisible unit with the first region 310 and the first plate region 210 of the foldable device 1003 shown in FIG. 3, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1004 shown in FIG. 4, respectively, and the second region 320 and the second plate region 220 of the foldable device 1013 shown in FIG. 14 may be integrally formed as a single unitary and indivisible unit with the first region 310 and the first plate region 210 of the foldable device 1005 shown in FIG. 5, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1004 shown in FIG. 4, respectively, and the second region 320 and the second plate region 220 of the foldable device 1013 shown in FIG. 14 may be integrally formed as a single unitary and indivisible unit with the first region 310 and the first plate region 210 of the foldable device 1007 shown in FIG. 7, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1004 shown in FIG. 4, respectively, and the second region 320 and the second plate region 220 of the foldable device 1013 shown in FIG. 14 may be integrally formed as a single unitary and indivisible unit with the first region 310 and the first plate region 210 of the foldable device 1008 shown in FIG. 8, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1004 shown in FIG. 4, respectively, and the second region 320 and the second plate region 220 of the foldable device 1013 shown in FIG. 14 may be integrally formed as a single unitary and indivisible unit with the first region 310 and the first plate region 210 of the foldable device 1010 shown in FIG. 10, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1005 shown in FIG. 5, respectively, and the second region 320 and the second plate region 220 of the foldable device 1013 shown in FIG. 14 may be integrally formed as a single unitary and indivisible unit with the first region 310 and the first plate region 210 of the foldable device 1002 shown in FIG. 2, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1005 shown in FIG. 5, respectively, and the second region 320 and the second plate region 220 of the foldable device 1013 shown in FIG. 14 may be integrally formed as a single unitary and indivisible unit with the first region 310 and the first plate region 210 of the foldable device 1003 shown in FIG. 3, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1005 shown in FIG. 5, respectively, and the second region 320 and the second plate region 220 of the foldable device 1013 shown in FIG. 14 may be integrally formed as a single unitary and indivisible unit with the first region 310 and the first plate region 210 of another foldable device 1005 shown in FIG. 5, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1005 shown in FIG. 5, respectively, and the second region 320 and the second plate region 220 of the foldable device 1013 shown in FIG. 14 may be integrally formed as a single unitary and indivisible unit with the first region 310 and the first plate region 210 of the foldable device 1007 shown in FIG. 7, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1005 shown in FIG. 5, respectively, and the second region 320 and the second plate region 220 of the foldable device 1013 shown in FIG. 14 may be integrally formed as a single unitary and indivisible unit with the first region 310 and the first plate region 210 of the foldable device 1008 shown in FIG. 8, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1005 shown in FIG. 5, respectively, and the second region 320 and the second plate region 220 of the foldable device 1013 shown in FIG. 14 may be integrally formed as a single unitary and indivisible unit with the first region 310 and the first plate region 210 of the foldable device 1010 shown in FIG. 10, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1009 shown in FIG. 9, respectively, and the second region 320 and the second plate region 220 of the foldable device 1013 shown in FIG. 14 may be integrally formed as a single unitary and indivisible unit with the first region 310 and the first plate region 210 of the foldable device 1002 shown in FIG. 2, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1009 shown in FIG. 9, respectively, and the second region 320 and the second plate region 220 of the foldable device 1013 shown in FIG. 14 may be integrally formed as a single unitary and indivisible unit with the first region 310 and the first plate region 210 of the foldable device 1003 shown in FIG. 3, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1009 shown in FIG. 9, respectively, and the second region 320 and the second plate region 220 of the foldable device 1013 shown in FIG. 14 may be integrally formed as a single unitary and indivisible unit with the first region 310 and the first plate region 210 of the foldable device 1005 shown in FIG. 5, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1009 shown in FIG. 9, respectively, and the second region 320 and the second plate region 220 of the foldable device 1013 shown in FIG. 14 may be integrally formed as a single unitary and indivisible unit with the first region 310 and the first plate region 210 of the foldable device 1007 shown in FIG. 7, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1009 shown in FIG. 9, respectively, and the second region 320 and the second plate region 220 of the foldable device 1013 shown in FIG. 14 may be integrally formed as a single unitary and indivisible unit with the first region 310 and the first plate region 210 of the foldable device 1008 shown in FIG. 8, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1009 shown in FIG. 9, respectively, and the second region 320 and the second plate region 220 of the foldable device 1013 shown in FIG. 14 may be integrally formed as a single unitary and indivisible unit with the first region 310 and the first plate region 210 of the foldable device 1010 shown in FIG. 10, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1010 shown in FIG. 10, respectively, and the second region 320 and the second plate region 220 of the foldable device 1013 shown in FIG. 14 may be integrally formed as a single unitary and indivisible unit with the first region 310 and the first plate region 210 of the foldable device 1002 shown in FIG. 2, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1010 shown in FIG. 10, respectively, and the second region 320 and the second plate region 220 of the foldable device 1013 shown in FIG. 14 may be integrally formed as a single unitary and indivisible unit with the first region 310 and the first plate region 210 of the foldable device 1003 shown in FIG. 3, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1010 shown in FIG. 10, respectively, and the second region 320 and the second plate region 220 of the foldable device 1013 shown in FIG. 14 may be integrally formed as a single unitary and indivisible unit with the first region 310 and the first plate region 210 of the foldable device 1005 shown in FIG. 5, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1010 shown in FIG. 10, respectively, and the second region 320 and the second plate region 220 of the foldable device 1013 shown in FIG. 14 may be integrally formed as a single unitary and indivisible unit with the first region 310 and the first plate region 210 of the foldable device 1007 shown in FIG. 7, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1010 shown in FIG. 10, respectively, and the second region 320 and the second plate region 220 of the foldable device 1013 shown in FIG. 14 may be integrally formed as a single unitary and indivisible unit with the first region 310 and the first plate region 210 of the foldable device 1008 shown in FIG. 8, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In one alternative embodiment, for example, the first region 310 and the first plate region 210 of the foldable device 1013 shown in FIG. 14 may be integrally formed as a single unitary and indivisible unit with the second region 320 and the second body 120 of the foldable device 1010 shown in FIG. 10, respectively, and the second region 320 and the second plate region 220 of the foldable device 1013 shown in FIG. 14 may be integrally formed as a single unitary and indivisible unit with the first region 310 and the first plate region 210 of another foldable device 1010 shown in FIG. 10, respectively. In such an embodiment, the first plate region 210 and the second plate region 220 of the foldable device 1013 shown in FIG. 14 may be integrally formed as a single unitary and indivisible unit with the first body 510 and the second body 520, respectively.

In embodiment of a foldable device, as described herein, tensile stress or compressive stress applied to a flexible display panel is substantially reduced when the flexible display panel is folded or unfolded.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the claims.

What is claimed is:

1. A foldable device comprising:
a flexible display panel comprising a first region, a second region, and a third region located between the first and second regions; and
a plate structure disposed under the flexible display panel,
wherein the plate structure comprises a first plate region attached to the first region of the flexible display panel, a second plate region attached to the second region of the flexible display panel, and a third plate region attached to the third region of the flexible display panel,
wherein the third plate region of the plate structure has a flexibility such that the third plate region of the plate structure has a lower rigidity than the first and second plate regions of the plate structure
wherein the foldable device further comprises a hinge structure located under the plate structure and comprising a first body corresponding to the first plate region of the plate structure, a second body corresponding to the second plate region of the plate structure, and a first hinge connecting the first body to the second body and corresponding to the third plate region of the plate structure,
wherein the first hinge comprises a middle portion, a first peripheral portion disposed between the middle portion of the first hinge and the first body and a second peripheral portion disposed between the middle portion of the first hinge and the second body,
wherein the first plate region of the plate structure is attached to the first body, the second plate region of the plate structure is attached to the second body, the third plate region of the plate structure has a position horizontally fixed to the middle portion of the first hinge and vertically not fixed to the middle portion of the first hinge,
wherein, in an unfolded state, the first, third and second plate regions of the plate structure are sequentially arranged in a length direction of the plate structure.

2. The foldable device of claim 1, wherein the third plate region of the plate structure has holes.

3. The foldable device of claim 2, wherein at least one of the holes has a shape extending in a direction.

4. The foldable device of claim 3, wherein the direction is a length direction of the third plate region included in the plate structure,
wherein the length direction of the third plate region is substantially perpendicular to the length direction of the plate structure.

5. The foldable device of claim 2, wherein the first and second plate regions of the plate structure have holes at least neighboring the third plate region of the plate structure.

6. The foldable device of claim 1, wherein a side area of the third plate region has at least one convex portion which is protruded in a plan view and at least one concave portion which is recessed in a plan view,
wherein the side area of the third plate region extends in the length direction of the plate structure.

7. The foldable device of claim 6, wherein the convex portion has at least one corner rounded in a plan view.

8. The foldable device of claim 6, wherein the concave portion has at least one recessed corner rounded in a plan view.

9. The foldable device of claim 8, wherein the convex portion has at least one corner rounded in a plan view.

10. The foldable device of claim 1, wherein, in the unfolded state, the first body and the second body are spaced apart from each other by a gap in the length direction of the plate structure, and the third plate region of the plate structure has a width substantially greater than the gap, the width being measured in the length direction of the plate structure.

11. The foldable device of claim 1, wherein the first hinge includes a connecting body, a first rotatable shaft connecting the first body to the connecting body, and a second rotatable shaft connecting the second body to the connecting body.

* * * * *